US010961260B2

(12) United States Patent
Son et al.

(10) Patent No.: US 10,961,260 B2
(45) Date of Patent: *Mar. 30, 2021

(54) NITROGENOUS COMPOUND AND COLOR CONVERSION FILM COMPRISING SAME

(71) Applicant: LG CHEM, LTD., Seoul (KR)

(72) Inventors: Seonkyoung Son, Daejeon (KR); Cheol Jun Song, Daejeon (KR); Milim Lee, Daejeon (KR); Hoyong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 172 days.

This patent is subject to a terminal disclaimer.

(21) Appl. No.: 16/337,702

(22) PCT Filed: Nov. 14, 2017

(86) PCT No.: PCT/KR2017/012893

§ 371 (c)(1),
(2) Date: Mar. 28, 2019

(87) PCT Pub. No.: WO2018/093119

PCT Pub. Date: May 24, 2018

(65) Prior Publication Data

US 2020/0331932 A1 Oct. 22, 2020

(30) Foreign Application Priority Data

Nov. 17, 2016 (KR) ........................ 10-2016-0153298
Nov. 10, 2017 (KR) ........................ 10-2017-0149774

(51) Int. Cl.
*C07F 5/02* (2006.01)
*C07F 19/00* (2006.01)
*G02F 1/25* (2006.01)

(52) U.S. Cl.
CPC ................ *C07F 5/02* (2013.01); *C07F 19/00* (2013.01); *G02F 1/25* (2013.01)

(58) Field of Classification Search
CPC ............... C07F 5/02; C07F 19/00; G02F 1/25
See application file for complete search history.

(56) References Cited

U.S. PATENT DOCUMENTS

2005/0147844 A1 7/2005 Hatwar et al.
2017/0260212 A1 9/2017 Lee et al.
2017/0349822 A1 12/2017 Lee et al.

FOREIGN PATENT DOCUMENTS

| | | | |
|---|---|---|---|
| CN | 103865290 | A | 6/2014 |
| CN | 104650610 | A | 5/2015 |
| JP | 2011-241160 | A | 12/2011 |
| KR | 10-2007-0004566 | A | 1/2007 |
| KR | 10-1590299 | B1 | 2/2016 |
| KR | 10-2016-0080063 | A | 7/2016 |

OTHER PUBLICATIONS

Jin, R, et al., "Rational Design of Organoboron Heteroarene Derivatives as Luminescent and Charge Transport Materials for Organic Light-emitting Diodes", New Journal of Chemistry, 2015, vol. 36, No. 10, pp. 8188-8194.
Cheng, C. et al., "Diversity-oriented Facile Access to Highly Fluorescent Membrane-permeable Benz[c,d]indole N-heteroarene BF2 Dyes", Organic letters, 2014, vol. 17, No. 2, pp. 278-281.
Shimizu, S. et al., "Benzo[c,d]indole-Containing Aza-BODIPY Dyes: AsymmetrizationInduced Solid-State Emission and Aggregation-Induced Emission Enhancement as New Properties of a Well-Known Chromophore", Chem. Eur. J. 2015, 21, 12996-1303.
International Search Report and Written Opinion issued for PCT/KR2017/012893 dated Jan. 23, 2018, 12 pages.

*Primary Examiner* — Timothy R Rozof
(74) *Attorney, Agent, or Firm* — Rothwell, Figg, Ernst & Manbeck, P.C.

(57) ABSTRACT

The present specification relates to a compound containing nitrogen, and a color conversion film, a backlight unit, and a display device, including the same.

10 Claims, 1 Drawing Sheet

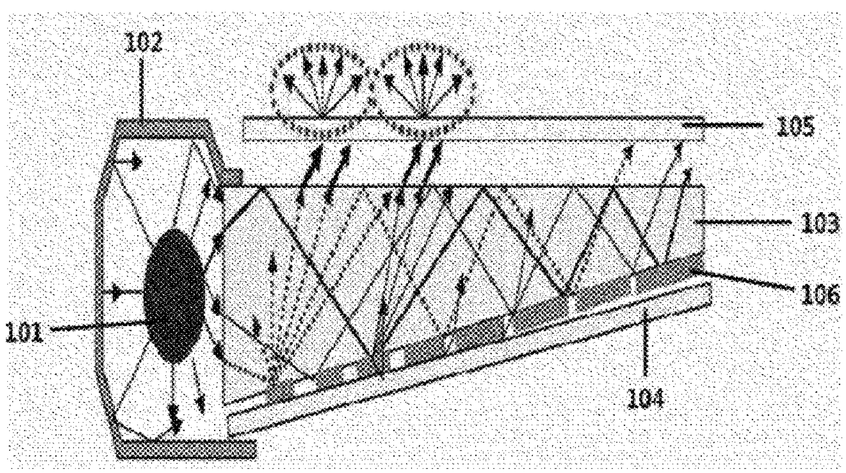
102
105
103
106
101
104

NITROGENOUS COMPOUND AND COLOR CONVERSION FILM COMPRISING SAME

TECHNICAL FIELD

The present specification relates to a compound containing nitrogen, and a color conversion film, a backlight unit, and a display device, including the same. This application is a 35 U.S.C. § 371 National Phase Entry Application from PCT/KR2017/012893, filed on Nov. 14, 2017, and designating the United States, which claims priority to and the benefit of Korean Patent Application Nos. 10-2016-0153298 and 10-2017-0149774 filed in the Korean Intellectual Property Office on Nov. 17, 2016 and Nov. 10, 2017, respectively, the entire contents of which are incorporated herein by reference.

BACKGROUND ART

The existing light emitting diodes (LEDs) are obtained by mixing a green phosphor and a red phosphor with a blue light emitting diode or mixing a yellow phosphor and a blue-green phosphor with a UV light emission light emitting diode. However, in this method, it is difficult to control colors, and accordingly, the color rendition is not good. Therefore, the color gamut deteriorates.

In order to overcome the deterioration in the color gamut and reduce the production costs, methods of implementing green and red colors have been recently attempted by using a method of producing a quantum dot in the form of a film and combining the same with a blue LED. However, cadmium-based quantum dots have safety problems, and the other quantum dots have much lower efficiencies than those of the cadmium-based quantum dots. Further, quantum dots have low stability against oxygen and water, and have a disadvantage in that the performance thereof significantly deteriorates when the quantum dots are aggregated. In addition, when quantum dots are produced, it is difficult to constantly maintain the size thereof, and thus, the production cost is high.

CITATION LIST

[Patent Document]

Korean Patent Application Laid-Open No. 2000-0011622

DISCLOSURE

Technical Problem

The present specification provides a compound containing nitrogen, and a color conversion film, a backlight unit, and a display device, including the same.

Technical Solution

An exemplary embodiment of the present specification provides a compound represented by the following Chemical Formula 1.

[Chemical Formula 1]

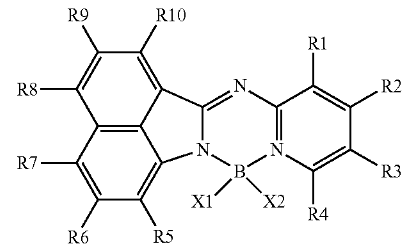

In Chemical Formula 1, at least one of R1 to R4 is a cyano group; —$CO_2R$; —$SO_3R'$; —CONR"R'"; a substituted or unsubstituted fluoroalkyl group; a substituted or unsubstituted alkenyl group; a substituted or unsubstituted alkynyl group; a substituted or unsubstituted silyl group; a substituted or unsubstituted aryl group; a substituted or unsubstituted aryloxy group; a substituted or unsubstituted arylamine group; a substituted or unsubstituted heterocyclic group; or a substituted or unsubstituted hydrocarbon ring group, or at least one of R5 to R10 is a cyano group; —$CO_2R$; —$SO_3R'$; —CONR"R'"; a substituted or unsubstituted alkyl group; a substituted or unsubstituted alkoxy group; a substituted or unsubstituted fluoroalkyl group; a substituted or unsubstituted alkenyl group; a substituted or unsubstituted alkynyl group; a substituted or unsubstituted silyl group; a substituted or unsubstituted aryl group; a substituted or unsubstituted aryloxy group; a substituted or unsubstituted arylamine group; a substituted or unsubstituted heterocyclic group; or a substituted or unsubstituted hydrocarbon ring group, the others are hydrogen; or deuterium, or adjacent groups are bonded to an adjacent group to form a substituted or unsubstituted ring, X1 and X2 are the same as or different from each other, and are each independently a halogen group; a cyano group; —$CO_2R''''$; a substituted or unsubstituted alkyl group; a substituted or unsubstituted alkynyl group; a substituted or unsubstituted alkoxy group; a substituted or unsubstituted alkenyl group; a substituted or unsubstituted silyl group; a substituted or unsubstituted aryloxy group; a substituted or unsubstituted aryl group; a substituted or unsubstituted heterocyclic group; or a substituted or unsubstituted hydrocarbon ring group, or X1 and X2 are bonded to each other to form a substituted or unsubstituted ring, and R, R', R", R'", and R"" are the same as or different from each other, and are each independently a substituted or unsubstituted alkyl group; a substituted or unsubstituted fluoroalkyl group; a substituted or unsubstituted alkoxy group; a substituted or unsubstituted alkenyl group; a substituted or unsubstituted alkynyl group; a substituted or unsubstituted silyl group; a substituted or unsubstituted aryl group; a substituted or unsubstituted heterocyclic group; or a substituted or unsubstituted hydrocarbon ring group.

Another exemplary embodiment of the present specification provides a color conversion film including: a resin matrix; and the compound represented by Chemical Formula 1, which is dispersed in the resin matrix.

Still another exemplary embodiment of the present specification provides a backlight unit including the color conversion film.

Yet another exemplary embodiment of the present specification provides a display device including the backlight unit.

Advantageous Effects

A compound according to an exemplary embodiment of the present specification has better processability and light fastness than a compound having an aza-BODIPY structure in the related art. Therefore, by using the compound described in the present specification as a fluorescent material of a color conversion film, it is possible to provide a color conversion film which has excellent brightness and color gamut and excellent light fastness.

BRIEF DESCRIPTION OF DRAWINGS

FIG. 1 is a schematic view in which a color conversion film according to an exemplary embodiment of the present specification is applied to a backlight.

EXPLANATION OF REFERENCE NUMERALS AND SYMBOLS

101: Side chain-type light source
102: Reflective plate
103: Light guide plate
104: Reflective layer
105: Color conversion film
106: Light dispersion pattern

BEST MODE FOR CARRYING OUT THE INVENTION

Hereinafter, the present specification will be described in more detail.

An exemplary embodiment of the present specification provides the compound represented by Chemical Formula 1.

The compound according to an exemplary embodiment of the present specification is characterized in that at least one of R1 to R4 in a core structure is a cyano group; —$CO_2$R; —$SO_3$R'; —CONR"R'"; a substituted or unsubstituted fluoroalkyl group; a substituted or unsubstituted alkenyl group; a substituted or unsubstituted alkynyl group; a substituted or unsubstituted silyl group; a substituted or unsubstituted aryl group; a substituted or unsubstituted aryloxy group; a substituted or unsubstituted arylamine group; a substituted or unsubstituted heterocyclic group; or a substituted or unsubstituted hydrocarbon ring group, or at least one of R5 to R10 is a cyano group; —$CO_2$R; —$SO_3$R'; —CONR"R'"; a substituted or unsubstituted alkyl group; a substituted or unsubstituted alkoxy group; a substituted or unsubstituted fluoroalkyl group; a substituted or unsubstituted alkenyl group; a substituted or unsubstituted alkynyl group; a substituted or unsubstituted silyl group; a substituted or unsubstituted aryl group; a substituted or unsubstituted aryloxy group; a substituted or unsubstituted arylamine group; a substituted or unsubstituted heterocyclic group; or a substituted or unsubstituted hydrocarbon ring group, and particularly, a case where R1 to R10 are all hydrogen, or at least one of R1 to R4 is a halogen group, an alkyl group, or an alkoxy group has a disadvantage in that the processability deteriorates, and the light fastness deteriorates because the solution process is impossible. Accordingly, when a color conversion film includes the compound, a color conversion film having excellent processability and light fastness may be manufactured.

When one part "includes" one constituent element in the present specification, unless otherwise specifically described, this does not mean that another constituent element is excluded, but means that another constituent element may be further included.

When one member is disposed "on" another member in the present specification, this includes not only a case where the one member is brought into contact with another member, but also a case where still another member is present between the two members.

Examples of the substituents in the present specification will be described below, but are not limited thereto.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term "substituted or unsubstituted" means being substituted with one or two or more substituents selected from the group consisting of deuterium; a halogen group; a cyano group; a nitro group; an amino group; a carbonyl group; a carboxyl group (—COOH); an ether group; an ester group; a hydroxy group; a substituted or unsubstituted alkyl group; a substituted or unsubstituted fluoroalkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted silyl group; a substituted or unsubstituted amine group; a substituted or unsubstituted aryl group; and a substituted or unsubstituted heterocyclic group or being substituted with a substituent to which two or more substituents are linked among the substituents exemplified above, or having no substituent. For example, "the substituent to which two or more substituents are linked" may be a biphenyl group. That is, the biphenyl group may also be an aryl group, and may be interpreted as a substituent to which two phenyl groups are linked.

In the present specification,

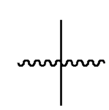

means a moiety bonded to another substituent or a bonding portion.

In the present specification, a halogen group may be fluorine, chlorine, bromine, or iodine.

In the present specification, the number of carbon atoms of a carbonyl group is not particularly limited, but is preferably 1 to 30. Specifically, the carbonyl group may be —C(═O)R100 or a compound having the following structure, and R100 is hydrogen, a substituted or unsubstituted alkyl group, a substituted or unsubstituted cycloalkyl group, or a substituted or unsubstituted aryl group, but is not limited thereto.

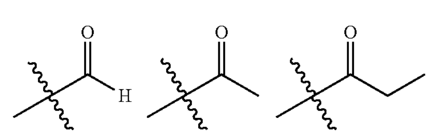

-continued

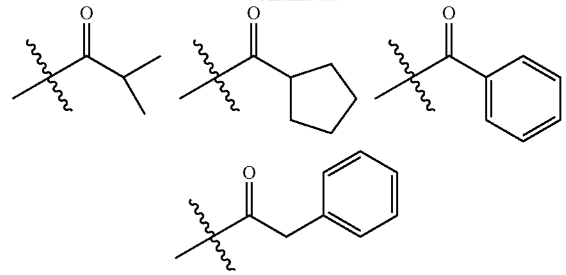

In the present specification, for an ether group, the oxygen of the ether may be substituted with a straight, branched, or cyclic alkyl group having 1 to 25 carbon atoms; or a monocyclic or polycyclic aryl group having 6 to 30 carbon atoms.

In the present specification, for an ester group, the oxygen of the ester group may be substituted with a straight, branched, or cyclic alkyl group having 1 to 25 carbon atoms; an alkenyl group; a monocyclic or polycyclic aryl group having 6 to 30 carbon atoms; or a heterocyclic group having 2 to 30 carbon atoms. Specifically, the ester group may be —C(═O)OR101, —OC(═O)R102, or a compound having the following structure, and R101 and R102 are the same as or different from each other, and are each independently hydrogen, a substituted or unsubstituted alkyl group, a substituted or unsubstituted cycloalkyl group, or a substituted or unsubstituted aryl group, but are not limited thereto.

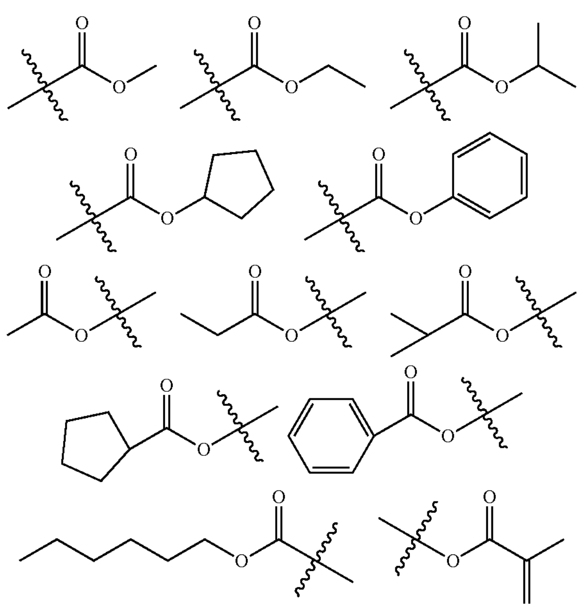

In the present specification, the alkyl group may be straight or branched, and the number of carbon atoms thereof is not particularly limited, but is preferably 1 to 30. Specific examples thereof include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto.

In the present specification, a cycloalkyl group is not particularly limited, but has preferably 3 to 30 carbon atoms, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present specification, the alkoxy group may be straight, branched, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, the alkenyl group may be straight or branched, and the number of carbon atoms thereof is not particularly limited, but is preferably 2 to 30. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, the alkynyl group may be straight or branched, and the number of carbon atoms thereof is not particularly limited, but is preferably 2 to 30. Specific examples thereof include an alkynyl group such as ethynyl, propynyl, 2-methyl-2-propynyl, 2-butynyl, and 2-pentynyl, and the like, but are not limited thereto.

In the present specification, specific examples of a silyl group include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group, and the like, but are not limited thereto.

In the present specification, an amine group may be selected from the group consisting of $—NH_2$; a monoalkylamine group; a dialkylamine group; an N-alkylarylamine group; a monoarylamine group; a diarylamine group; an N-arylheteroarylamine group; an N-alkylheteroarylamine group; a monoheteroarylamine group, and a diheteroarylamine group, and the number of carbon atoms thereof is not particularly limited, but is preferably 1 to 30. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a ditolylamine group, an N-phenyltolylamine group, a triphenylamine group, an N-phenylbiphenylamine group, an N-phenylnaphthylamine group, an N-biphenylnaphthylamine group, an N-naphthylfluorenylamine group, an N-phenylphenanthrenylamine group, an N-biphenylphenanthrenylamine group, an N-phenylfluorenylamine group, an N-phenyl terphenylamine group, an N-phenanthrenylfluorenylamine group, an N-biphenylfluorenylamine group, and the like, but are not limited thereto.

In the present specification, examples of an arylamine group include a substituted or unsubstituted monoarylamine group, a substituted or unsubstituted diarylamine group, or a substituted or unsubstituted triarylamine group. The aryl group in the arylamine group may be a monocyclic aryl group or a polycyclic aryl group. The arylamine group including two or more aryl groups may include a monocyclic aryl group, a polycyclic aryl group, or both a monocyclic aryl group and a polycyclic aryl group. For example, the aryl group in the arylamine group may be selected from the above-described examples of the aryl group.

In the present specification, an aryl group is not particularly limited, but has preferably 6 to 30 carbon atoms, and the aryl group may be monocyclic or polycyclic.

When the aryl group is a monocyclic aryl group, the number of carbon atoms thereof is not particularly limited, but is preferably 6 to 30. Specific examples of the monocyclic aryl group include a phenyl group, a biphenyl group, a terphenyl group, and the like, but are not limited thereto.

When the aryl group is a polycyclic aryl group, the number of carbon atoms thereof is not particularly limited, but is preferably 10 to 30. Specific examples of the polycyclic aryl group include a naphthyl group, an anthracenyl group, a phenanthryl group, a triphenyl group, a pyrenyl group, a perylenyl group, a chrysenyl group, a fluorenyl group, and the like, but are not limited thereto.

In the present specification, the fluorenyl group may be substituted, and adjacent substituents may be bonded to each other to form a ring.

When the fluorenyl group is substituted, examples of the fluorenyl group include

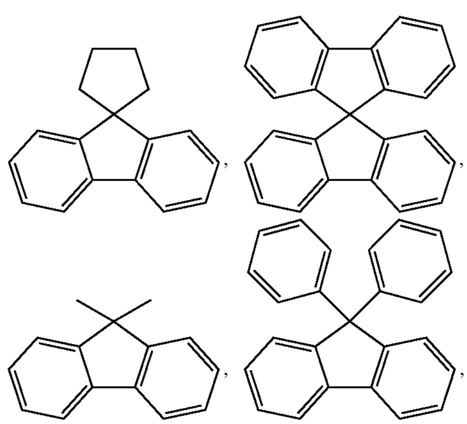

and the like. However, the fluorenyl group is not limited thereto.

In the present specification, an aryl group of an aryloxy group is the same as the above-described examples of the aryl group. Specifically, examples of the aryloxy group include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group, and the like, examples of the arylthioxy group include a phenylthioxy group, a 2-methylphenylthioxy group, a 4-tert-butylphenylthioxy group, and the like, and examples of the arylsulfoxy group include a benzenesulfoxy group, a p-toluenesulfoxy group, and the like, but the examples are not limited thereto.

In the present specification, a heterocyclic group includes one or more atoms other than carbon, that is, one or more heteroatoms, and specifically, the heteroatom may include one or more atoms selected from the group consisting of O, N, Se, S, and the like. The number of carbon atoms thereof is not particularly limited, but is preferably 2 to 30, and the heteroaryl group may be monocyclic or polycyclic. Examples of the heterocyclic group include a thiophene group, a furanyl group, a pyrrole group, an imidazole group, a thiazole group, an oxazole group, an oxadiazole group, a pyridine group, a bipyridine group, a pyrimidine group, a triazine group, a triazole group, an acridine group, a pyridazine group, a pyrazine group, a quinoline group, a quinazoline group, a quinoxaline group, a phthalazine group, a pyridopyrimidine group, a pyridopyrazine group, a pyrazinopyrazine group, an isoquinoline group, an indole group, a carbazole group, a benzoxazole group, a benzimidazole group, a benzothiazole group, a benzocarbazole group, a benzothiophene group, a dibenzothiophene group, a benzofuran group, a phenanthrolinyl group (phenanthroline), an isoxazole group, a thiadiazole group, a phenothiazine group, a dibenzofuran group, a dihydrobenzoisoquinoline group (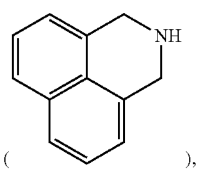 [SMILES: c1cc2c3c(cccc3c1)CNC2]), a chromene group (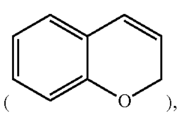), and the like, but are not limited thereto.

In the present specification, a heterocyclic group may be monocyclic or polycyclic, may be an aromatic ring, an aliphatic ring, or a fused ring of the aromatic ring and the aliphatic ring, and may be selected from the examples of the heterocyclic group.

In the present specification, a hydrocarbon ring may be an aromatic ring, an aliphatic ring, or a fused ring of the aromatic ring and the aliphatic ring and may be selected from the examples of the cycloalkyl group or the aryl group except that the hydrocarbon ring is not a monovalent group, and examples of the fused ring of the aromatic ring and the aliphatic ring include 1,2,3,4-tetrahydronaphthalene group (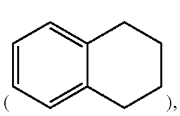), a 2,3-dihydro-1H-indene group

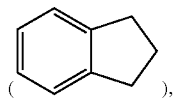

and the like, but are not limited thereto.

In the present specification, the "adjacent" group may mean a substituent substituted with an atom directly linked to an atom in which the corresponding substituent is substituted, a substituent disposed sterically closest to the corresponding substituent, or another substituent substituted with an atom in which the corresponding substituent is substituted. For example, two substituents substituted at the ortho position in a benzene ring and two substituents substituted with the same carbon in an aliphatic ring may be interpreted as groups which are "adjacent" to each other.

In the present specification, the term "adjacent groups are bonded to each other to form a ring" among the substituents means that a substituent is bonded to an adjacent group to form a substituted or unsubstituted hydrocarbon ring; or a substituted or unsubstituted hetero ring.

In an exemplary embodiment of the present specification, at least one of R1 to R4 is a cyano group; —$CO_2R$; —$SO_3R'$; —CONR"R'"; a substituted or unsubstituted fluoroalkyl group having 1 to 20 carbon atoms; a substituted or unsubstituted alkenyl group having 2 to 20 carbon atoms; a substituted or unsubstituted alkynyl group having 2 to 20 carbon atoms; a substituted or unsubstituted silyl group; a substituted or unsubstituted aryl group having 6 to 30 carbon atoms; a substituted or unsubstituted aryloxy group having 6 to 30 carbon atoms; a substituted or unsubstituted heterocyclic group having 2 to 30 carbon atoms; or a substituted or unsubstituted hydrocarbon ring group having 3 to 30 carbon atoms, or at least one of R5 to R10 is a cyano group; —$CO_2R$; —$SO_3R'$; —CONR"R'"; a substituted or unsubstituted alkyl group having 1 to 20 carbon atoms; a substituted or unsubstituted alkoxy group having 1 to 20 carbon atoms; a substituted or unsubstituted fluoroalkyl group having 1 to 20 carbon atoms; a substituted or unsubstituted alkenyl group having 2 to 20 carbon atoms; a substituted or unsubstituted alkynyl group having 2 to 20 carbon atoms; a substituted or unsubstituted silyl group; a substituted or unsubstituted aryl group having 6 to 30 carbon atoms; a substituted or unsubstituted aryloxy group having 6 to 30 carbon atoms; a substituted or unsubstituted heterocyclic group having 2 to 30 carbon atoms; or a substituted or unsubstituted hydrocarbon ring group having 3 to 30 carbon atoms, and the others are hydrogen; or deuterium, or adjacent groups are bonded to each other to form a substituted or unsubstituted ring.

In an exemplary embodiment of the present specification, at least one of R1 to R4 is a cyano group; —$CO_2R$; —$SO_3R'$; —CONR"R'"; a substituted or unsubstituted trifluoromethyl group; a substituted or unsubstituted phenyl group; a substituted or unsubstituted naphthyl group; a substituted or unsubstituted anthracene group; a substituted or unsubstituted biphenyl group; a substituted or unsubstituted fluorenyl group; a substituted or unsubstituted spirobifluorenyl group; a substituted or unsubstituted phenoxy group; a substituted or unsubstituted silyl group; a substituted or unsubstituted quinoline group; a substituted or unsubstituted quinoxaline group; a substituted or unsubstituted benzofuran group; a substituted or unsubstituted benzothiophene group; a substituted or unsubstituted indole group; a substituted or unsubstituted benzimidazole group; a substituted or unsubstituted tetrahydro naphthalene group; a substituted or unsubstituted dihydro indene group; a substituted or unsubstituted pyridine group; a substituted or unsubstituted dibenzofuran group; a substituted or unsubstituted dibenzothiophene group; a substituted or unsubstituted carbazole group; a substituted or unsubstituted oxazole group; a substituted or unsubstituted thiazole group; a substituted or unsubstituted thiophene group; a substituted or unsubstituted pyrrole group; a substituted or unsubstituted pyridine group; a substituted or unsubstituted benzoxazole group; a substituted or unsubstituted 1,2,3,4-tetrahydronaphthalene group; a substituted or unsubstituted 2,3-dihydro-1H-indene group; a substituted or unsubstituted vinyl group; or a substituted or unsubstituted ethynyl group, or at least one of R5 to R10 is a cyano group; —$CO_2R$; —$SO_3R'$; —CONR"R'"; a substituted or unsubstituted methyl group; a substituted or unsubstituted trifluoromethyl group; a substituted or unsubstituted phenyl group; a substituted or unsubstituted naphthyl group; a substituted or unsubstituted biphenyl group; a substituted or unsubstituted anthracene group; a substituted or unsubstituted fluorenyl group; a substituted or unsubstituted spirobifluorenyl group; a substituted or unsubstituted phenoxy group; a substituted or unsubstituted silyl group; a substituted or unsubstituted quinoline group; a substituted or unsubstituted quinoxaline group; a substituted or unsubstituted benzofuran group; a substituted or unsubstituted benzothiophene group; a substituted or unsubstituted indole group; a substituted or unsubstituted benzimidazole group; a substituted or unsubstituted tetrahydro naphthalene group; a substituted or unsubstituted dihydro indene group; a substituted or unsubstituted pyridine group; a substituted or unsubstituted dibenzofuran group; a substituted or unsubstituted dibenzothiophene group; a substituted or unsubstituted carbazole group; a substituted or unsubstituted oxazole group; a substituted or unsubstituted thiazole group; a substituted or unsubstituted thiophene group; a substituted or unsubstituted pyrrole group; a substituted or unsubstituted pyridine group; a substituted or unsubstituted benzoxazole group; a substituted or unsubstituted 1,2,3,4-tetrahydronaphthalene group; a substituted or unsubstituted 2,3-dihydro-1H-indene group; a substituted or unsubstituted vinyl group; or a substituted or unsubstituted ethynyl group.

In an exemplary embodiment of the present specification, the term "substituted or unsubstituted" means being substituted with one or two or more substituents selected from the group consisting of deuterium; a halogen group; a cyano group; a nitro group; an amino group; a carbonyl group; a carboxyl group (—COOH); an ether group; an ester group; a hydroxy group; a substituted or unsubstituted alkyl group; a substituted or unsubstituted fluoroalkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted silyl group; a substituted or unsubstituted amine group; a substituted or unsubstituted aryl group; and a substituted or unsubstituted heterocyclic group or being substituted with a substituent to which two or more substituents are linked among the substituents exemplified above, or having no substituent.

In an exemplary embodiment of the present specification, the term "substituted or unsubstituted" means being substituted with one or two or more substituents selected from the group consisting of deuterium; a fluorine group; a cyano group; a nitro group; an amino group; a carbonyl group; a carboxyl group (—COOH); an ether group; an ester group; a hydroxy group; a methyl group; a butyl group; a trifluoromethyl group; a perfluoropropyl group; a heptafluorobutyl group; a methoxy group; a cyclohexyloxy group; a phenoxy group; a vinyl group; a triphenylsilyl group; a diphenylamine group; a dimethylamine group; a substituted or unsubstituted phenyl group; a substituted or unsubstituted naphthyl group; a substituted or unsubstituted dihydrobenzoisoquinoline group

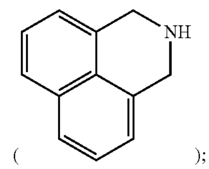

and a substituted or unsubstituted chromenone group

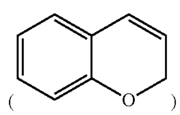

or being substituted with a substituent to which two or more substituents are linked among the substituents exemplified above, or having no substituent.

In an exemplary embodiment of the present specification, the term "substituted or unsubstituted" means being substituted with one or two or more substituents selected from the group consisting of deuterium; a fluorine group; a cyano group; a nitro group; an amino group; a carbonyl group; a carboxyl group (—COOH); an ether group; an ester group; a hydroxy group; a methyl group; a butyl group; a trifluoromethyl group; a perfluoropropyl group; a heptafluorobutyl group; a methoxy group; a cyclohexyloxy group; a phenoxy group; a vinyl group; a triphenylsilyl group; a diphenylamine group; a dimethylamine group; a phenyl group unsubstituted or substituted with an alkyl group; a naphthyl group; a dihydrobenzoisoquinoline group

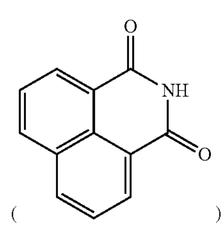 [SMILES: O=C1NC(=O)c2cccc3cccc1c23]

unsubstituted or substituted with a ketone group; and a chromenone group

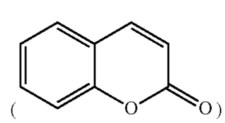 [SMILES: O=c1ccc2ccccc2o1]

unsubstituted or substituted with a ketone group or being substituted with a substituent to which two or more substituents are linked among the substituents exemplified above, or having no substituent.

In an exemplary embodiment of the present specification, R, R', R'', and R''' are the same as or different from each other, and are each independently a substituted or unsubstituted alkyl group; a substituted or unsubstituted fluoroalkyl group; a substituted or unsubstituted alkoxy group; a substituted or unsubstituted alkenyl group; a substituted or unsubstituted alkynyl group; a substituted or unsubstituted silyl group; a substituted or unsubstituted aryl group; a substituted or unsubstituted heterocyclic group; or a substituted or unsubstituted hydrocarbon ring group.

In an exemplary embodiment of the present specification, R, R', R'', and R''' are the same as or different from each other, and are each independently a substituted or unsubstituted alkyl group having 1 to 20 carbon atoms; a substituted or unsubstituted fluoroalkyl group having 1 to 20 carbon atoms; a substituted or unsubstituted alkoxy group having 1 to 20 carbon atoms; a substituted or unsubstituted alkenyl group having 2 to 20 carbon atoms; a substituted or unsubstituted alkynyl group having 2 to 20 carbon atoms; a substituted or unsubstituted silyl group; a substituted or unsubstituted aryl group having 6 to 30 carbon atoms; a substituted or unsubstituted heterocyclic group having 2 to 30 carbon atoms; or a substituted or unsubstituted hydrocarbon ring group having 6 to 30 carbon atoms.

In an exemplary embodiment of the present invention, R, R', R'', and R''' are the same as or different from each other, and are each independently a substituted or unsubstituted methyl group; a substituted or unsubstituted ethyl group; a substituted or unsubstituted propyl group; a substituted or unsubstituted butyl group; a substituted or unsubstituted trifluoromethyl group; a substituted or unsubstituted perfluoropropyl group; a substituted or unsubstituted phenyl group; a substituted or unsubstituted naphthyl group; a substituted or unsubstituted methoxy group; a substituted or unsubstituted dihydrobenzoisoquinoline group; or a substituted or unsubstituted chromenone group.

In an exemplary embodiment of the present specification, at least one of R1 to R10 is a cyano group; a fluoroalkyl group; a substituted or unsubstituted aryl group; a substituted or unsubstituted heterocyclic group; or —$CO_2$R, and R is a substituted or unsubstituted alkyl group or a substituted or unsubstituted heterocyclic group.

In an exemplary embodiment of the present specification, at least one of R1 to R10 is a cyano group; a trifluoromethyl group; a substituted or unsubstituted phenyl group; a substituted or unsubstituted anthracene group; a substituted or unsubstituted fluorenyl group; a substituted or unsubstituted spirobifluorenyl group; a dibenzofuran group; or —$CO_2$R, and R is a substituted or unsubstituted methyl group; a substituted or unsubstituted propyl group; or a substituted or unsubstituted chromenone group.

In an exemplary embodiment of the present specification, at least one of R1 to R10 is a cyano group; an aryl group substituted with one or more substituents selected from the group consisting of a fluoroalkyl group, an aryl group, a silyl group, a nitro group, and an alkoxy group; or —$CO_2$R, and R is a propyl group.

In an exemplary embodiment of the present specification, at least one of R1 to R10 is a cyano group; a phenyl group substituted with a trifluoromethyl group; a diphenylfluorenyl group; a phenyl group substituted with a triphenylsilyl group; a phenyl group substituted with a methoxy group substituted with a phenyl group substituted with a nitro group; or —$CO_2$R, and R is a propyl group.

In an exemplary embodiment of the present specification, X1 and X2 are the same as or different from each other, and are each independently a halogen group; a cyano group; —$CO_2$R''''; a substituted or unsubstituted alkyl group having 1 to 20 carbon atoms; a substituted or unsubstituted alkynyl group having 2 to 20 carbon atoms; a substituted or unsubstituted aryloxy group having 6 to 30 carbon atoms; a substituted or unsubstituted alkoxy group having 1 to 20 carbon atoms; a substituted or unsubstituted aryl group having 6 to 30 carbon atoms; or a substituted or unsubstituted heterocyclic group having 2 to 30 carbon atoms.

In an exemplary embodiment of the present specification, X1 and X2 are the same as or different from each other, and are each independently a fluorine group; a cyano group; —$CO_2$R''''; a methyl group; a hexyl group; a phenoxy group substituted with a nitro group or a propyl group; a methoxy group unsubstituted or substituted with a heptafluoropropyl group; an ethoxy group; a phenyl group unsubstituted or substituted with fluorine group, an ethoxy group or a propyl group; a dimethylfluorenyl group; a thiophene group;

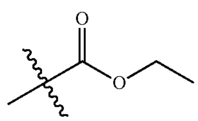

or

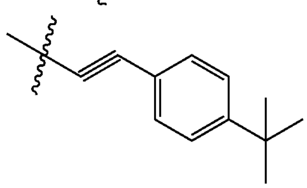

R'''' is a substituted or unsubstituted methyl group; a substituted or unsubstituted ethyl group; a substituted or unsubstituted propyl group; a substituted or unsubstituted butyl group; a substituted or unsubstituted trifluoromethyl group; a substituted or unsubstituted perfluoropropyl group; a substituted or unsubstituted phenyl group; a substituted or unsubstituted naphthyl group; a substituted or unsubstituted methoxy group; a substituted or unsubstituted dihydrobenzoisoquinoline group; or a substituted or unsubstituted chromenone group.

In an exemplary embodiment of the present specification, X1 and X2 are the same as or different from each other, and are each independently a fluorine group; a cyano group; —$CO_2$R''''; a methyl group; a hexyl group; a phenoxy group substituted with a nitro group or a propyl group; a methoxy group unsubstituted or substituted with a heptafluoropropyl group; an ethoxy group; a phenyl group unsubstituted or substituted with fluorine group, an ethoxy group or a propyl group; a dimethylfluorenyl group; a thiophene group; or,

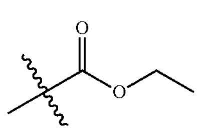

or

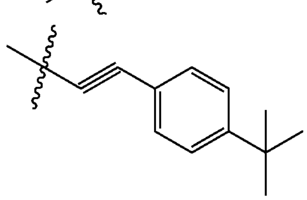

and R'''' is a substituted or unsubstituted perfluoropropyl group; or a substituted or unsubstituted chromenone group.

In an exemplary embodiment of the present specification, X1 and X2 are the same as or different from each other, and are each independently a fluorine group; a cyano group; —$CO_2$R''''; a methyl group; a hexyl group; a phenoxy group substituted with a nitro group or a propyl group; a methoxy group unsubstituted or substituted with a heptafluoropropyl group; an ethoxy group; a phenyl group unsubstituted or substituted with fluorine group, an ethoxy group or a propyl group; a dimethylfluorenyl group; a thiophene group;

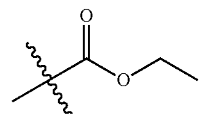

or

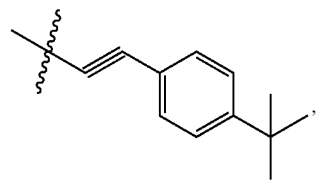

and R'''' is a perfluoropropyl group; or a chromenone group unsubstituted or substituted with a ketone group.

In an exemplary embodiment of the present specification, X1 and X2 are a fluorine group; a cyano group; a methoxy group substituted with a heptafluoropropyl group; a phenoxy group substituted with a nitro group; or

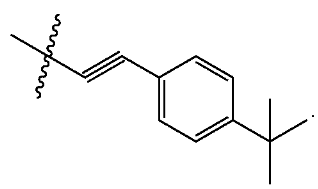 [SMILES: *C#Cc1ccc(C(C)(C)C)cc1]

In an exemplary embodiment of the present specification, X1 and X2 are the same as or different from each other, and are a fluorine group or a cyano group.

In an exemplary embodiment of the present specification, X1 and X2 are a fluorine group.

In an exemplary embodiment of the present specification, Chemical Formula 1 may be represented by any one of the following Chemical Formulae 2 to 8.

[Chemical Formula 2]

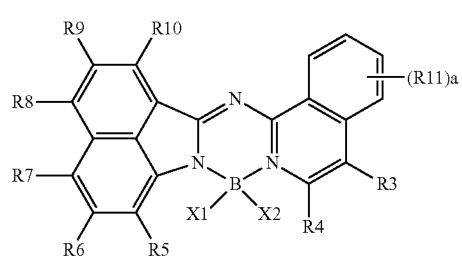

-continued

[Chemical Formula 3]

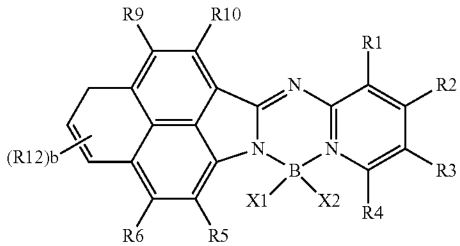

[Chemical Formula 4]

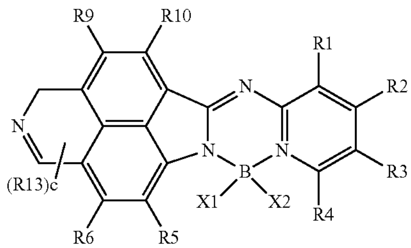

[Chemical Formula 5]

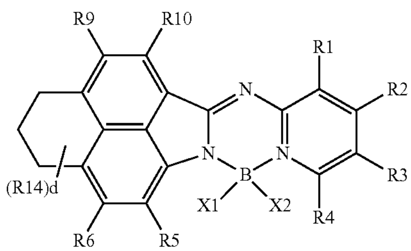

[Chemical Formula 6]

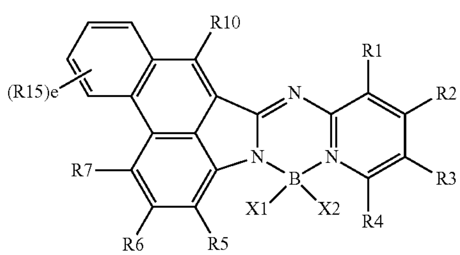

-continued

[Chemical Formula 7]

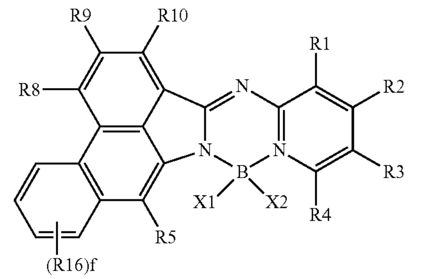

[Chemical Formula 8]

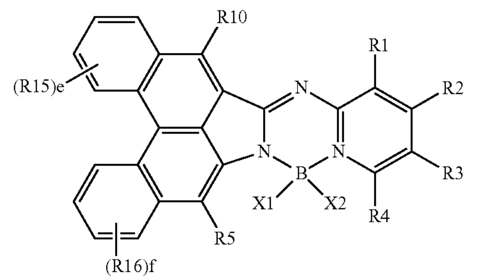

In Chemical Formulae 2 to 8, at least one of R1 to R16 is a cyano group; —$CO_2$R; —$SO_3$R'; —CONR"R'"; a substituted or unsubstituted fluoroalkyl group; a substituted or unsubstituted alkenyl group; a substituted or unsubstituted alkynyl group; a substituted or unsubstituted silyl group; a substituted or unsubstituted aryl group; a substituted or unsubstituted aryloxy group; a substituted or unsubstituted arylamine group; a substituted or unsubstituted heterocyclic group; or a substituted or unsubstituted hydrocarbon ring group, the others are hydrogen; or deuterium, or adjacent groups are bonded to each other to form a substituted or unsubstituted ring, a, b, e, and f are an integer of 0 to 4, c is an integer of 0 to 3, and d is an integer of 0 to 6, and when a to f are 2 or more, substituents in the parenthesis are the same as or different from each other, and the definitions of R, R', R", R'", X1, and X2 are the same as those in Chemical Formula 1.

In an exemplary embodiment of the present specification, R2, R4, R5, R6, and R8 to R10 are hydrogen, and R1, R3, and R7 are represented by the substituents in the following Table.

| Compound | R7 | R3 | R1 | X1 | X2 |
|---|---|---|---|---|---|
| 1-1 | H | 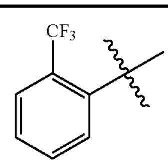 | H | F | F |
| 1-2 | H | 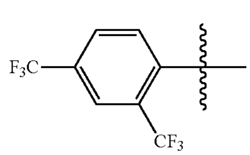 | H | F | F |

-continued
| Compound | R7 | R3 | R1 | X1 | X2 |
|---|---|---|---|---|---|
| 1-3 | H | 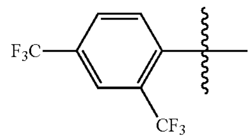 | H | CN | CN |
| 1-4 | H | 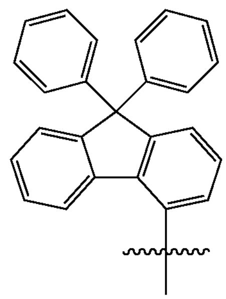 [SMILES: *c1cccc2c1-c1ccccc1C2(c1ccccc1)c1ccccc1] | H | F | F |
| 2-1 | H | 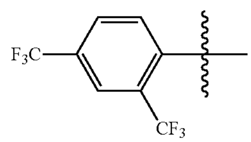 | 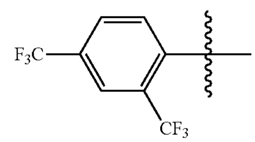 | F | F |
| 2-2 | H | 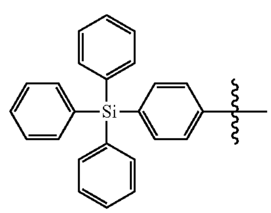 [SMILES: *c1ccc([Si](c2ccccc2)(c2ccccc2)c2ccccc2)cc1] | 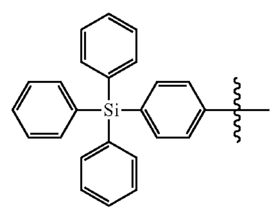 [SMILES: *c1ccc([Si](c2ccccc2)(c2ccccc2)c2ccccc2)cc1] | F | F |
| 2-3 | H | 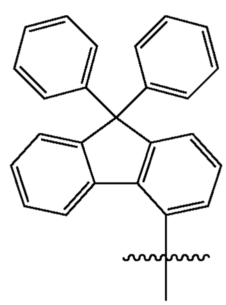 [SMILES: *c1cccc2c1-c1ccccc1C2(c1ccccc1)c1ccccc1] | 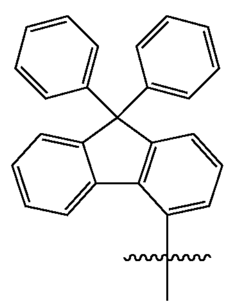 [SMILES: *c1cccc2c1-c1ccccc1C2(c1ccccc1)c1ccccc1] | F | F |
| 2-4 | H | 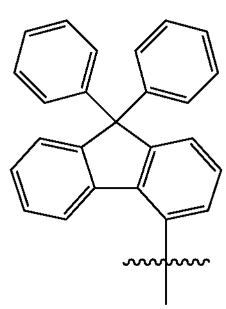 [SMILES: *c1cccc2c1-c1ccccc1C2(c1ccccc1)c1ccccc1] | 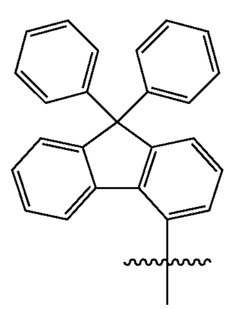 [SMILES: *c1cccc2c1-c1ccccc1C2(c1ccccc1)c1ccccc1] | $C_3F_7CH_2O$— | $C_3F_7CH_2O$— |
| 3-1 | 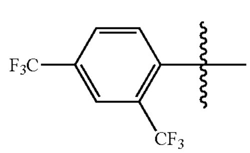 [SMILES: *c1ccc(C(F)(F)F)cc1C(F)(F)F] | H | H | F | F |

-continued
| Compound | R7 | R3 | R1 | X1 | X2 |
|---|---|---|---|---|---|
| 3-2 | 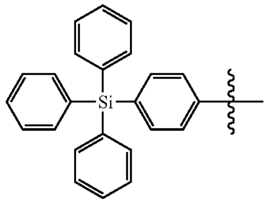 [SMILES: *c1ccc([Si](c2ccccc2)(c2ccccc2)c2ccccc2)cc1] | H | H | F | F |
| 3-3 | 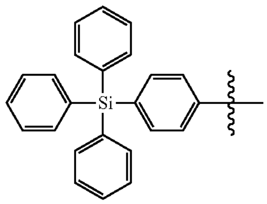 [SMILES: *c1ccc([Si](c2ccccc2)(c2ccccc2)c2ccccc2)cc1] | H | H | CN | CN |
| 3-4 | 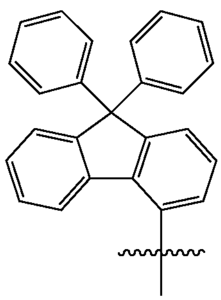 [SMILES: *c1cccc2c1-c1ccccc1C2(c1ccccc1)c1ccccc1] | H | H | F | F |
| 4-1 | 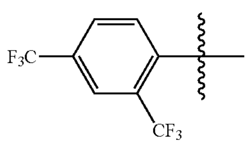 | 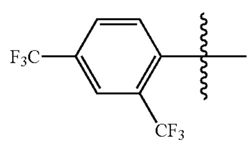 | H | F | F |
| 4-2 | 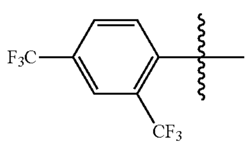 | 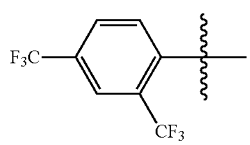 | H | 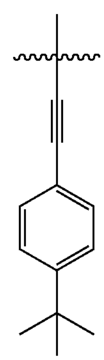 [SMILES: *C#Cc1ccc(C(C)(C)C)cc1] | 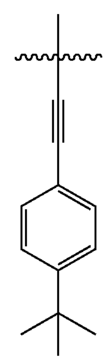 |
| 4-3 | 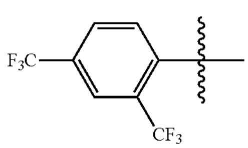 | 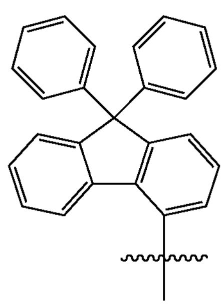 [SMILES: *c1cccc2c1-c1ccccc1C2(c1ccccc1)c1ccccc1] | H | F | F |

-continued
| Compound | R7 | R3 | R1 | X1 | X2 |
| --- | --- | --- | --- | --- | --- |
| 4-4 | 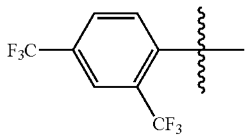 [SMILES: *c1ccc(C(F)(F)F)cc1C(F)(F)F] | 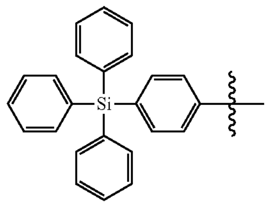 [SMILES: *c1ccc([Si](c2ccccc2)(c2ccccc2)c2ccccc2)cc1] | H | F | F |
| 4-5 | 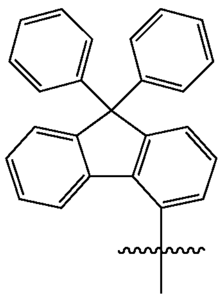 [SMILES: *c1cccc2c1-c1ccccc1C2(c1ccccc1)c1ccccc1] | 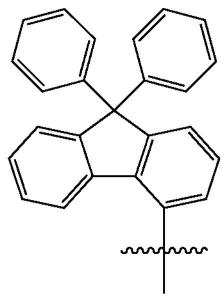 [SMILES: *c1cccc2c1-c1ccccc1C2(c1ccccc1)c1ccccc1] | H | F | F |
| 4-6 | 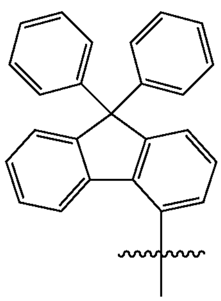 [SMILES: *c1cccc2c1-c1ccccc1C2(c1ccccc1)c1ccccc1] | 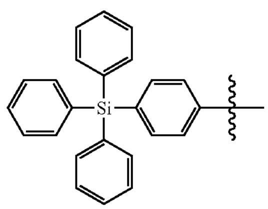 [SMILES: *c1ccc([Si](c2ccccc2)(c2ccccc2)c2ccccc2)cc1] | H | F | F |
| 4-7 | 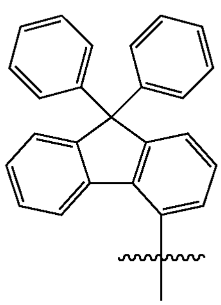 [SMILES: *c1cccc2c1-c1ccccc1C2(c1ccccc1)c1ccccc1] | 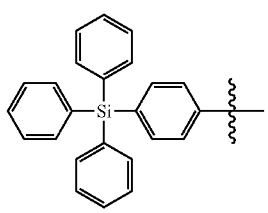 [SMILES: *c1ccc([Si](c2ccccc2)(c2ccccc2)c2ccccc2)cc1] | H | 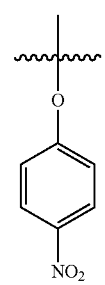 [SMILES: *Oc1ccc([N+](=O)[O-])cc1] | 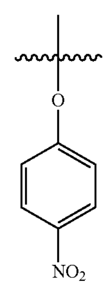 |
| 4-7 | 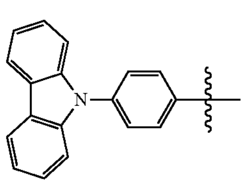 [SMILES: *c1ccc(-n2c3ccccc3c3ccccc32)cc1] | 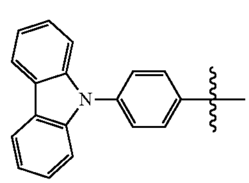 [SMILES: *c1ccc(-n2c3ccccc3c3ccccc32)cc1] | H | F | F |
| 4-8 | 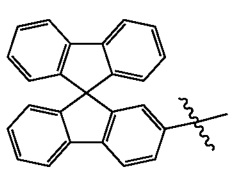 [SMILES: *c1ccc2c(c1)C1(c3ccccc3-c3ccccc31)c1ccccc1-2] | 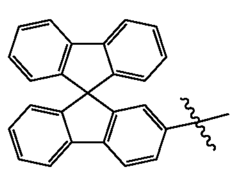 [SMILES: *c1ccc2c(c1)C1(c3ccccc3-c3ccccc31)c1ccccc1-2] | H | F | F |

-continued
| Compound | R7 | R3 | R1 | X1 | X2 |
| --- | --- | --- | --- | --- | --- |
| 4-9 | 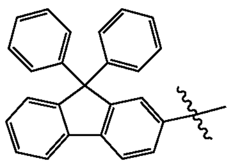 [SMILES: *c1ccc2c(c1)C(c1ccccc1)(c1ccccc1)c1ccccc1-2] | 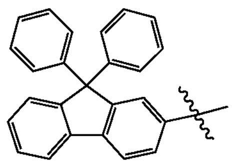 [SMILES: *c1ccc2c(c1)C(c1ccccc1)(c1ccccc1)c1ccccc1-2] | H | F | F |
| 4-10 | 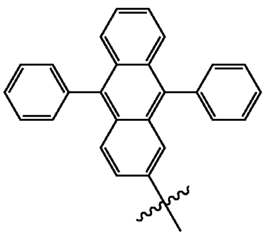 [SMILES: *c1ccc2c(-c3ccccc3)c3ccccc3c(-c3ccccc3)c2c1] | 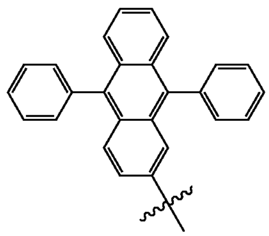 [SMILES: *c1ccc2c(-c3ccccc3)c3ccccc3c(-c3ccccc3)c2c1] | H | F | F |
| 4-11 | 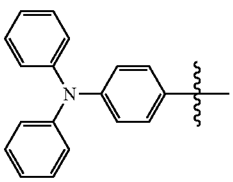 [SMILES: *c1ccc(N(c2ccccc2)c2ccccc2)cc1] | 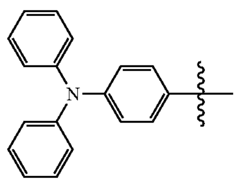 [SMILES: *c1ccc(N(c2ccccc2)c2ccccc2)cc1] | H | F | F |
| 5-1 | 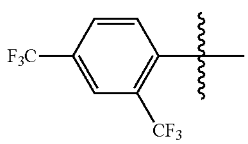 | 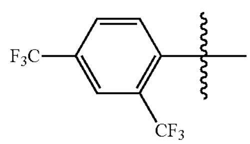 | CN | F | F |
| 5-2 | 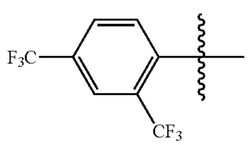 [SMILES: *c1ccc(C(F)(F)F)cc1C(F)(F)F] | $CF_3$ | 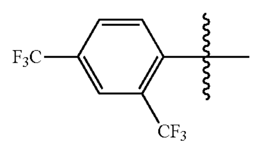 [SMILES: *c1ccc(C(F)(F)F)cc1C(F)(F)F] | F | F |
| 5-3 | 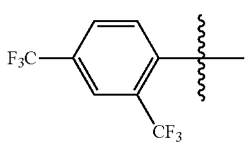 [SMILES: *c1ccc(C(F)(F)F)cc1C(F)(F)F] | CN | 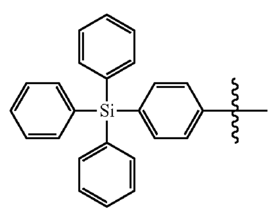 [SMILES: *c1ccc([Si](c2ccccc2)(c2ccccc2)c2ccccc2)cc1] | F | F |
| 5-4 | 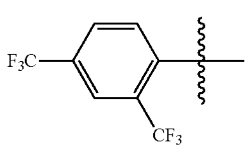 | 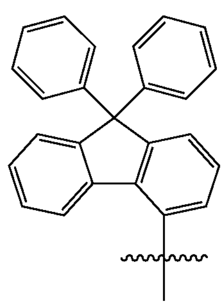 [SMILES: *c1cccc2c1-c1ccccc1C2(c1ccccc1)c1ccccc1] | 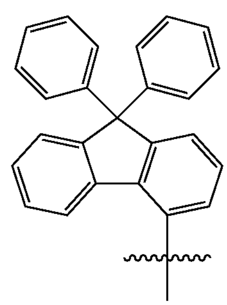 [SMILES: *c1cccc2c1-c1ccccc1C2(c1ccccc1)c1ccccc1] | F | F |

-continued
| Compound | R7 | R3 | R1 | X1 | X2 |
|---|---|---|---|---|---|
| 5-5 | 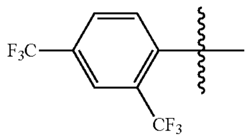 | 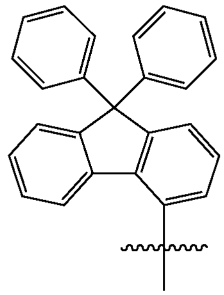 [SMILES: *c1cccc2c1-c1ccccc1C2(c1ccccc1)c1ccccc1] | 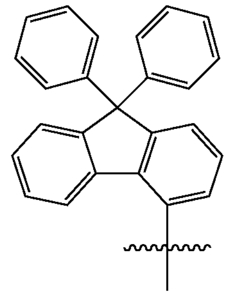 [SMILES: *c1cccc2c1-c1ccccc1C2(c1ccccc1)c1ccccc1] | CN | CN |
| 5-6 | 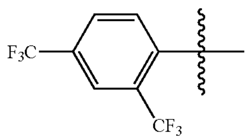 [SMILES: *c1ccc(C(F)(F)F)cc1C(F)(F)F] | 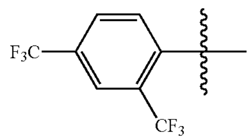 [SMILES: *c1ccc(C(F)(F)F)cc1C(F)(F)F] | 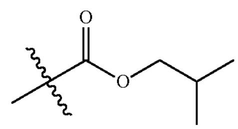 [SMILES: *C(=O)OCC(C)C] | F | F |
| 5-7 | 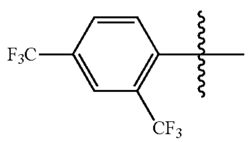 | CN | 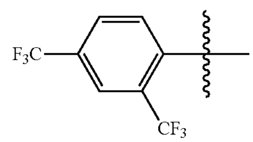 | F | F |
| 5-8 | 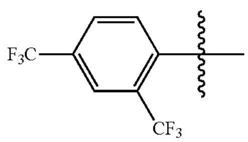 | 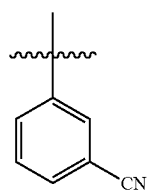 [SMILES: *c1cccc(C#N)c1] | 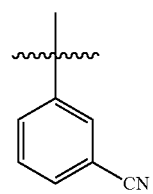 [SMILES: *c1cccc(C#N)c1] | F | F |
| 5-9 | 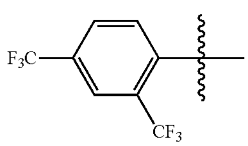 | 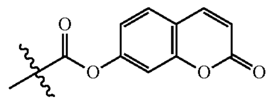 [SMILES: *C(=O)Oc1ccc2ccc(=O)oc2c1] | 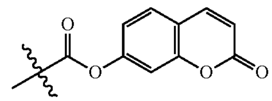 [SMILES: *C(=O)Oc1ccc2ccc(=O)oc2c1] | F | F |
| 5-10 | 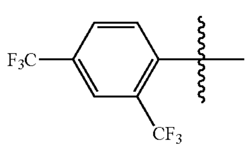 [SMILES: *c1ccc(C(F)(F)F)cc1C(F)(F)F] | 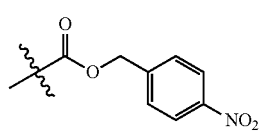 [SMILES: *C(=O)OCc1ccc([N+](=O)[O-])cc1] | 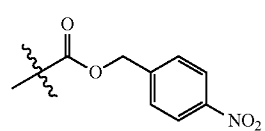 [SMILES: *C(=O)OCc1ccc([N+](=O)[O-])cc1] | F | F |
| 5-11 | 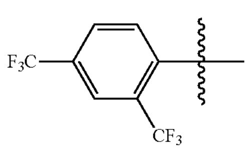 | 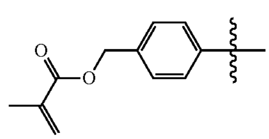 [SMILES: *c1ccc(COC(=O)C(=C)C)cc1] | 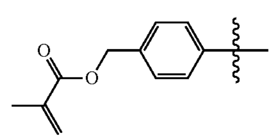 [SMILES: *c1ccc(COC(=O)C(=C)C)cc1] | F | F |
| 5-12 | 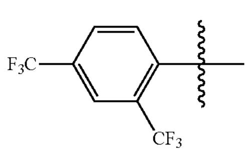 | 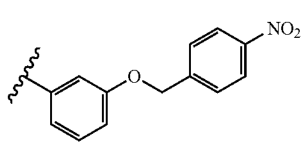 [SMILES: *c1cccc(OCc2ccc([N+](=O)[O-])cc2)c1] | 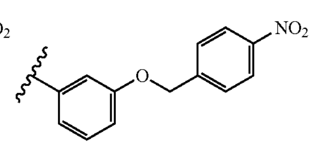 | F | F |

-continued
| Compound | R7 | R3 | R1 | X1 | X2 |
|---|---|---|---|---|---|
| 5-13 | 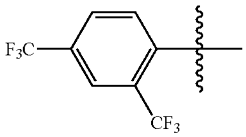 [SMILES: *c1ccc(C(F)(F)F)cc1C(F)(F)F] | 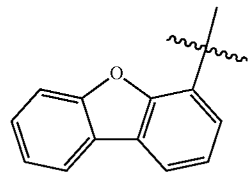 [SMILES: *c1cccc2c1oc1ccccc12] | 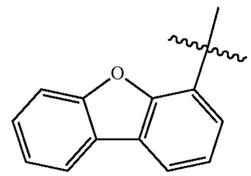 [SMILES: *c1cccc2c1oc1ccccc12] | F | F |
| 5-14 | 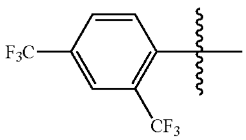 | 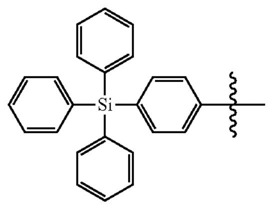 [SMILES: *c1ccc([Si](c2ccccc2)(c2ccccc2)c2ccccc2)cc1] | 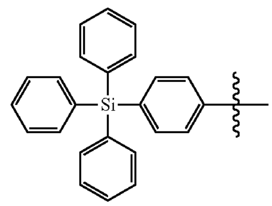 [SMILES: *c1ccc([Si](c2ccccc2)(c2ccccc2)c2ccccc2)cc1] | F | F |
| 5-15 | 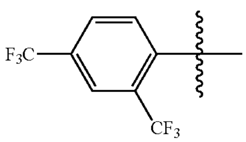 [SMILES: *c1ccc(C(F)(F)F)cc1C(F)(F)F] | $CF_3$ | 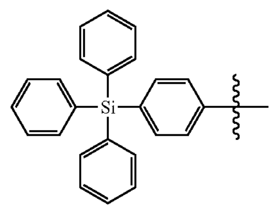 [SMILES: *c1ccc([Si](c2ccccc2)(c2ccccc2)c2ccccc2)cc1] | F | F |
| 6-1 | CN | 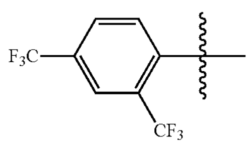 | 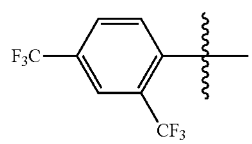 | F | F |
| 6-2 | CN | 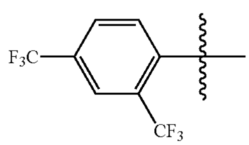 [SMILES: *c1ccc(C(F)(F)F)cc1C(F)(F)F] | 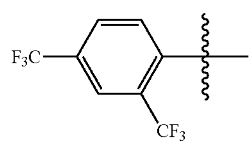 [SMILES: *c1ccc(C(F)(F)F)cc1C(F)(F)F] | 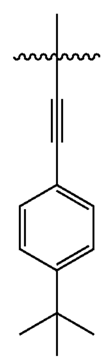 [SMILES: *C#Cc1ccc(C(C)(C)C)cc1] | 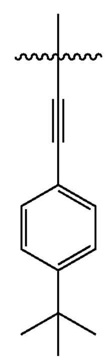 |
| 6-3 | 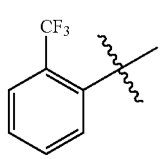 | 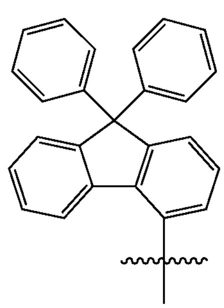 [SMILES: *c1cccc2c1-c1ccccc1C2(c1ccccc1)c1ccccc1] | 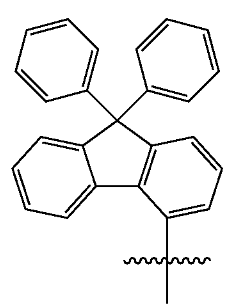 [SMILES: *c1cccc2c1-c1ccccc1C2(c1ccccc1)c1ccccc1] | F | F |

-continued

| Com-pound | R7 | R3 | R1 | X1 | X2 |
|---|---|---|---|---|---|
| 6-4 | 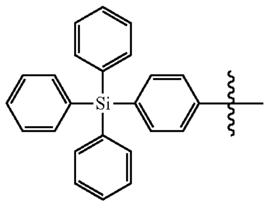 [SMILES: *c1ccc([Si](c2ccccc2)(c2ccccc2)c2ccccc2)cc1] | 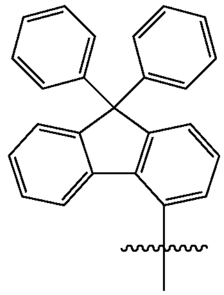 [SMILES: *c1cccc2c1-c1ccccc1C2(c1ccccc1)c1ccccc1] | 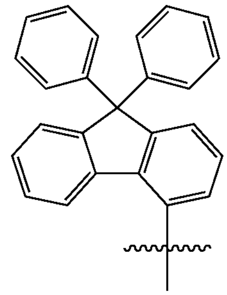 [SMILES: *c1cccc2c1-c1ccccc1C2(c1ccccc1)c1ccccc1] | F | F |
| 6-5 | 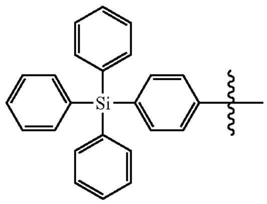 [SMILES: *c1ccc([Si](c2ccccc2)(c2ccccc2)c2ccccc2)cc1] | 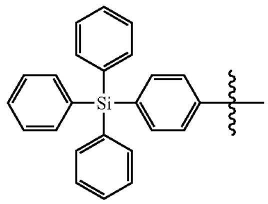 [SMILES: *c1ccc([Si](c2ccccc2)(c2ccccc2)c2ccccc2)cc1] | 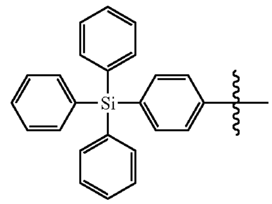 [SMILES: *c1ccc([Si](c2ccccc2)(c2ccccc2)c2ccccc2)cc1] | F | F |
| 6-6 | 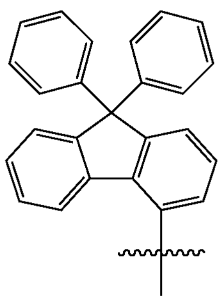 [SMILES: *c1cccc2c1-c1ccccc1C2(c1ccccc1)c1ccccc1] | $CF_3$ | 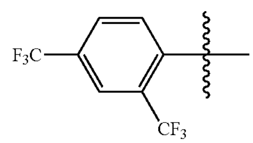 [SMILES: *c1ccc(C(F)(F)F)cc1C(F)(F)F] | F | F |
| 6-7 | 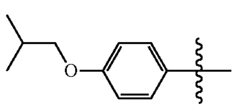 [SMILES: *c1ccc(OCC(C)C)cc1] | 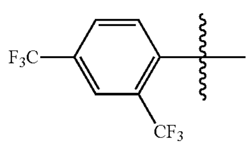 | 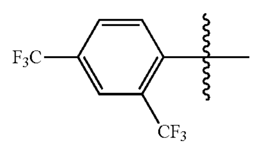 | F | F |

In an exemplary embodiment of the present specification, the compound of Chemical Formula 1 is represented by Chemical Formula 2, R7 is a phenyl group unsubstituted or substituted with a fluoroalkyl group, R3 to R6 and R8 to R11 are hydrogen, and X1 and X2 are the same as or different from each other, and are each independently a halogen group or a cyano group.

In an exemplary embodiment of the present specification, the compound of Chemical Formula 1 is represented by Chemical Formula 2, R7 is a phenyl group unsubstituted or substituted with a trifluoromethyl group, R3 to R6 and R8 to R11 are hydrogen, and X1 and X2 are the same as or different from each other, and are each independently a halogen group or a cyano group.

In an exemplary embodiment of the present specification, the compound of Chemical Formula 1 is represented by Chemical Formula 2, R7 is a phenyl group unsubstituted or substituted with a trifluoromethyl group, R3 to R6 and R8 to R11 are hydrogen, and X1 and X2 are F or a cyano group.

In an exemplary embodiment of the present specification, the compound of Chemical Formula 1 is represented by Chemical Formula 2, R7 is a phenyl group substituted with a trifluoromethyl group, R3 to R6 and R8 to R11 are hydrogen, and X1 and X2 are F.

In an exemplary embodiment of the present specification, the compound of Chemical Formula 1 is represented by Chemical Formula 2, R7 and R11 are an aryl group unsubstituted or substituted with a fluoroalkyl group, a is 1, R3 to R6 and R8 to R10 are hydrogen, and X1 and X2 are the same as or different from each other, and are each independently a halogen group or a cyano group.

In an exemplary embodiment of the present specification, the compound of Chemical Formula 1 is represented by Chemical Formula 2, R7 and R11 are a phenyl group unsubstituted or substituted with a trifluoromethyl group, a is 1, R3 to R6 and R8 to R10 are hydrogen, and X1 and X2 are the same as or different from each other, and are each independently a halogen group or a cyano group.

In an exemplary embodiment of the present specification, the compound of Chemical Formula 1 is represented by Chemical Formula 2, R7 and R11 are a phenyl group unsubstituted or substituted with a trifluoromethyl group, a is 1, R3 to R6 and R8 to R10 are hydrogen, and X1 and X2 are F or a cyano group.

In an exemplary embodiment of the present specification, the compound of Chemical Formula 1 is represented by Chemical Formula 2, R7 and R11 are a phenyl group substituted with a trifluoromethyl group, a is 1, R3 to R6 and R8 to R10 are hydrogen, and X1 and X2 are F.

In an exemplary embodiment of the present specification, the compound of Chemical Formula 1 is represented by Chemical Formula 7, R10 is a substituted or unsubstituted alkoxy group, R1 to R5, R8, R9, and R16 are hydrogen, and X1 and X2 are the same as or different from each other, and are each independently a halogen group or a cyano group.

In an exemplary embodiment of the present specification, the compound of Chemical Formula 1 is represented by Chemical Formula 7, R10 is a substituted or unsubstituted methoxy group, R1 to R5, R8, R9, and R16 are hydrogen, and X1 and X2 are the same as or different from each other, and are each independently F or a cyano group.

In an exemplary embodiment of the present specification, the compound of Chemical Formula 1 is represented by Chemical Formula 7, R10 is a methoxy group, R1 to R5, R8, R9, and R16 are hydrogen, and X1 and X2 are F.

In an exemplary embodiment of the present specification, the compound of Chemical Formula 1 is represented by Chemical Formula 7, R8 and R9 are a substituted or unsubstituted alkoxy group, R1 to R5, R10, and R16 are hydrogen, and X1 and X2 are the same as or different from each other, and are each independently a halogen group or a cyano group.

In an exemplary embodiment of the present specification, the compound of Chemical Formula 1 is represented by Chemical Formula 7, R8 and R9 are a substituted or unsubstituted alkoxy group, R1 to R5, R10, and R16 are hydrogen, and X1 and X2 are the same as or different from each other, and are each independently F or a cyano group.

In an exemplary embodiment of the present specification, the compound of Chemical Formula 1 is represented by Chemical Formula 7, R8 and R9 are a methoxy group, R1 to R5, R10, and R16 are hydrogen, and X1 and X2 are F.

In an exemplary embodiment of the present specification, the compound of Chemical Formula 1 is represented by Chemical Formula 7, R10 is a substituted or unsubstituted alkoxy group, R3 is a substituted or unsubstituted aryl group, R1, R2, R4, R5, R8, R9, and R16 are hydrogen, and X1 and X2 are the same as or different from each other, and are each independently a halogen group or a cyano group.

In an exemplary embodiment of the present specification, the compound of Chemical Formula 1 is represented by Chemical Formula 7, R10 is a substituted or unsubstituted methoxy group, R3 is an aryl group unsubstituted or substituted with a fluoroalkyl group, R1, R2, R4, R5, R8, R9, and R16 are hydrogen, and X1 and X2 are the same as or different from each other, and are each independently F or a cyano group.

In an exemplary embodiment of the present specification, the compound of Chemical Formula 1 is represented by Chemical Formula 7, R10 is a methoxy group, R3 is a phenyl group substituted with a trifluoromethyl group, R1, R2, R4, R5, R8, R9, and R16 are hydrogen, and X1 and X2 are F.

In an exemplary embodiment of the present specification, the compound of Chemical Formula 1 is represented by Chemical Formula 7, R10 is a substituted or unsubstituted alkoxy group, R1 and R3 are a substituted or unsubstituted aryl group, R2, R4, R5, R8, R9, and R16 are hydrogen, and X1 and X2 are the same as or different from each other, and are each independently a halogen group or a cyano group.

In an exemplary embodiment of the present specification, the compound of Chemical Formula 1 is represented by Chemical Formula 7, R10 is a substituted or unsubstituted methoxy group, R1 and R3 are an aryl group unsubstituted or substituted with a fluoroalkyl group, R2, R4, R5, R8, R9, and R16 are hydrogen, and X1 and X2 are the same as or different from each other, and are each independently F or a cyano group.

In an exemplary embodiment of the present specification, the compound of Chemical Formula 1 is represented by Chemical Formula 7, R10 is a methoxy group, R1 and R3 are a phenyl group substituted with a trifluoromethyl group, R2, R4, R5, R8, R9, and R16 are hydrogen, and X1 and X2 are F.

In an exemplary embodiment of the present specification, R2, R4, R5, R6, and R8 to R10 are hydrogen.

In an exemplary embodiment of the present specification, at least one of R1, R3, and R7 is a substituted or unsubstituted aryl group.

In an exemplary embodiment of the present specification, at least one of R1, R3, and R7 is an aryl group unsubstituted or substituted with one or more substituents selected from the group consisting of a fluoroalkyl group, a silyl group, an alkoxy group, an aryl group, and a nitro group.

In an exemplary embodiment of the present specification, at least one of R1, R3, and R7 is a phenyl group unsubstituted or substituted with one or more substituents selected from the group consisting of a fluoroalkyl group, a silyl group, an alkoxy group, an aryl group, and a nitro group; or a fluorene group unsubstituted or substituted with one or more substituents selected from the group consisting of a fluoroalkyl group, a silyl group, an alkoxy group, an aryl group, and a nitro group.

In an exemplary embodiment of the present specification, at least one of R1, R3, and R7 is an aryl group unsubstituted or substituted with one or more substituents selected from the group consisting of a trifluoromethyl group, a triphenylsilyl group, a methoxy group, a phenyl group, and a nitro group; or a fluorene group unsubstituted or substituted with a phenyl group.

In an exemplary embodiment of the present specification, at least one of R1, R3, and R7 is a phenyl group unsubstituted or substituted with one or more substituents selected from the group consisting of a trifluoromethyl group, a triphenylsilyl group, a methoxy group, a phenyl group, and a nitro group; or a diphenylfluorene group.

In an exemplary embodiment of the present specification, Chemical Formula 1 is represented by the following structural formulae.

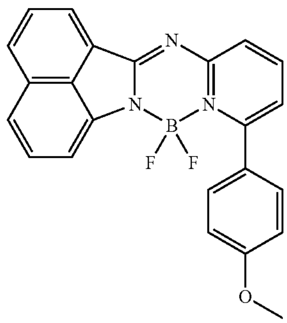
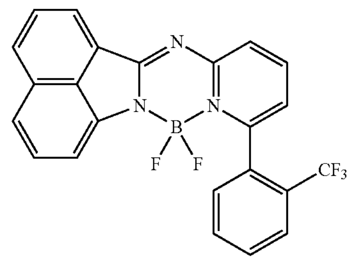
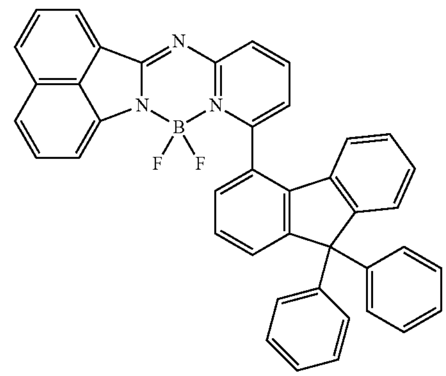
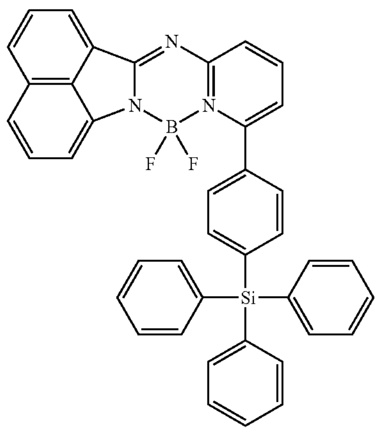
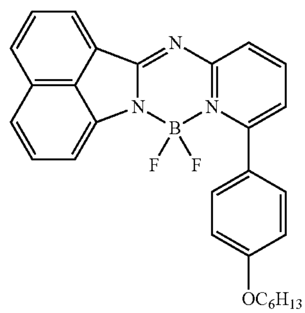
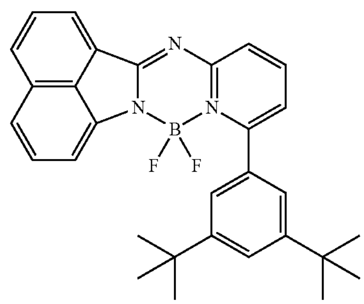
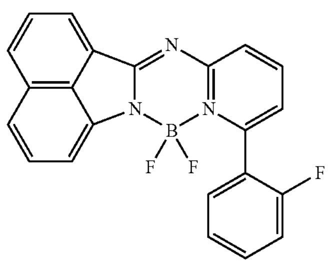
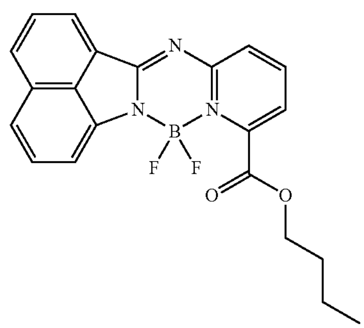
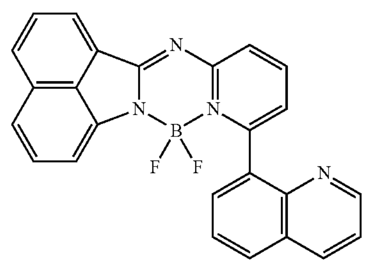
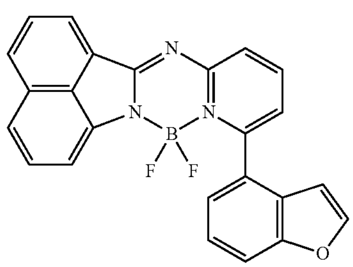
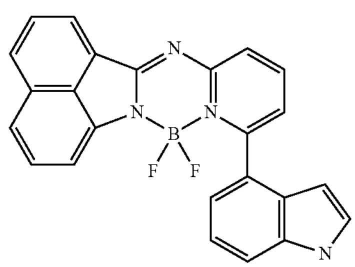
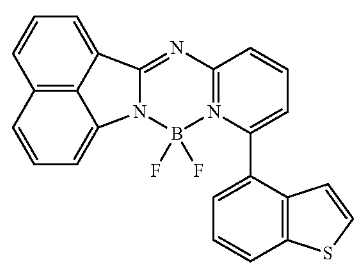
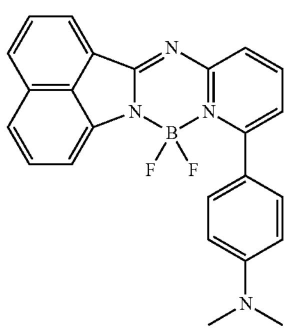
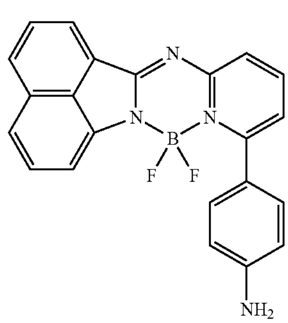
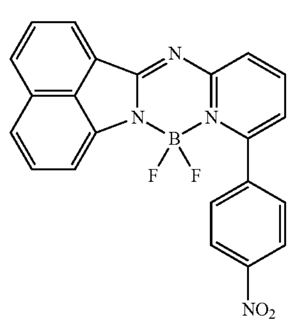

-continued
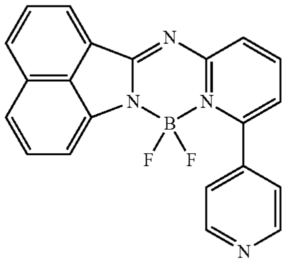
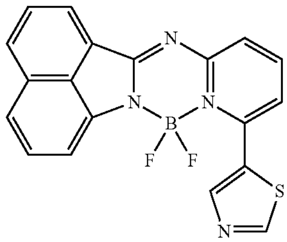
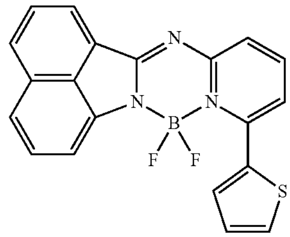
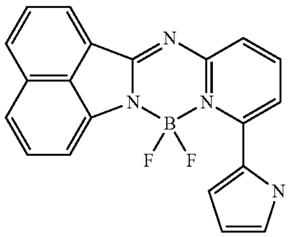
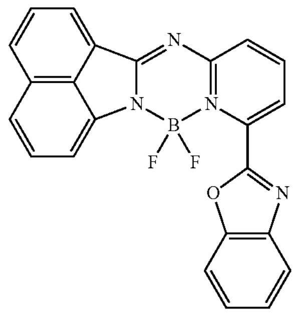
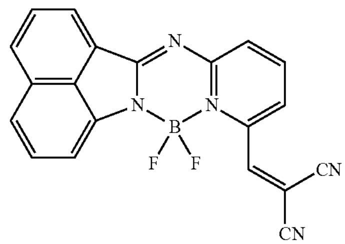
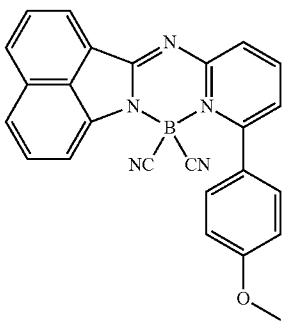
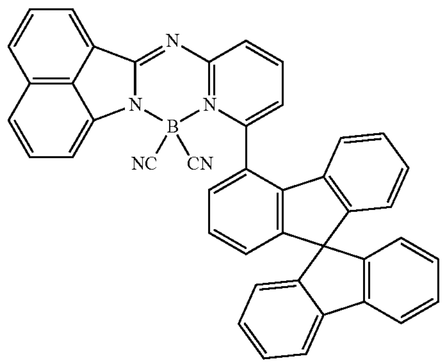
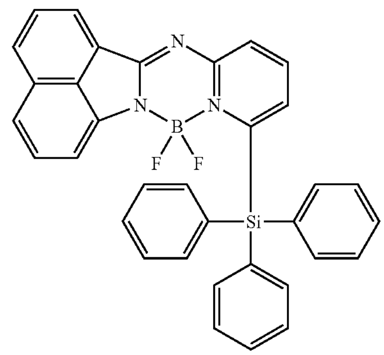
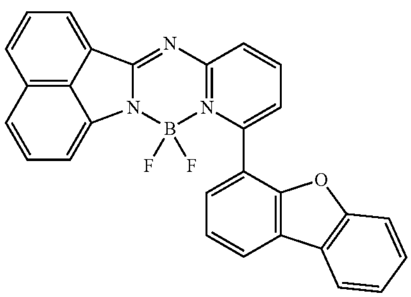
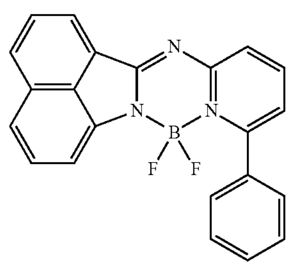
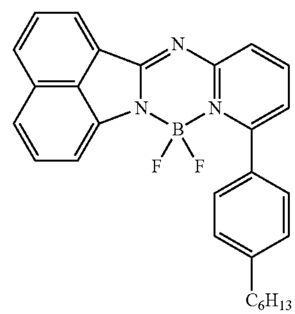
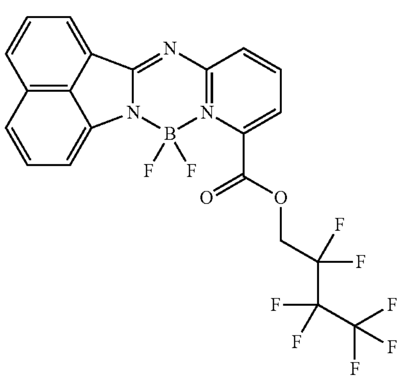
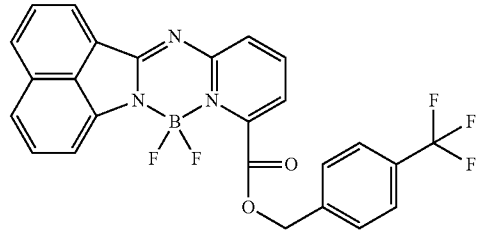

-continued
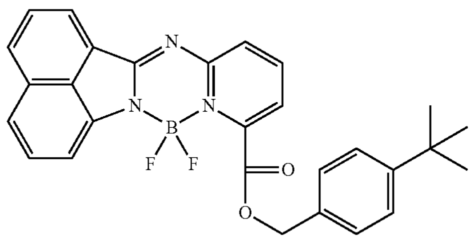
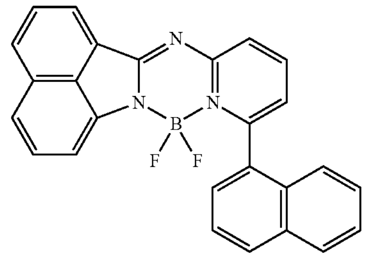
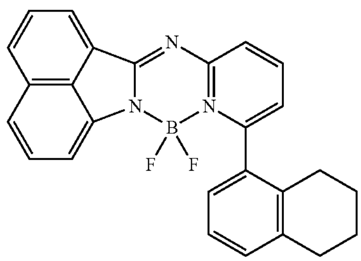
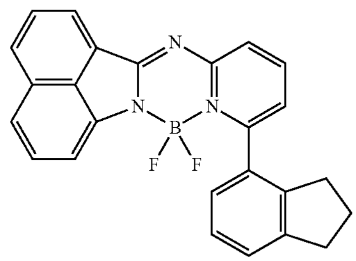
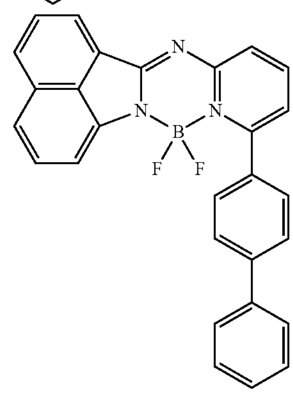
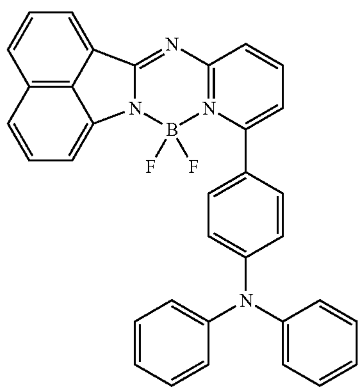
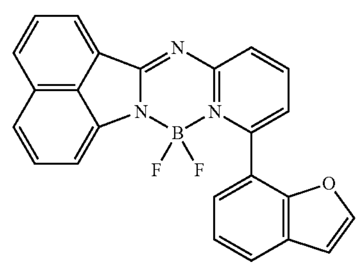
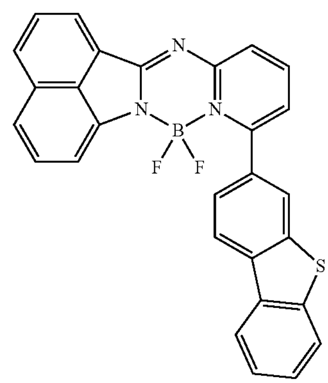
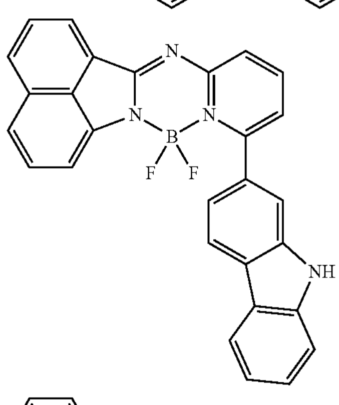
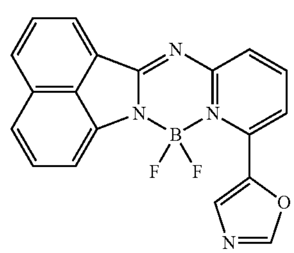
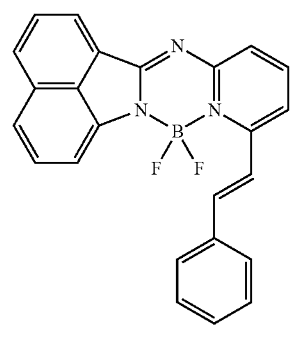
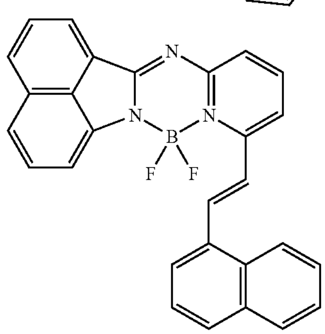
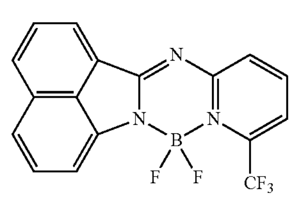
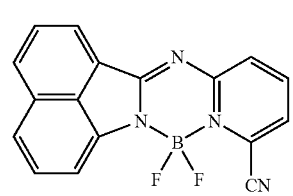

-continued
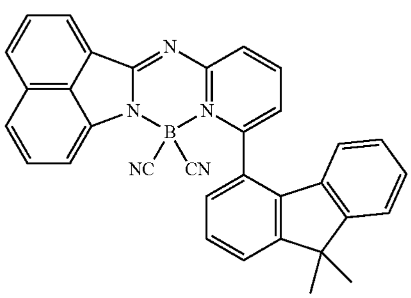
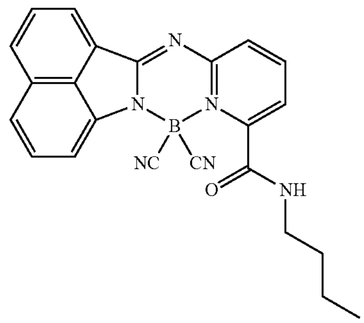
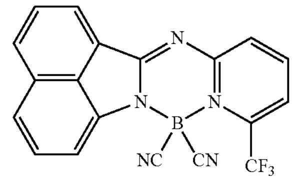
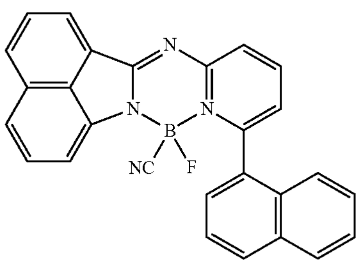
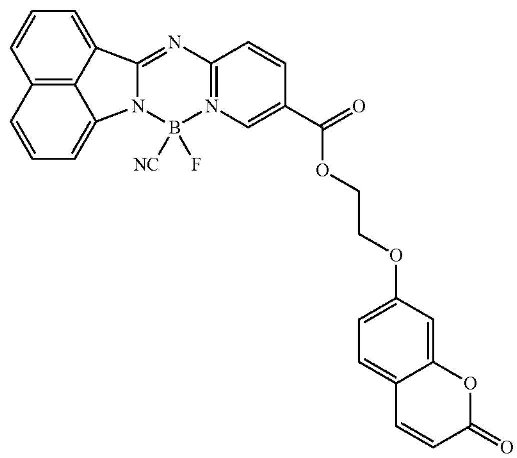
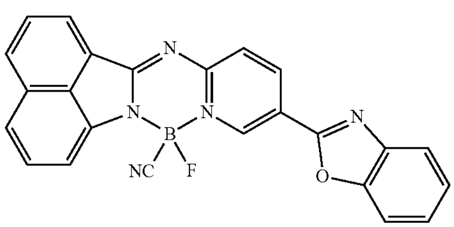
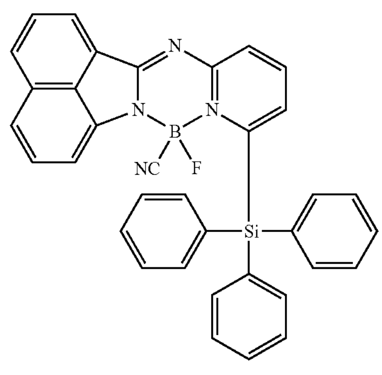
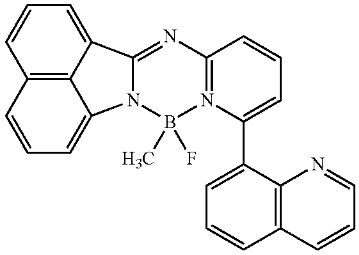
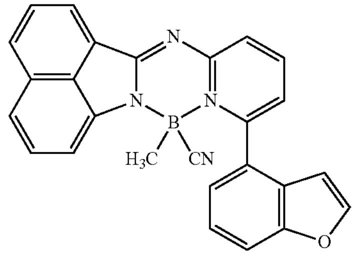
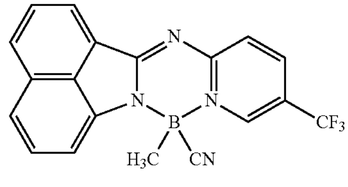

-continued
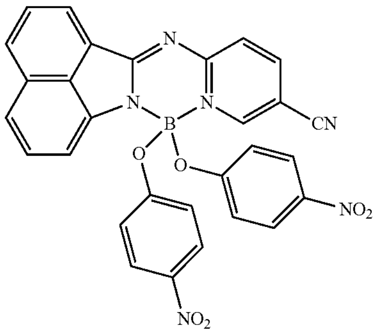
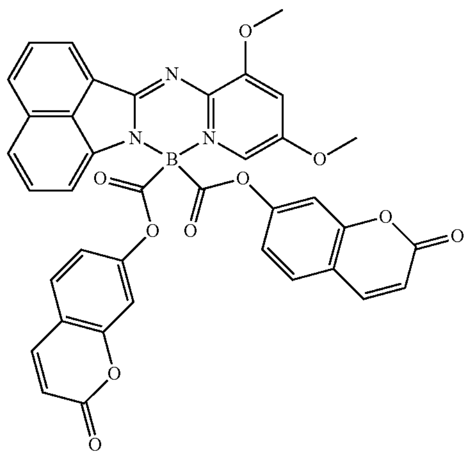
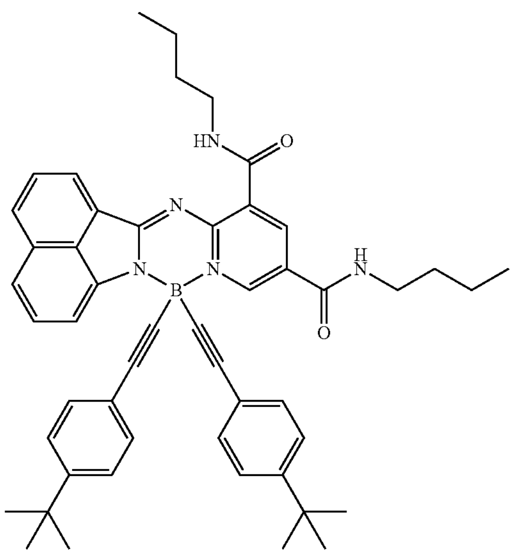
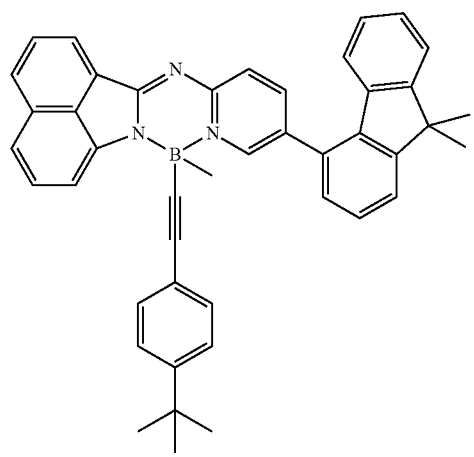
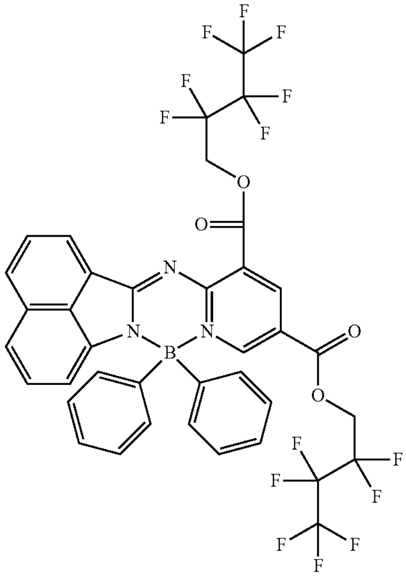
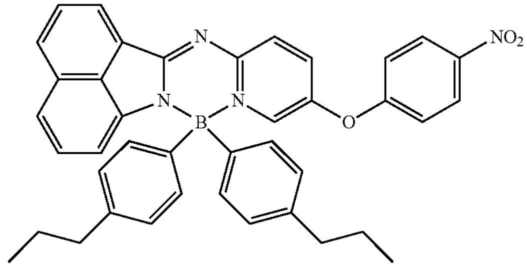

-continued
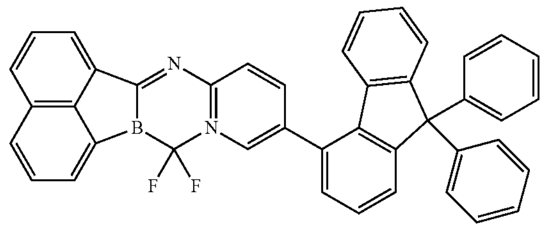
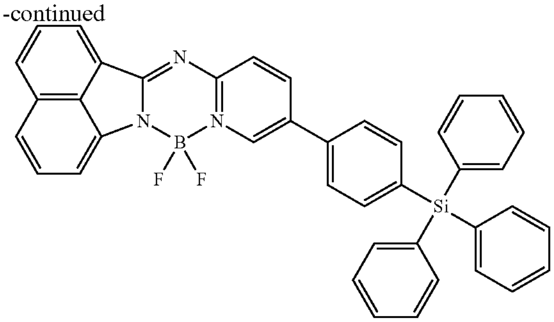
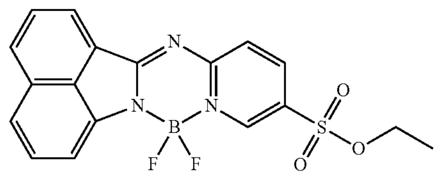
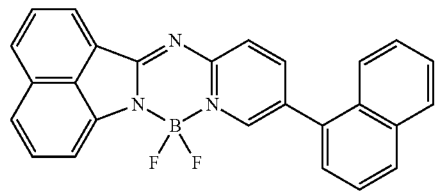
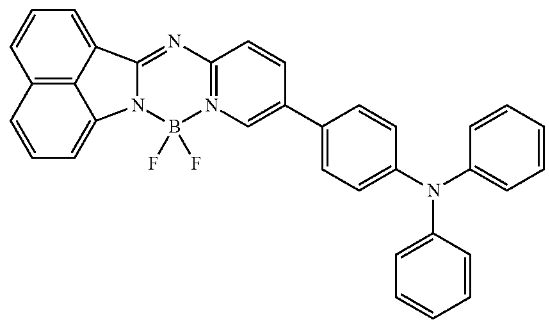
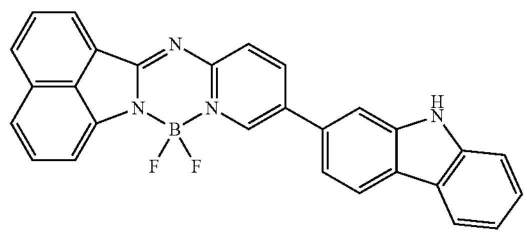
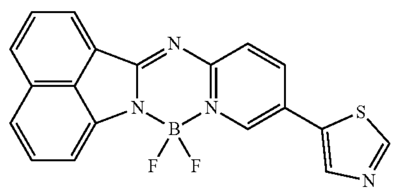
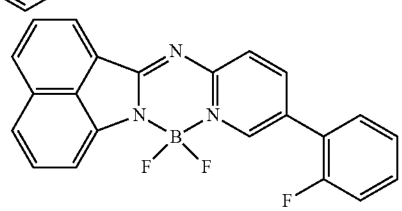
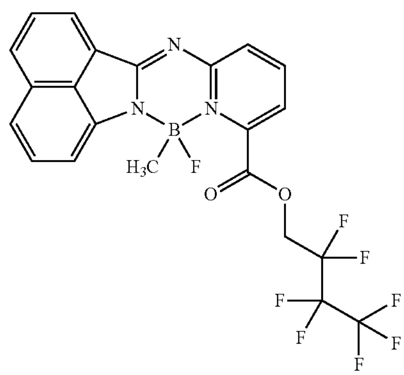
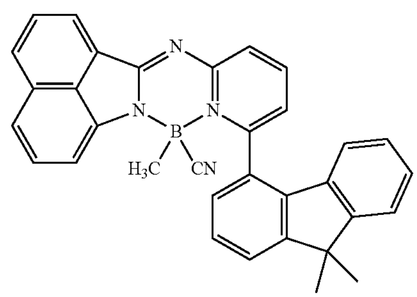
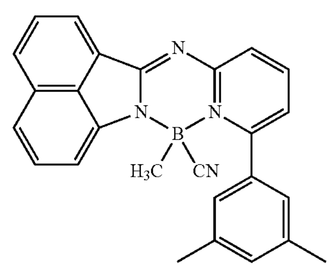
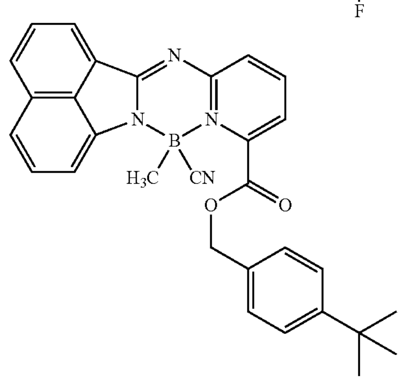
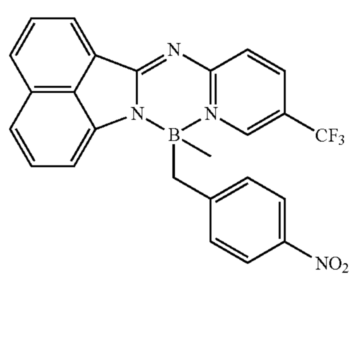

-continued
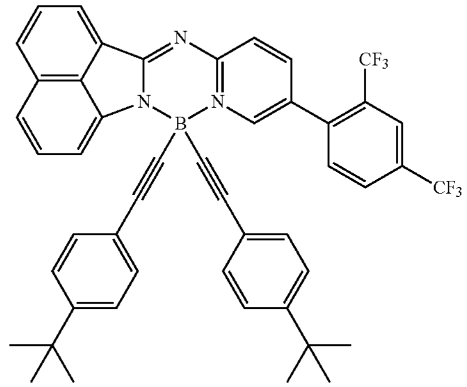
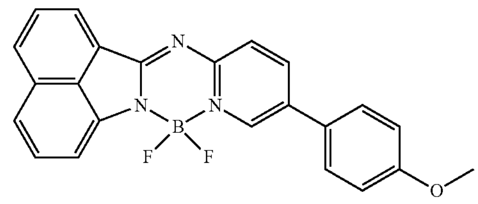
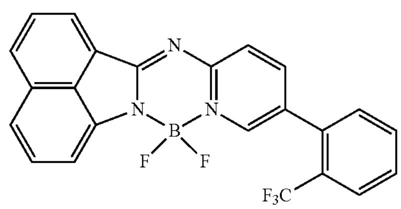
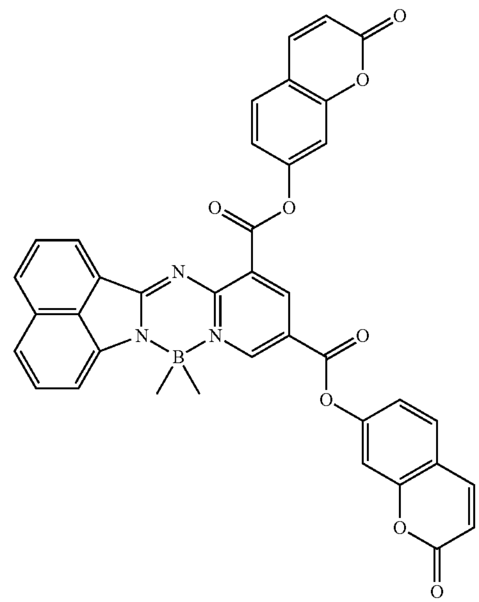
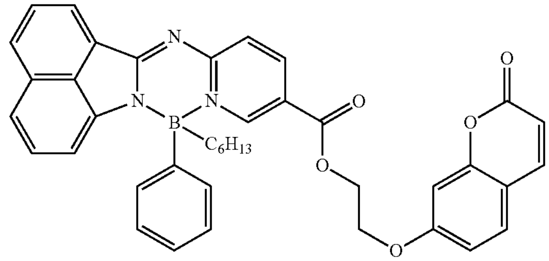
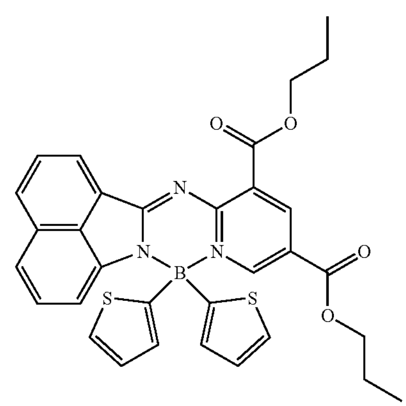
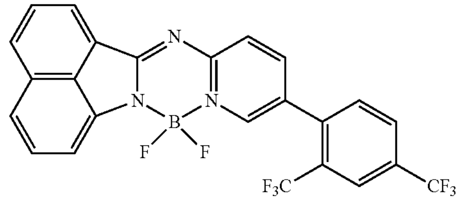
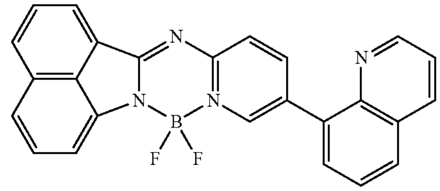

-continued
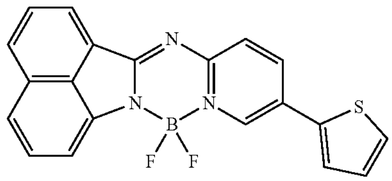
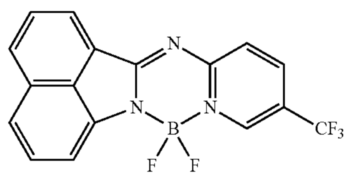
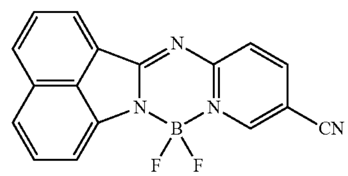
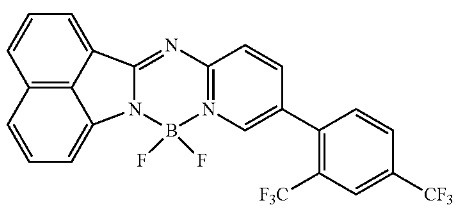
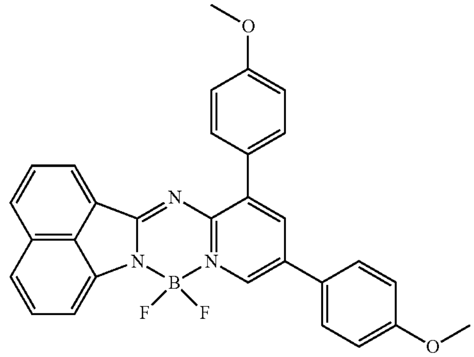
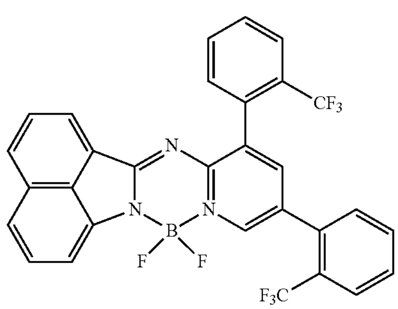
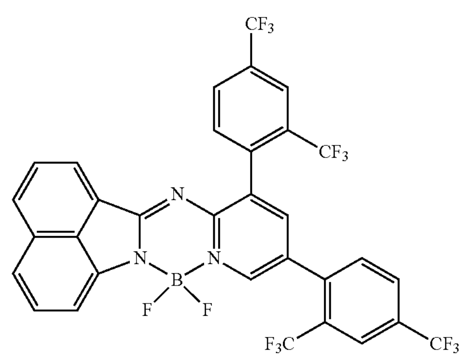
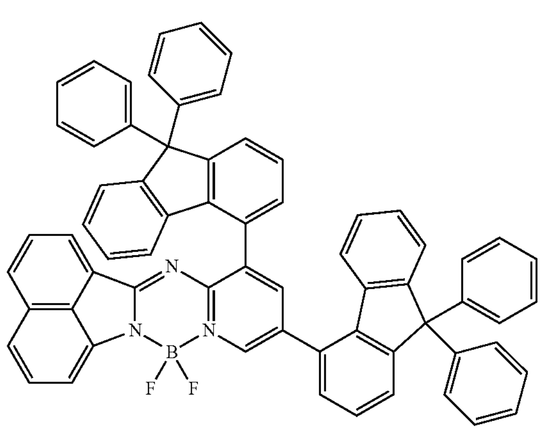
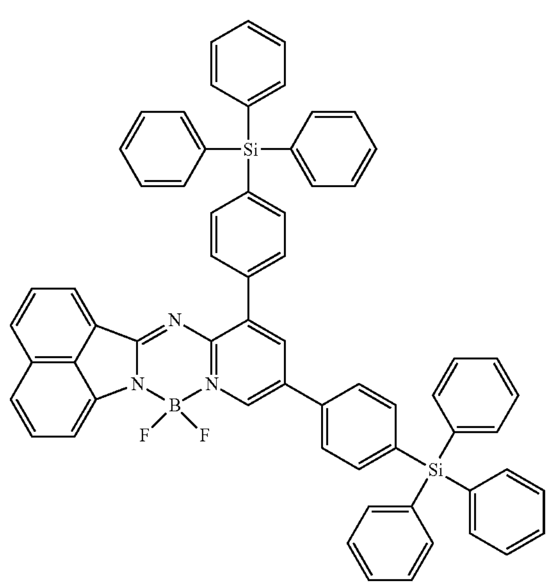

-continued
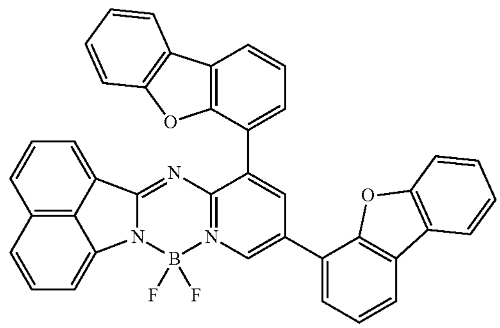
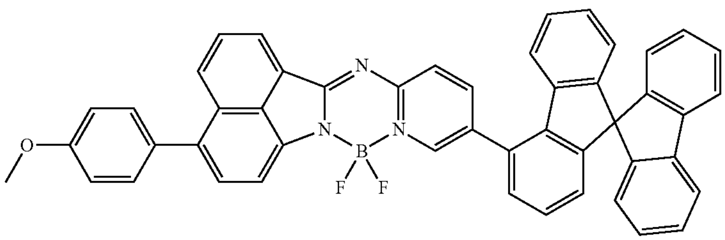
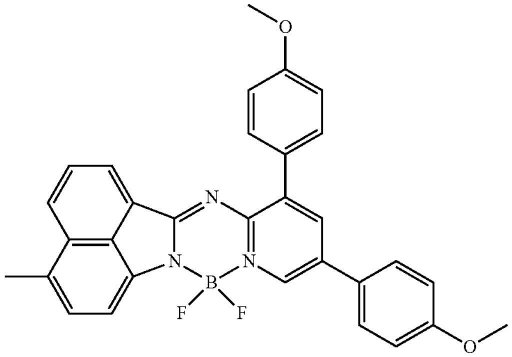
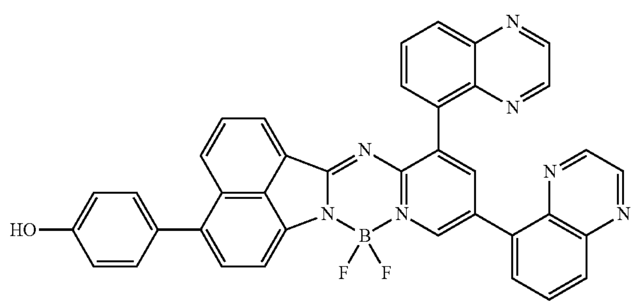
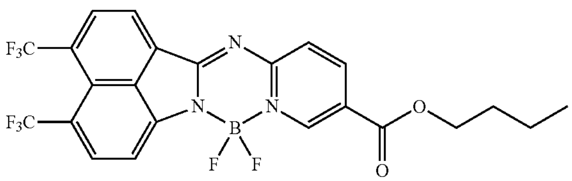
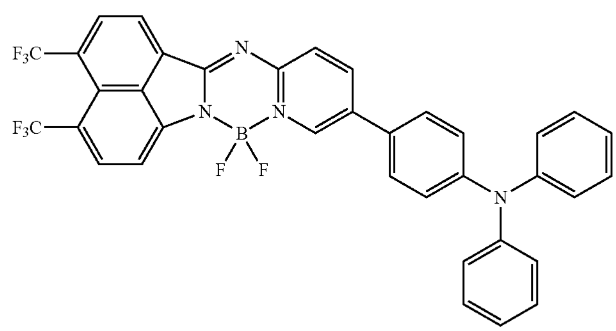
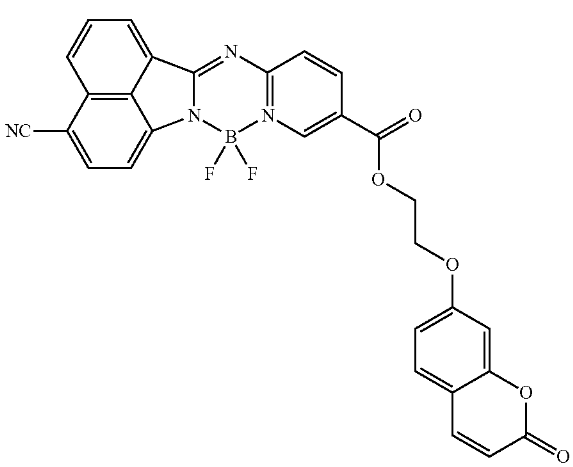
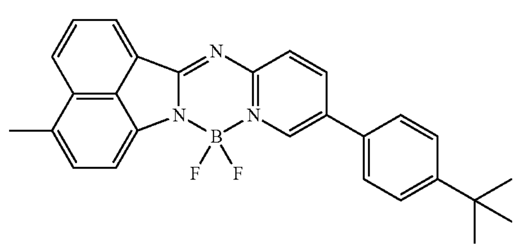

-continued
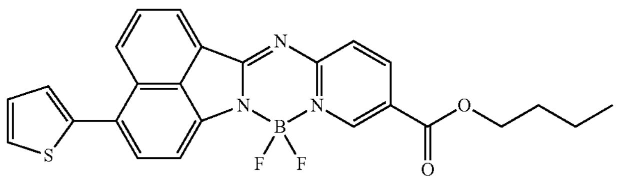
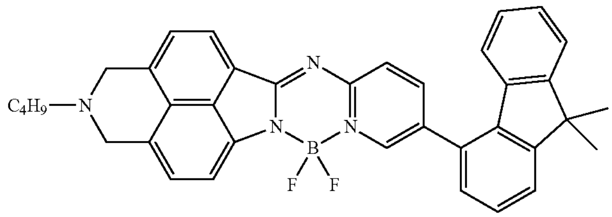
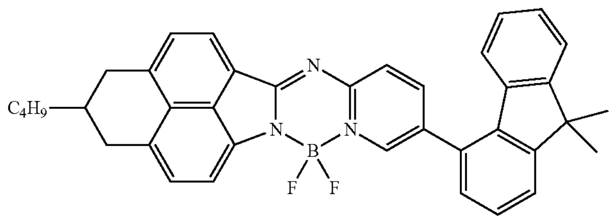
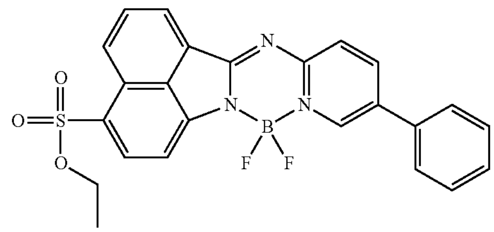
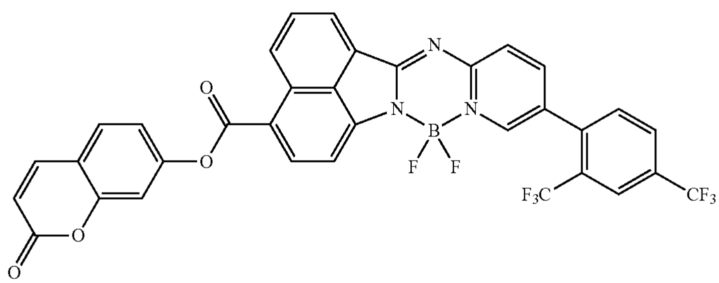
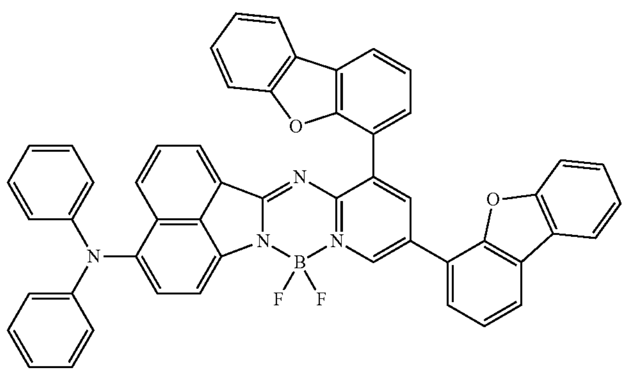
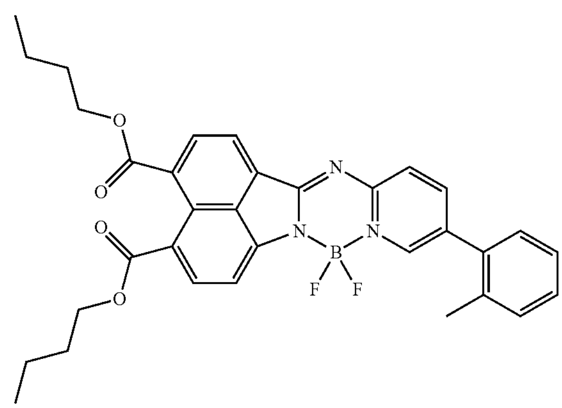
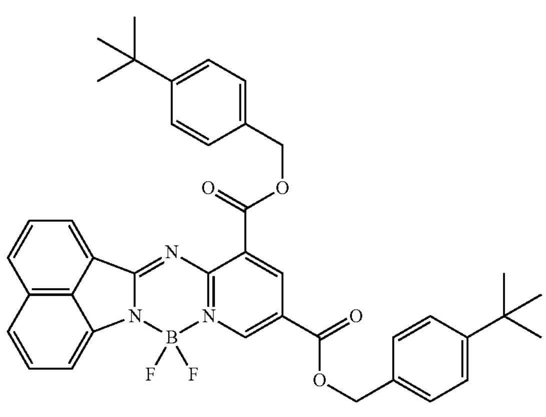
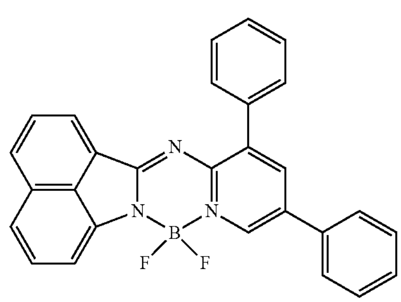

-continued
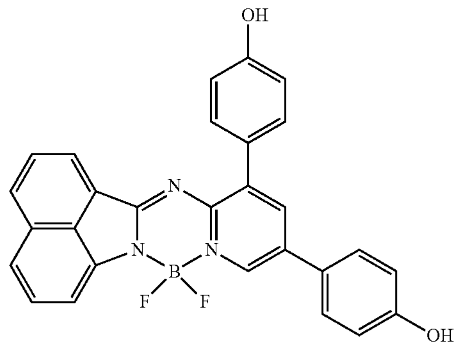
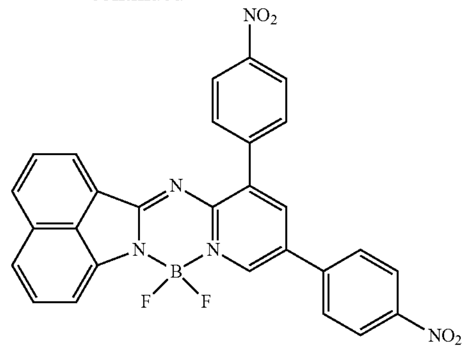
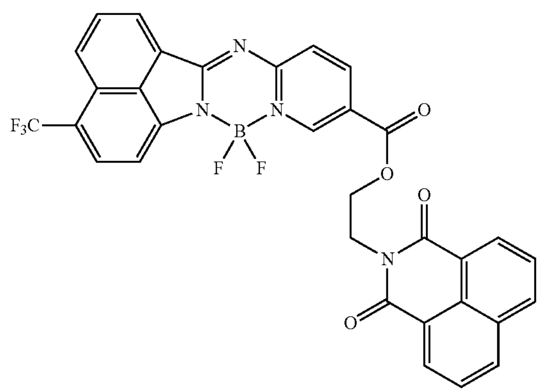
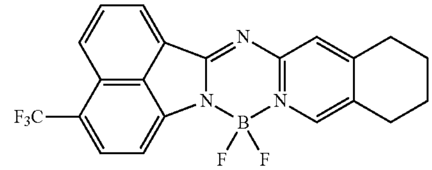
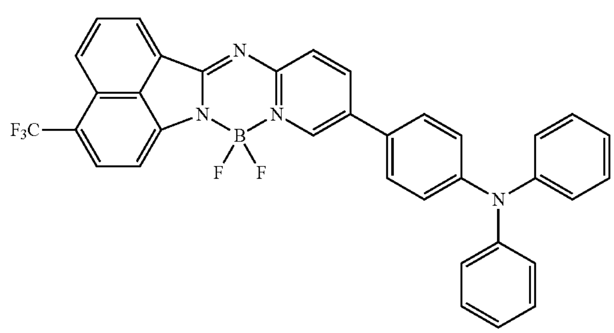
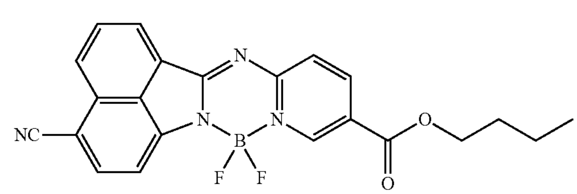
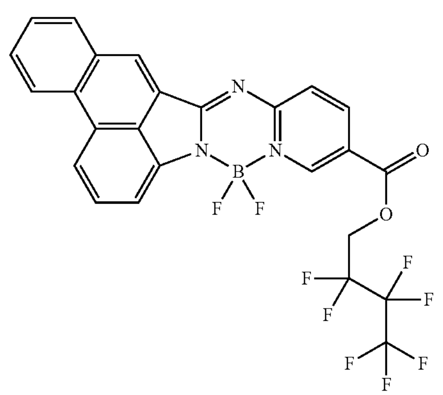
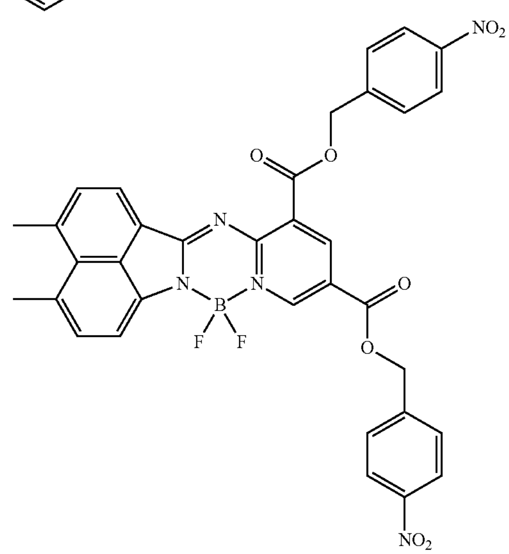

-continued
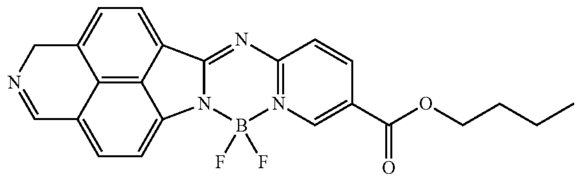
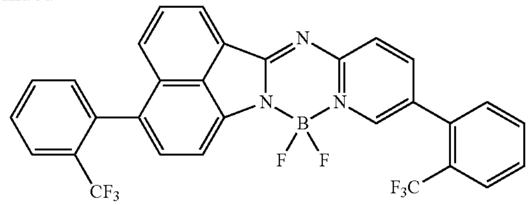
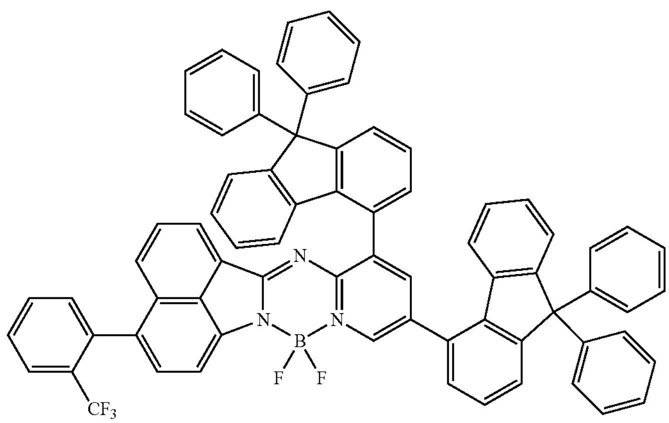
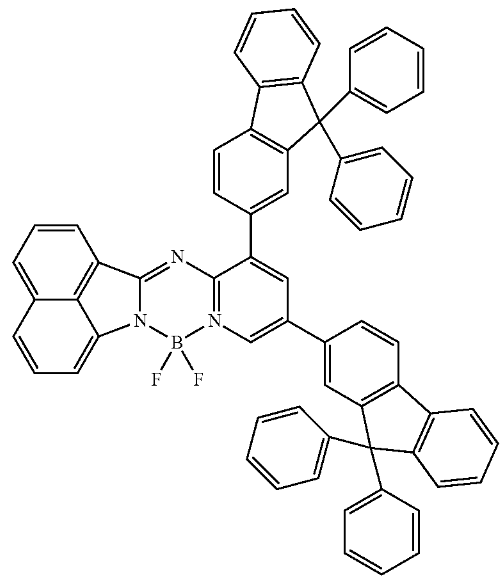
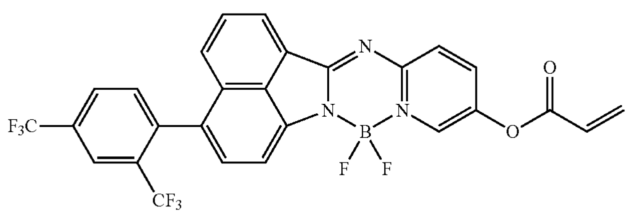
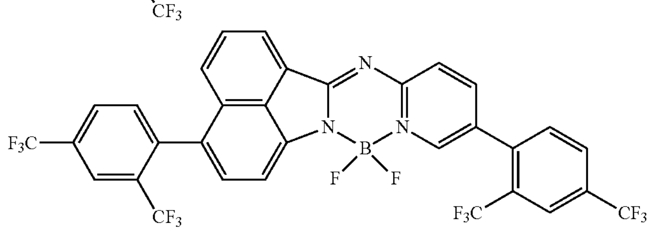
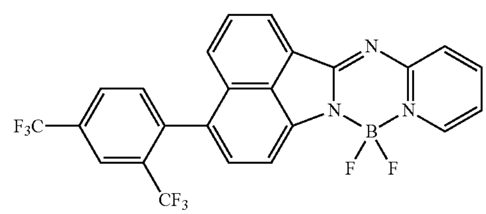
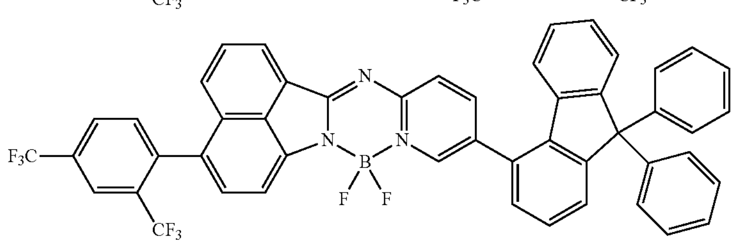
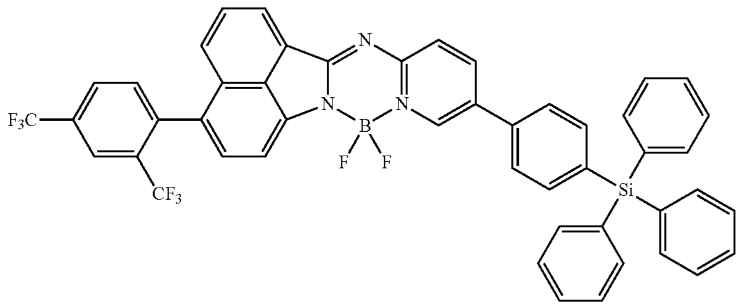

-continued
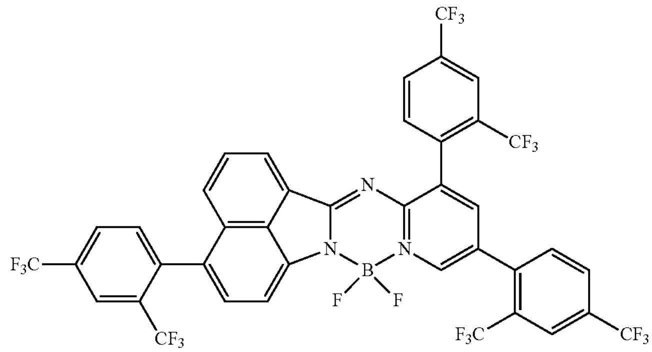
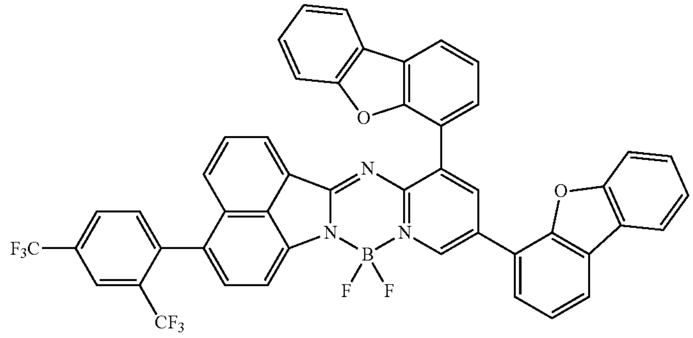
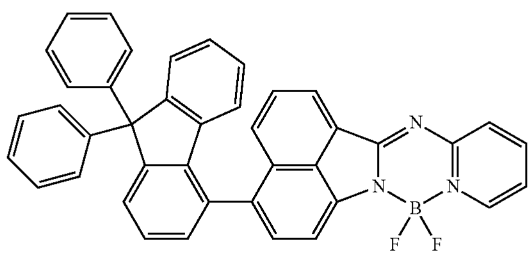
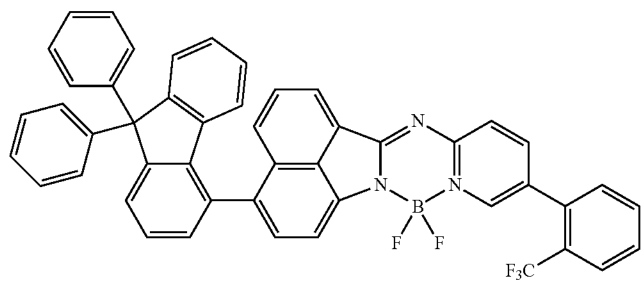
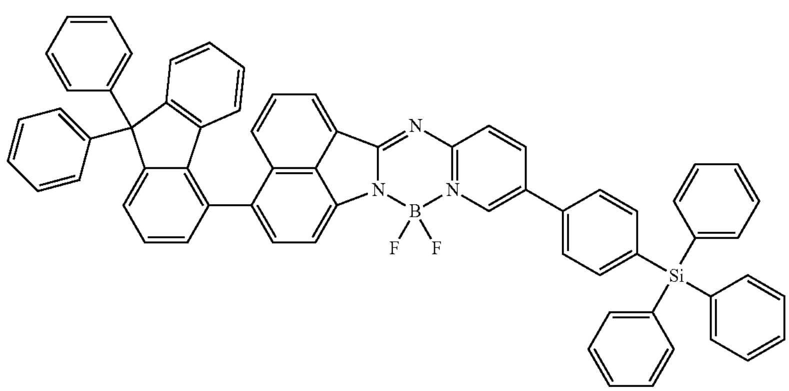
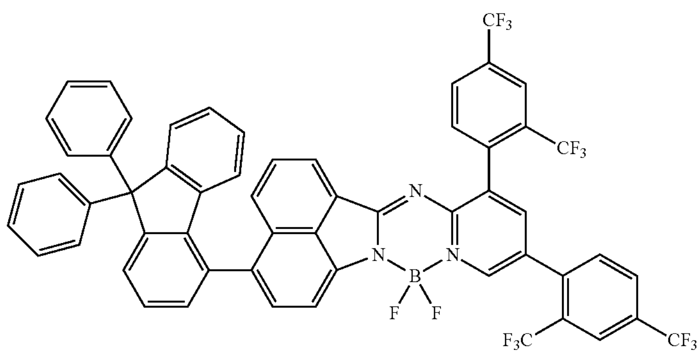

-continued
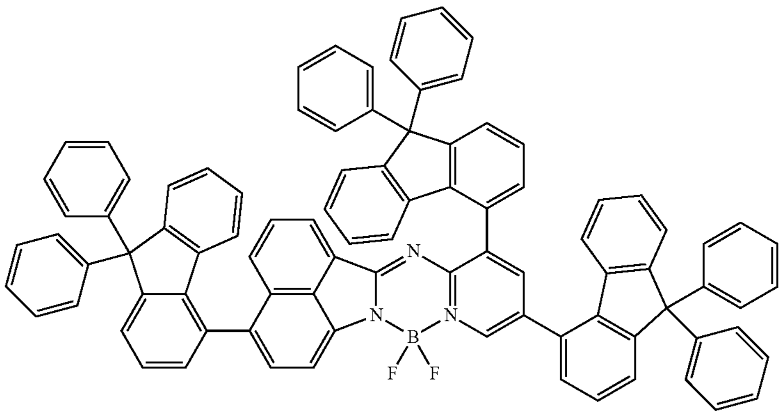
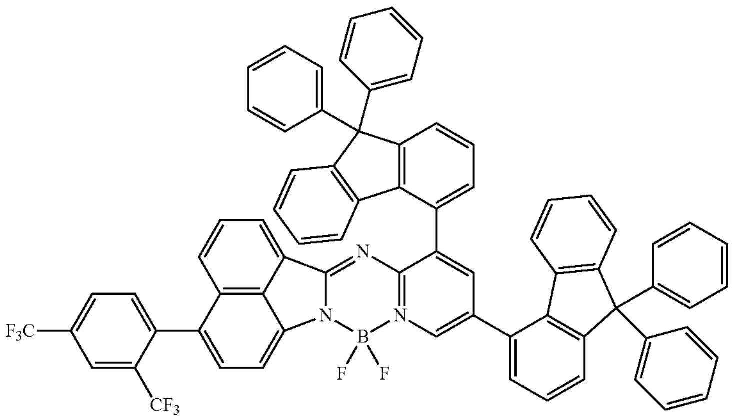
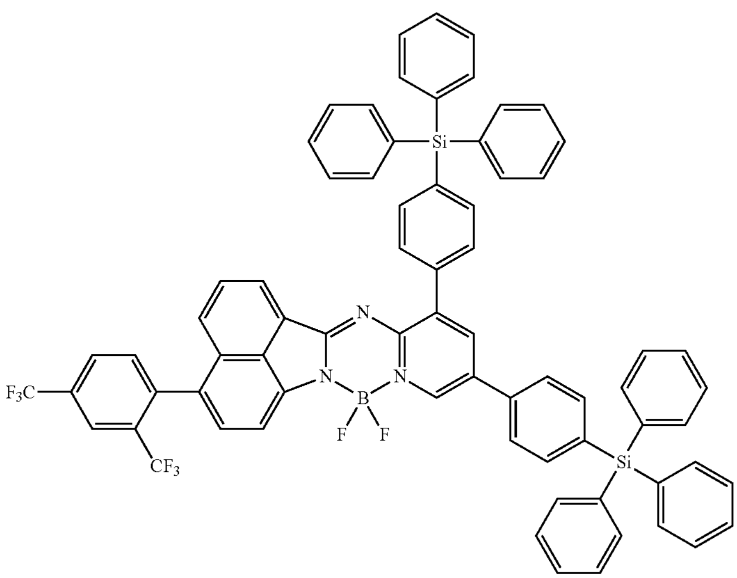
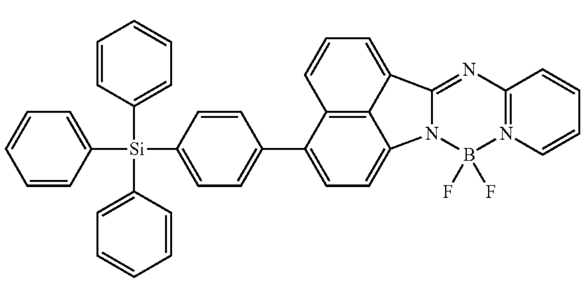

-continued
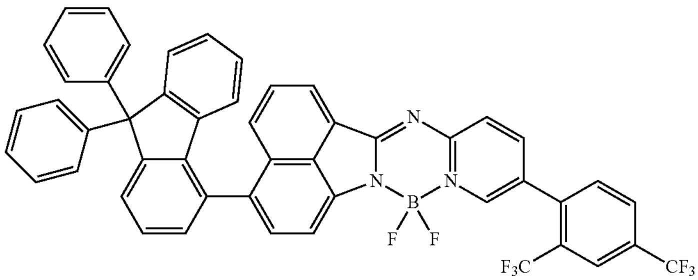
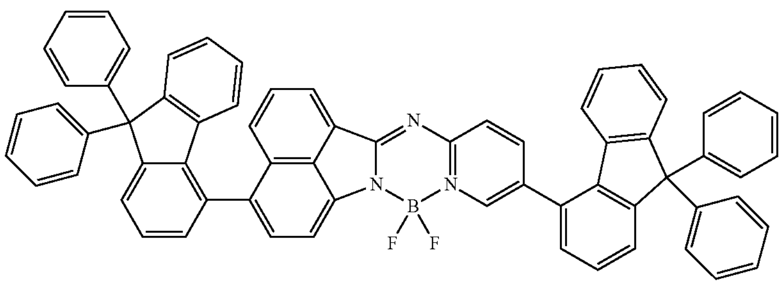
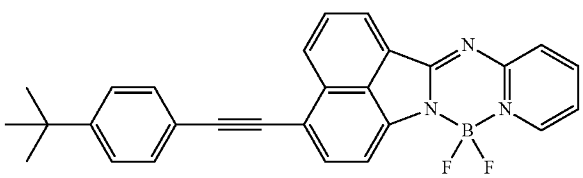
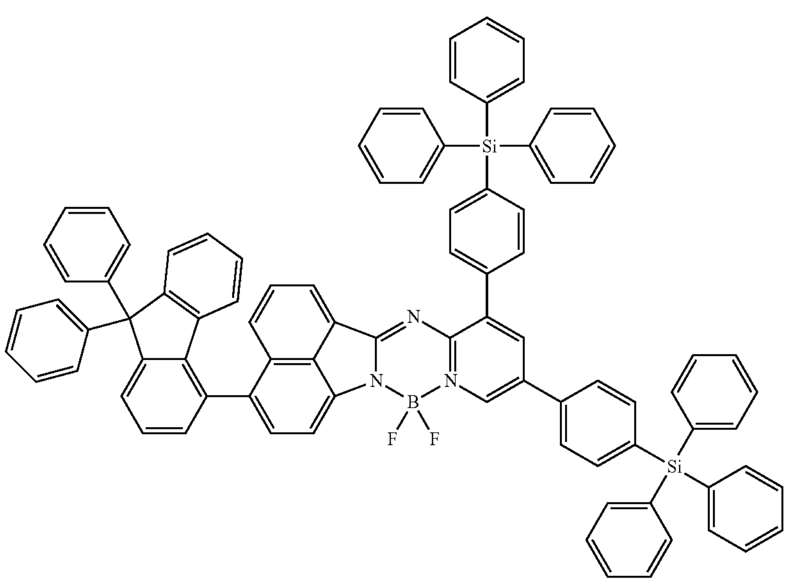

-continued
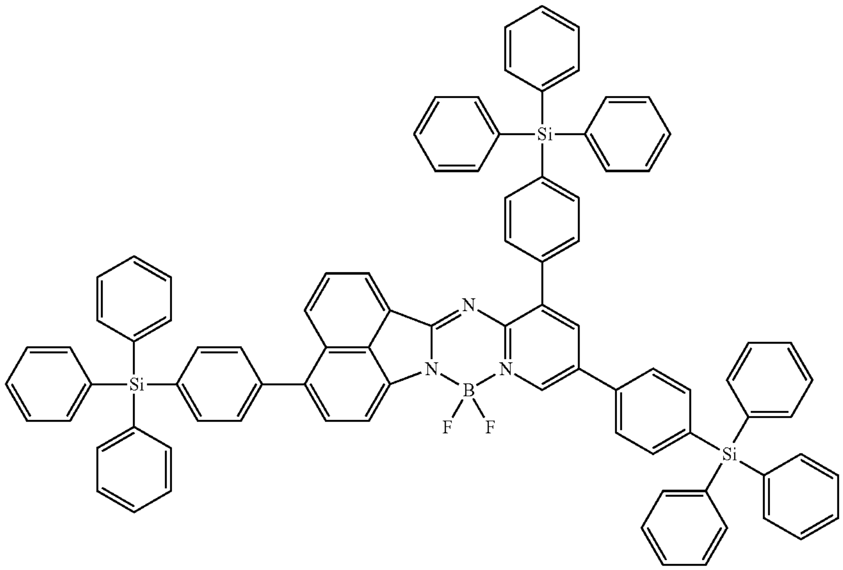
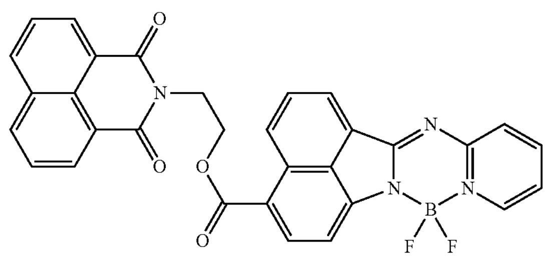
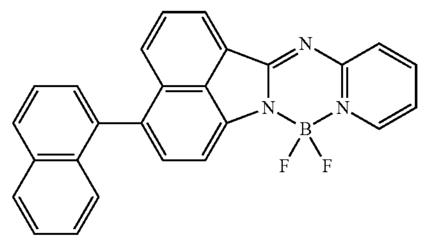
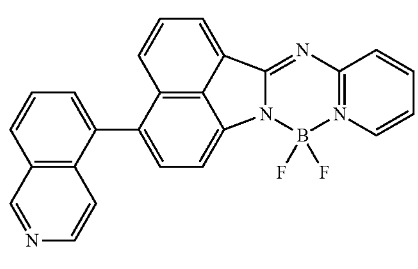
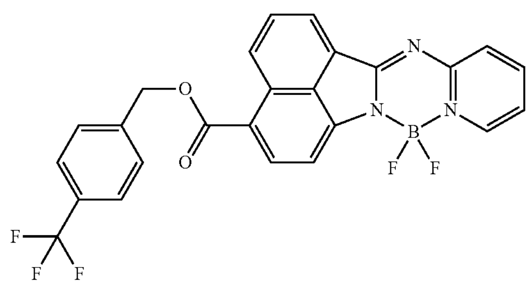
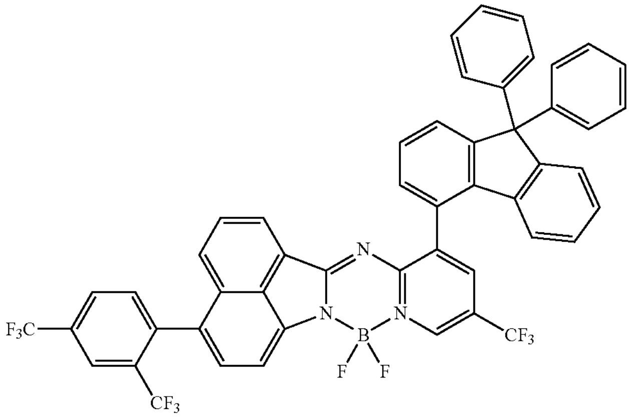

-continued
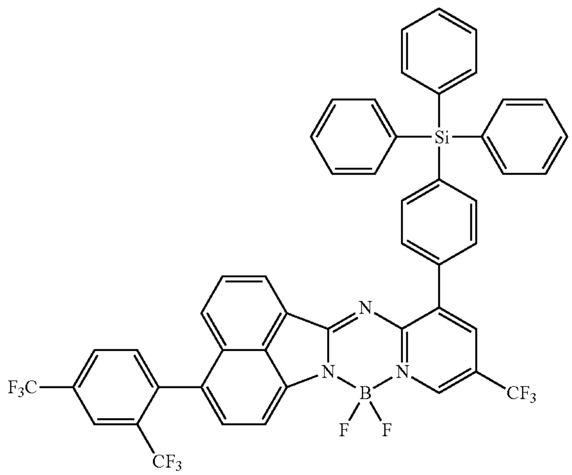
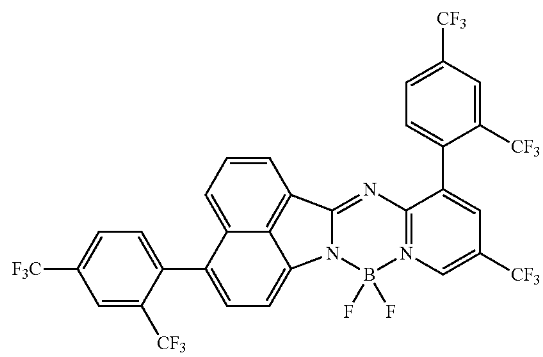
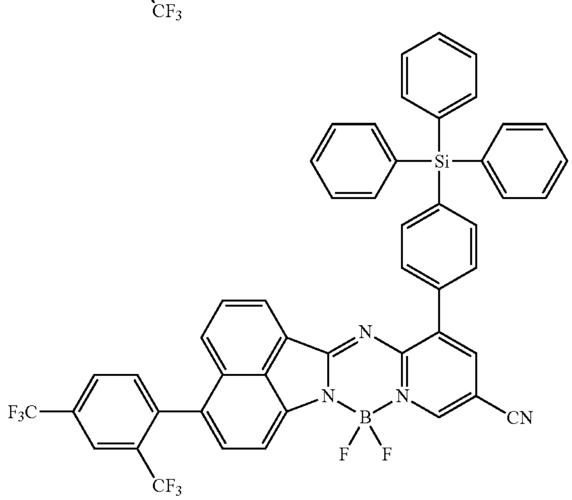
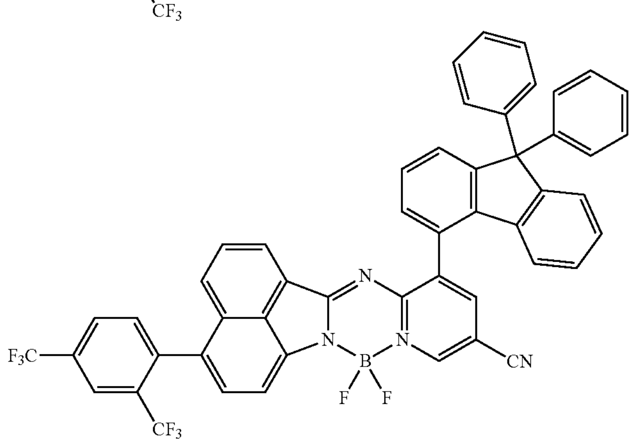
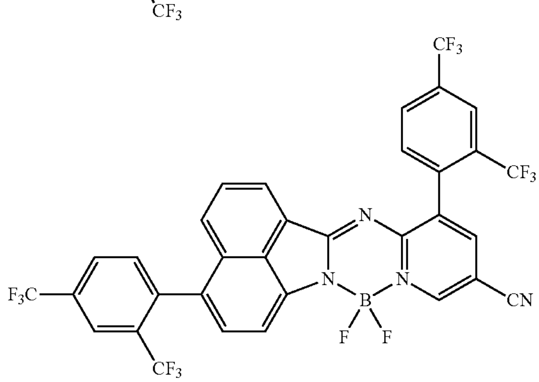
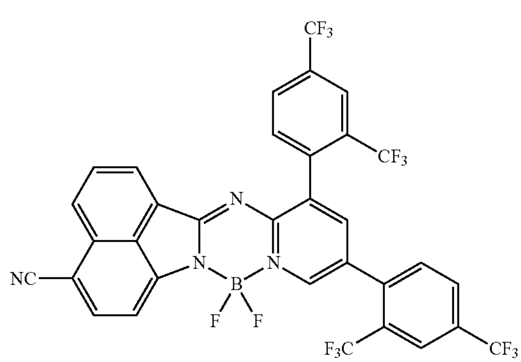

-continued
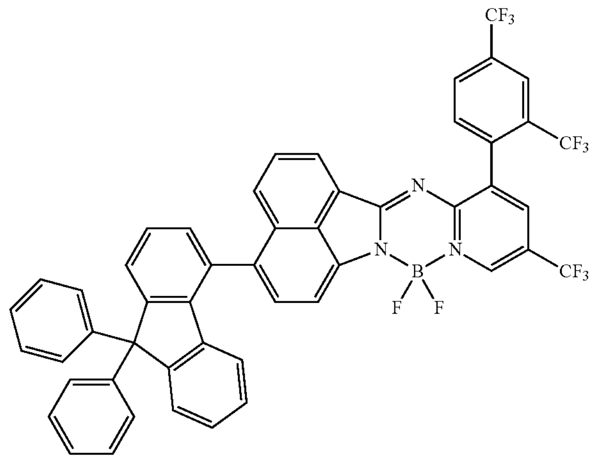
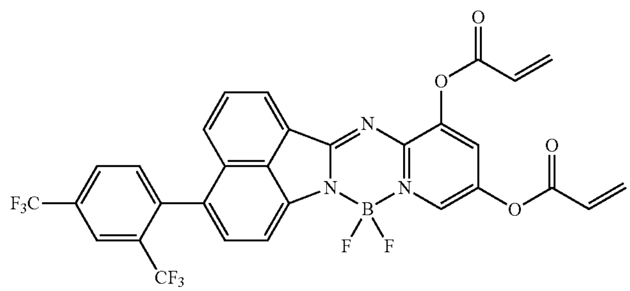
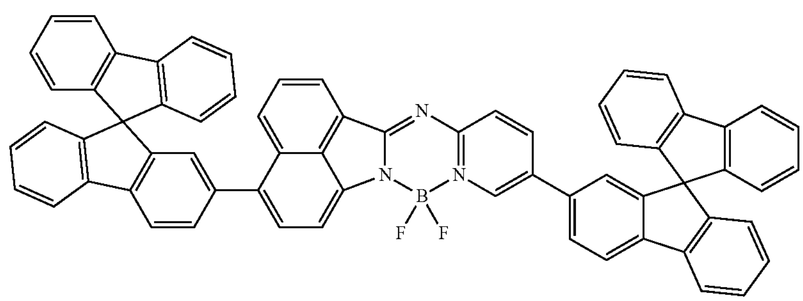
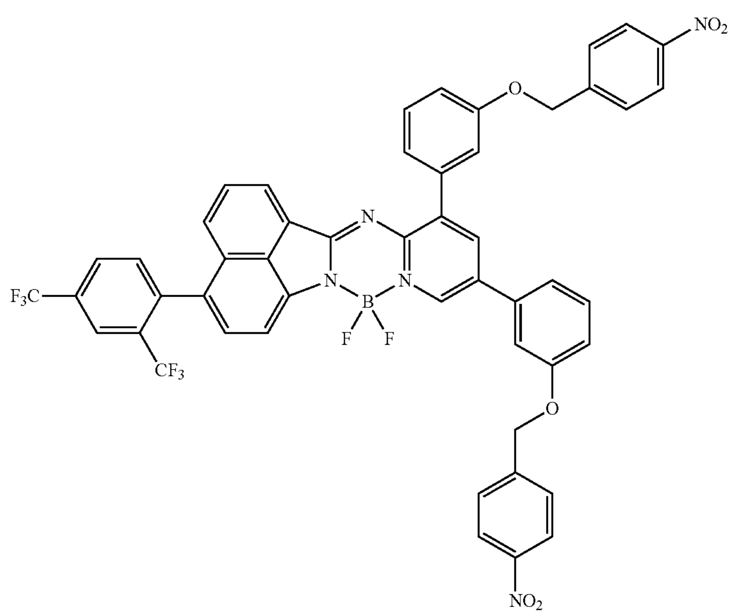

-continued
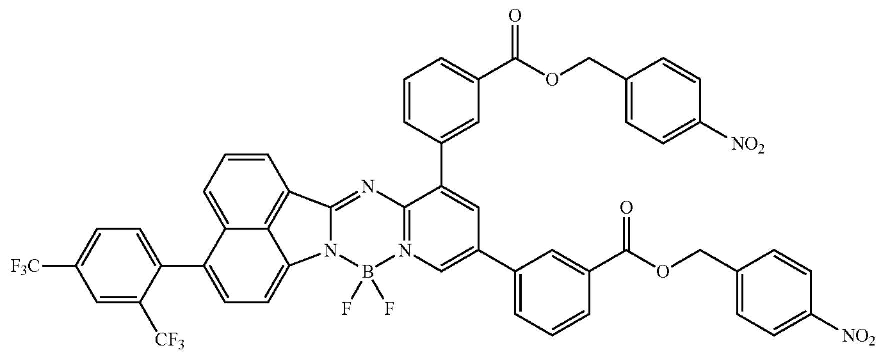
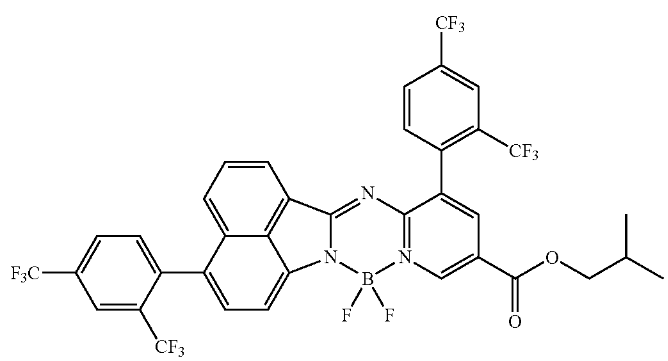
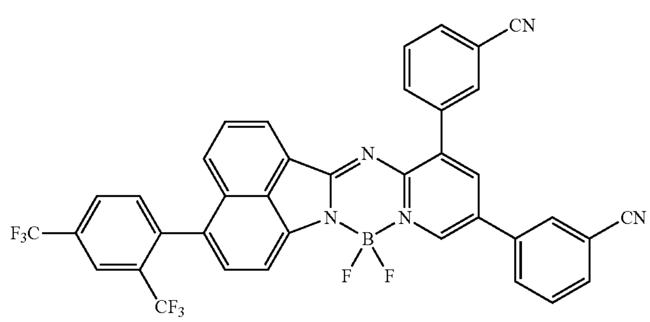
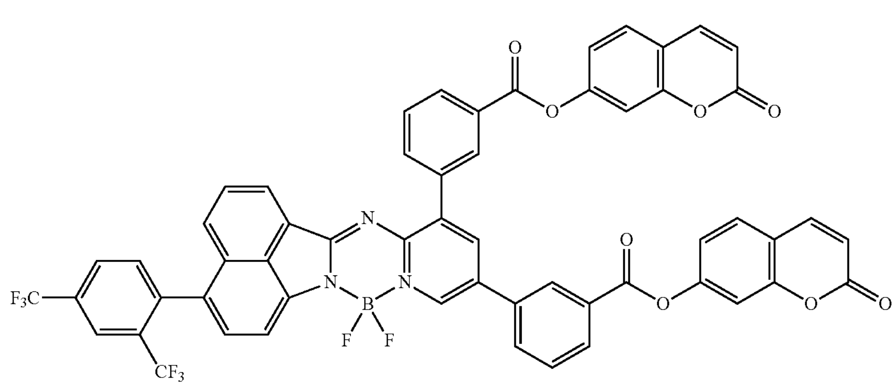

-continued
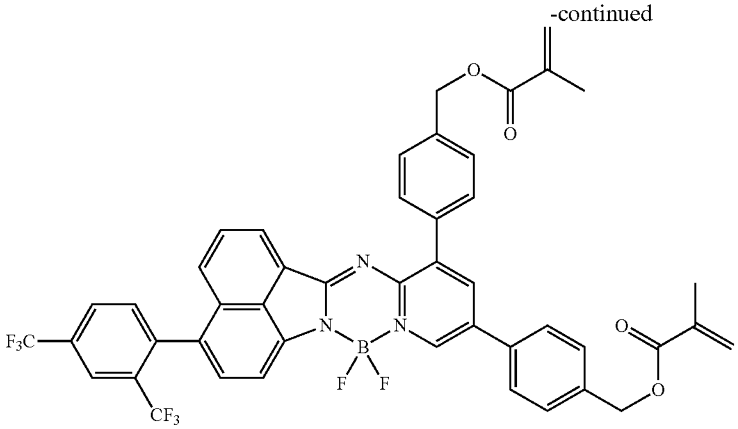
A2
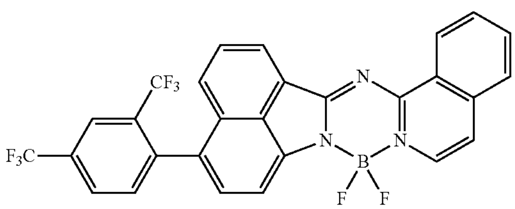
A3
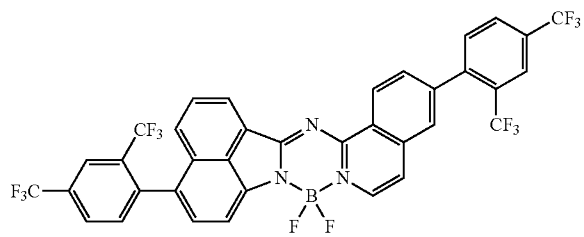
A4
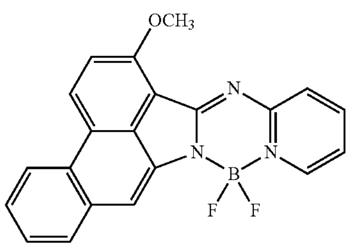
A5
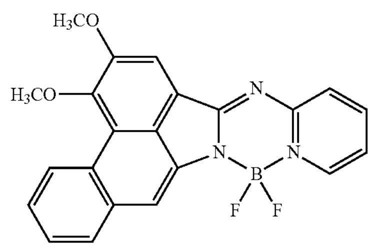
A6
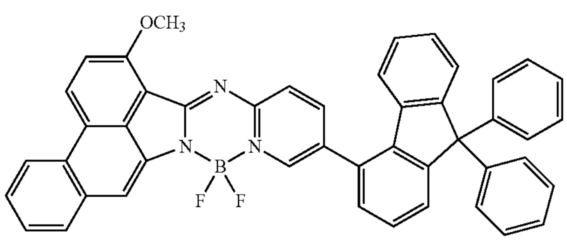
A7
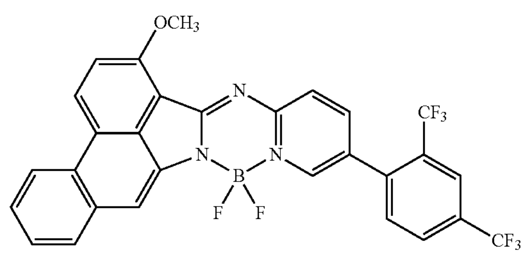
A8
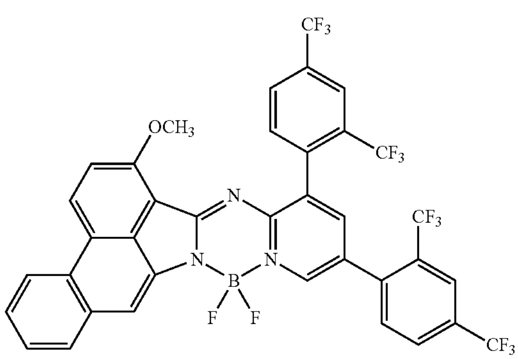
The compound according to an exemplary embodiment of the present application may be prepared by a preparation method to be described below.
For example, a core structure of the compound of Chemical Formula 1 may be prepared as in the following Reaction Formula 1. The substituent may be bonded by a method known in the art, and the kind and position of the substituent or the number of substituents may be changed according to the technology known in the art.

[Reaction Formula 1]

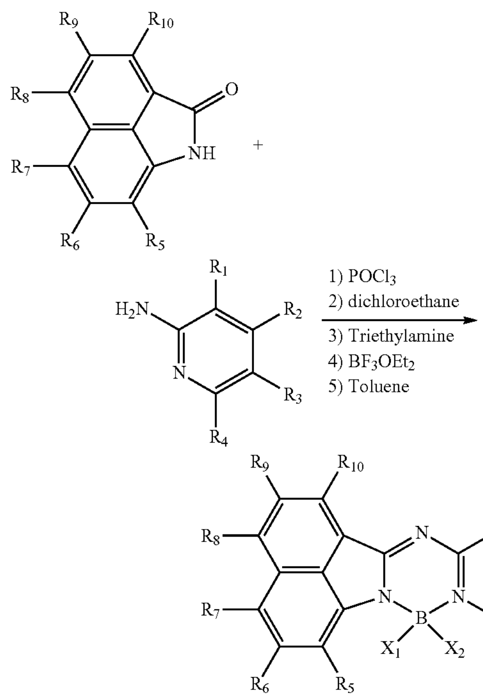

1 equivalent of indole and 1.5 equivalents of aminopyridine are diluted in a dichloroethane solvent, 3 equivalents of phosphoryl chloride was added thereto, and the resulting mixture was heated and stirred at 100° C. under nitrogen. After the reaction was terminated, the reactant was cooled down to room temperature, and then water and ethanol were slowly added dropwise thereto to form a precipitate, and a reaction intermediate was obtained by filtering the formed precipitate under reduced pressure. After the obtained reaction intermediate was dissolved again in a toluene solution, 2 equivalents of triethylamine and 4 equivalents of a boron trifluoride diethylether compound were put thereinto, and the resulting mixture was heated again to 120° C. After the reaction was terminated, extraction was performed by using water and chloroform, and the moisture was removed by using anhydrous magnesium sulfate. The reactant from which the moisture was removed was concentrated through distillation under reduced pressure, and then a compound of Chemical Formula 1 was obtained by using chloroform and ethanol.

The compound of Chemical Formula 1 of the present invention may be prepared by substituting the substituent of the compound of Chemical Formula 1, and the kind and position of substituent, and the number of substituents may be changed according to the technology known in the art.

An exemplary embodiment of the present specification provides a color conversion film including: a resin matrix; and the compound represented by Chemical Formula 1, which is dispersed in the resin matrix.

The content of the compound represented by Chemical Formula 1 in the color conversion film may be within a range of 0.001 to 10 wt %.

The color conversion film may also include one or two or more of the compounds represented by Chemical Formula 1.

The color conversion film may further include an additional fluorescent material in addition to the compound represented by Chemical Formula 1. When a light source which emits blue light is used, it is preferred that the color conversion film includes both a fluorescent material which emits green light and a fluorescent material which emits red light. Further, when a light source which emits blue light and green light is used, the color conversion film may include only a fluorescent material which emits red light. However, the color conversion film is not limited thereto, and even when a light source which emits blue light is used, the color conversion film may include only a compound, which emits red light, in the case where a separate film including a fluorescent material which emits green light is stacked. Conversely, even when a light source which emits blue light is used, the color conversion film may include only a compound, which emits green light, in the case where a separate film including a fluorescent material which emits red light is stacked.

The color conversion film may further include a resin matrix; and an additional layer including a compound which is dispersed in the resin matrix and emits light having a wavelength different from that of the compound represented by Chemical Formula 1. The compound which emits light having a wavelength different from that of the compound represented by Chemical Formula 1 may also be the compound expressed as Chemical Formula 1, and may also be another publicly-known fluorescent material.

It is preferred that a material for the resin matrix is a thermoplastic polymer or a thermosetting polymer. Specifically, as the material for the resin matrix, it is possible to use a poly(meth)acrylic material such as polymethylmethacrylate (PMMA), a polycarbonate (PC)-based material, a polystyrene (PS)-based material, a polyarylene (PAR)-based material, a polyurethane (TPU)-based material, a styrene-acrylonitrile (SAN)-based material, a polyvinylidenefluoride (PVDF)-based material, a modified-polyvinylidene-fluoride (modified-PVDF)-based material, and the like.

According to an exemplary embodiment of the present specification, the color conversion film according to the above-described exemplary embodiment additionally includes light diffusion particles. By dispersing light diffusion particles in the color conversion film instead of a light diffusion film used in the related art in order to improve brightness, an attaching process may be omitted, and higher brightness may be exhibited as compared to the case where a separate light diffusion film is used.

As the light diffusion particle, a resin matrix and a particle having a high refractive index may be used, and it is possible to use, for example, $TiO_2$, silica, borosilicate, alumina, sapphire, air or another gas, air- or gas-filled hollow beads or particles (for example, air/gas-filled glass or polymer); polymer particles including polystyrene, polycarbonate, polymethylmethacrylate, acryl, methyl methacrylate, styrene, a melamine resin, a formaldehyde resin, or a melamine and formaldehyde resin, or any suitable combination thereof. The particle diameter of the light diffusion particles may be within a range of 0.1 μm to 5 μm, for example, within a range of 0.3 μm to 1 μm. The content of the light diffusion particles may be determined, if necessary, and may be, for example, within a range of about 1 part by weight to about 30 parts by weight based on 100 parts by weight of the resin matrix.

The color conversion film according to the above-described exemplary embodiment may have a thickness of 2

μm to 200 μm. In particular, the color conversion film may exhibit high brightness even in a small thickness of 2 μm to 20 μm. This is because the content of the fluorescent material molecule included in a unit volume is higher than that of a quantum dot.

A base material may be provided on one surface of the color conversion film according to the above-described exemplary embodiment. The base material may function as a support when preparing the color conversion film. The kind of base material is not particularly limited, and the material or thickness of the base material is not limited as long as the base material is transparent and may function as the support. Here, transparency means that the transmittance of visible light is 70% or more. For example, as the base material, a PET film may be used.

The above-described color conversion film may be prepared by coating a resin solution, in which the above-described compound represented by Chemical Formula 1 is dissolved, on a base material and drying the resin solution, or extruding the above-described compound represented by Chemical Formula 1 together with the resin to produce a film.

Since the above-described compound represented by Chemical Formula 1 is dissolved in the resin solution, the compound represented by Chemical Formula 1 is uniformly distributed in the solution. This is different from a process of preparing a quantum dot film, which requires a separate dispersing process.

The preparation method of the resin solution in which the compound represented by Chemical Formula 1 is dissolved is not particularly limited as long as the above-described compound represented by Chemical Formula 1 is in a state where the resin is dissolved in the solution.

According to an example, the resin solution in which the compound represented by Chemical Formula 1 is dissolved may be prepared by a method including: dissolving the compound represented by Chemical Formula 1 in a solvent to prepare a first solution, dissolving a resin in a solvent to prepare a second solution, and mixing the first solution with the second solution. When the first solution and the second solution are mixed, it is preferred to uniformly mix the solutions. However, the method is not limited thereto, and it is possible to use a method of simultaneously adding a compound represented by Chemical Formula 1 and a resin into a solvent to dissolve the compound and the resin, a method of dissolving the compound represented by Chemical Formula 1 in a solvent, and subsequently adding the resin thereto to dissolve the resin, a method of dissolving the resin in a solvent, and subsequently adding the compound represented by Chemical Formula 1 thereto to dissolve the compound, and the like.

As the resin included in the solution, it is possible to use the above-described resin matrix material, a monomer which is curable by the resin matrix resin, or a mixture thereof. Examples of the monomer which is curable by the resin matrix resin include a (meth)acrylic monomer, and the monomer may be formed of a resin matrix material by UV curing. When a curable monomer is used as described above, an initiator required for curing may be further added, if necessary.

The solvent is not particularly limited, and is not particularly limited as long as the solvent does not adversely affect the coating process and may be removed by a subsequent drying. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, dimethylformamide (DMF), dimethylacetamide (DMAc), dimethylsulfoxide (DMSO), N-methyl-pyrrolidone (NMP), and the like, and one or a mixture of two or more may be used. When the first solution and the second solution are used, the solvents included in each of the solutions may also be the same as or different from each other. Even when different solvents are used in the first solution and the second solution, it is preferred that these solvents have compatibility so as to be mixed with each other.

For the process of coating the resin solution, in which the compound represented by Chemical Formula 1 is dissolved, on a base material, a roll-to-roll process may be used. For example, the roll-to-roll process may be performed by a process of unwinding a base material from a roll on which the base material is wound, coating a resin solution, in which the compound represented by Chemical Formula 1 is dissolved, on one surface of the base material, drying the resin solution, and then winding the base material again on the roll. When the roll-to-roll process is used, it is preferred that the viscosity of the resin solution is determined within a range in which the process may be implemented, and the viscosity may be determined within a range of, for example, 200 to 2,000 cps.

As the coating method, various publicly-known methods may be used, and for example, a die coater may also be used, and various bar-coating methods such as a comma coater and a reverse comma coater may also be used.

After the coating, a drying process is performed. The drying process may be performed under conditions required for removing the solvent. For example, it is possible to obtain a color conversion film including a fluorescent material including the compound represented by Chemical Formula 1, which has desired thickness and concentration, on a base material by carrying out the drying in an oven located close to a coater under a condition to sufficiently evaporate a solvent, in a direction in which the base material progresses during the coating process.

When the monomer which is curable by the resin matrix resin is used as a resin included in the solution, curing, for example, UV curing may be performed before the drying or simultaneously with the drying.

When the compound represented by Chemical Formula 1 is extruded with a resin to produce a film, an extrusion method known in the art may be used, and for example, a color conversion film may be prepared by extruding the compound represented by Chemical Formula 1 with a resin such as a polycarbonate (PC)-based resin, a poly(meth) acrylic resin, and a styrene-acrylonitrile (SAN)-based resin.

According to an exemplary embodiment of the present specification, a protective film or a barrier film may be provided on at least one surface of the color conversion film. As the protective film and the barrier film, films known in the art may be used.

An exemplary embodiment of the present specification provides a backlight unit including the above-described color conversion film. The backlight unit may have a backlight unit configuration known in the art, except that the backlight unit includes the color conversion film. FIG. 1 illustrates a schematic view of a backlight unit structure according to an example. The backlight unit according to FIG. 1 includes a side chain-type light source 101, a reflective plate 102 which surrounds the light source, a light guide plate 103 which guides light directly emitted from the light source, or reflected from the reflective plate, a reflective layer 104 which is provided on one surface of the light guide plate, and a color conversion film 105 which is provided on a surface opposite to a surface of the light guide plate facing the reflective layer. A portion marked with 106 in FIG. 1 is a light dispersion pattern of the light guide plate. The light incident inside the light guide plate has an irregular light distribution due to the repetition of an optical process such as reflection, total reflection, refraction, and transmission, and a 2-dimensional light dispersion pattern may be used in order to guide the irregular light distribution to have a uniform luminance. However, the scope of the present invention is not limited by FIG. 1, and not only a side chain-type light source but also a direct-type light source may also be used as the light source, and the reflective plate or the reflective layer may be omitted or may also be replaced with another configuration, if necessary, and an additional film, for example, a light diffusion film, a light collecting film, a brightness enhancement film, and the like may be further provided, if necessary.

An exemplary embodiment of the present specification provides a display device including the backlight unit. The display device is not particularly limited as long as the display device is a display device including a backlight unit, and may be included in a TV, a monitor of a computer, a laptop computer, a mobile phone, and the like.

Hereinafter, the present specification will be described in detail with reference to Examples for specifically describing the present specification. However, the Examples according to the present specification may be modified in various forms, and it is not interpreted that the scope of the present application is limited to the Examples described in detail below. The Examples of the present application are provided for more completely explaining the present specification to the person with ordinary skill in the art.

<Preparation Example 1> Synthesis of Compound 1-1

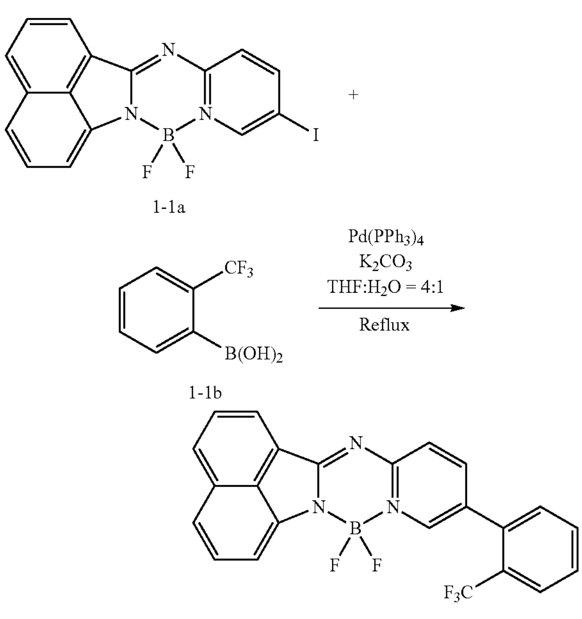

1.5 g (3.58 mmol, 1 equivalent) of Compound 1-1a and 1.5 equivalents of Compound 1-1b were put into 40 mL of a tetrahydrofuran solvent, and the temperature was increased to 90° C. under nitrogen while the mixture was stirred. 3 equivalents of potassium carbonate were diluted in 10 mL of water, the diluted potassium carbonate was added thereto, the resulting mixture was heated and stirred for 30 minutes, and then the reaction was performed for 12 hours by adding 0.05 equivalent of $Pd(PPh_3)_4$ thereto. After the reaction was completed, extraction was performed by using water and chloroform, the moisture was removed over anhydrous magnesium sulfate, and then after the solvent was independently separated through a filter and the distillation was performed under reduced pressure, recrystallization was performed with ethanol. 0.95 g (61%) of Compound 1-1 was obtained through this process.

HR LC/MS/MS m/z calcd for $C_{23}H_{13}BF_5N_3$(M+): 447.1123; found: 443.1125.

<Preparation Example 2> Synthesis of Compound 1-2

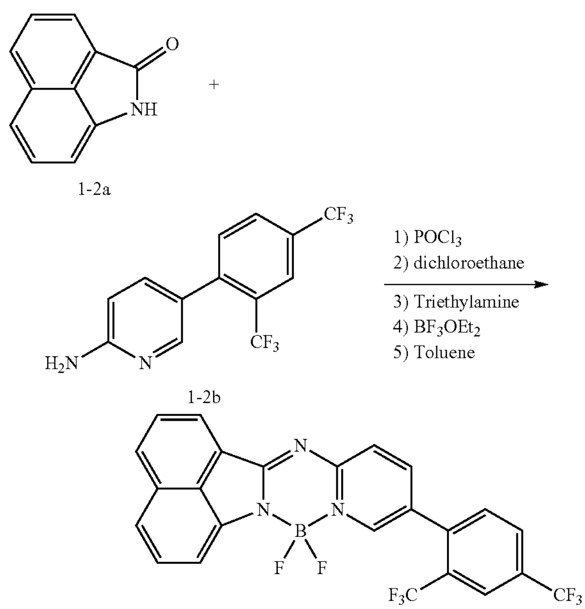

After 0.5 g (2.96 mmol, 1 equivalent) of Compound 1-2a and 1.5 equivalents of Compound 1-2b were dissolved in dichloroethane, 3 equivalents of phosphoryl chloride were slowly added dropwise thereto, and then the reaction temperature was increased to 100° C. under nitrogen. After the reaction was terminated, the reactant was cooled down to room temperature, water and ethanol were slowly added dropwise thereto to form a precipitate, and then a reaction intermediate was aliquoted by filtering the formed precipitate under reduced pressure. After the aliquoted reaction intermediate was dissolved again in a toluene solution, 2 equivalents of triethylamine and 4 equivalents of a boron trifluoride diethylether compound were put thereinto, and the resulting mixture was heated to 120° C. under nitrogen. After the reaction was completed, extraction was performed by using water and chloroform, and the moisture was removed by using anhydrous magnesium sulfate. After the reactant from which the moisture was removed was concentrated through distillation under reduced pressure, a recrystallization was performed by using chloroform and ethanol, thereby obtaining 0.66 g (Y=44%) of Compound 1-2.

HR LC/MS/MS m/z calcd for $C_{24}H_{12}BF_8N_3$ (M+): 505.0997; found: 505.0999.

<Preparation Example 3> Synthesis of Compound 1-3

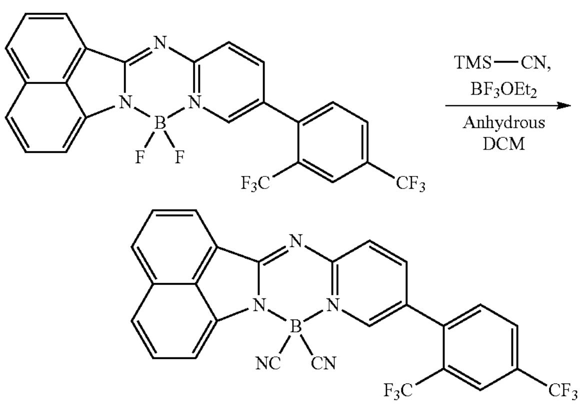

0.5 g of Compound 1-2 was dissolved in anhydrous dichloromethane, and then the temperature was maintained at 0° C. 15 equivalents of trimethylsilyl cyanide and 5 equivalents of trifluoride diethyl ether were sequentially and slowly added thereto, and a reaction was performed. After the reaction was completed, extraction was performed by using water and chloroform, and the moisture was removed from the organic layer by using anhydrous magnesium sulfate. After the reactant from which the moisture was removed was concentrated through distillation under reduced pressure, 0.27 g (Y=53%) of Compound 1-3 was obtained by using ethanol.

HR LC/MS/MS m/z calcd for $C_{26}H_{12}BF_6N_5$(M+): 519.1090; found: 519.1098.

<Preparation Example 4> Synthesis of Compound 2-2

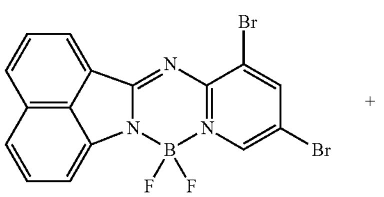

2-2a

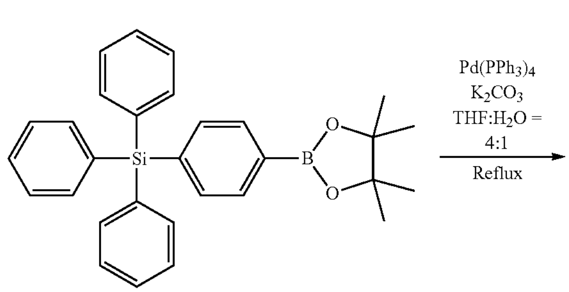

2-2b

-continued

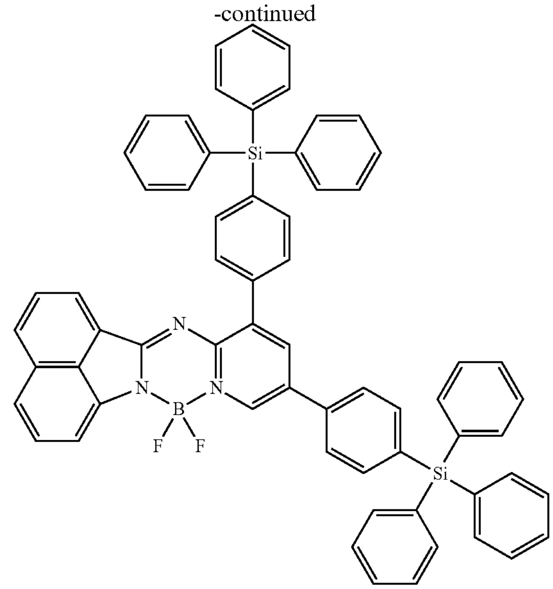

0.8 g (1.8 mmol, 1 equivalent) of Compound 2-2a and 4 equivalents of Compound 2-2b were put into 40 mL of a tetrahydrofuran solvent, and the temperature was increased to 90° C. under nitrogen while the mixture was stirred. 6 equivalents of potassium carbonate were diluted in 10 mL of water, the diluted potassium carbonate was added thereto, the resulting mixture was heated and stirred for 30 minutes, and then the reaction was performed for 12 hours by adding 0.05 equivalent of $Pd(PPh_3)_4$ thereto. After the reaction was completed, extraction was performed by using water and chloroform, the moisture was removed over anhydrous magnesium sulfate, and then after the solvent was independently separated through a filter and the distillation was performed under reduced pressure, recrystallization was performed with ethanol. 0.96 g (52%) of Compound 2-2 was obtained through this process.

HR LC/MS/MS m/z calcd for $C_{64}H_{46}BF_2N_3Si_2$ (M+): 948.3213; found: 948.3215.

<Preparation Example 5> Synthesis of Compound 2-3

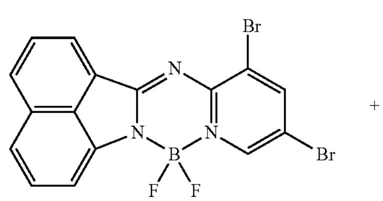

2-2a

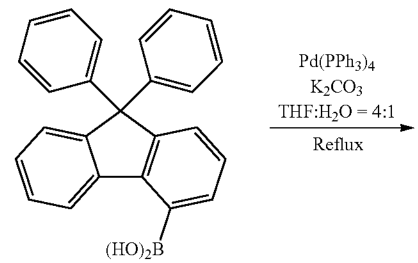

2-3b

-continued

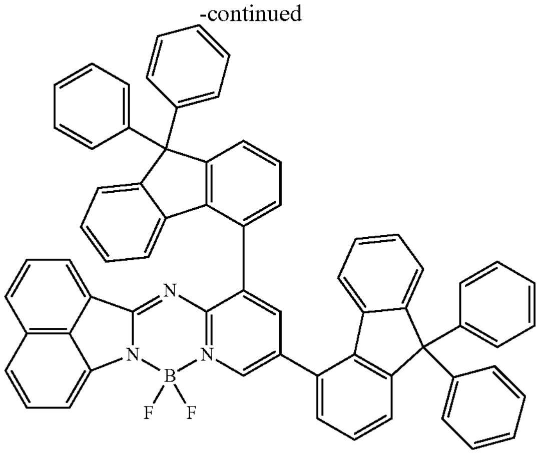

An experiment was performed in the same manner as in Compound 2-2 by using 0.8 g (1.8 mmol, 1 equivalent) of Compound 2-2a and 4 equivalents of Compound 2-3b, thereby obtaining 1.3 g (79%) of Compound 2-3.

HR LC/MS/MS m/z calcd for $C_{66}H_{42}BF_2N_3$ (M+): 925.3440; found: 925.3441.

<Preparation Example 6> Synthesis of Compound 2-4

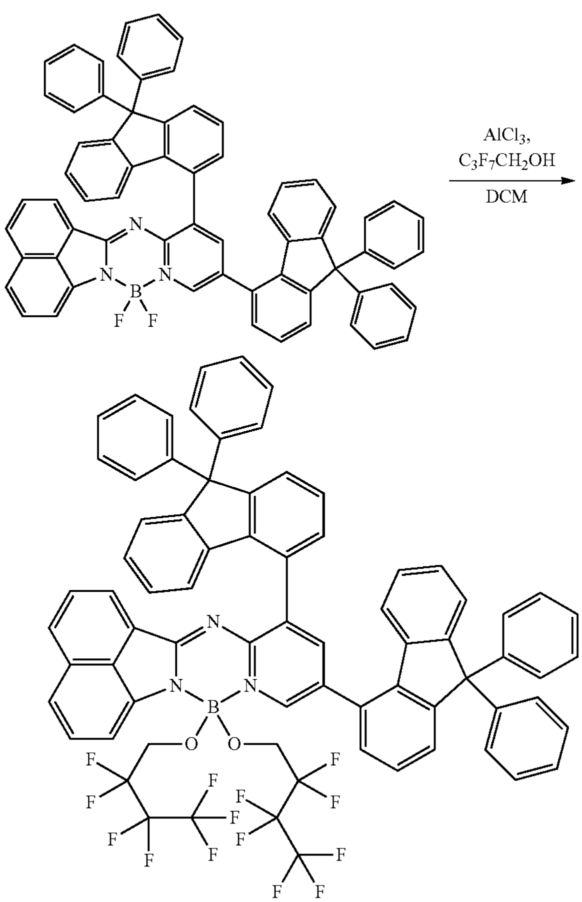

1 g (1.08 mmol, 1 equivalent) of Compound 2-3 was dissolved in dichloromethane, 5 equivalents of aluminum chloride was added thereto, and the resulting mixture was stirred. 3 equivalents of heptafluorobutanol were put thereinto, the resulting mixture was heated and stirred, and then when the reaction was terminated, extraction was performed by using water and chloroform. Aluminum was removed from the extracted organic layer through a celite filter, water was removed by using anhydrous magnesium sulfate, the residue was concentrated through distillation under reduced pressure, and then 1.0 g (Y=72%) of Compound 2-4 was obtained by using ethanol.

HR LC/MS/MS m/z calcd for $C_{74}H_{46}BF_{14}N_3O_2$ (M+): 1285.3460; found: 1285.3461.

<Preparation Example 7> Synthesis of Compound 3-2

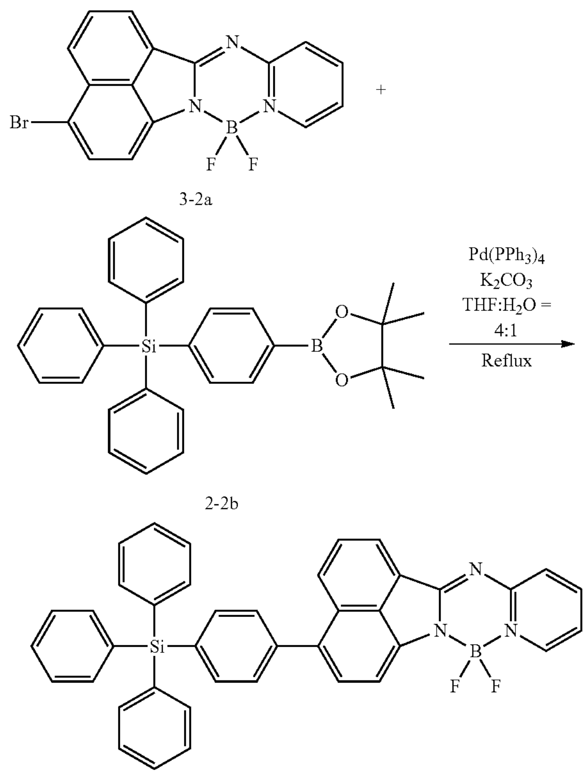

1 g (2.7 mmol, 1 equivalent) of Compound 3-2a and 3 equivalents of Compound 2-2b were put into 40 mL of a tetrahydrofuran solvent, and the temperature was increased to 90° C. under nitrogen while the mixture was stirred. 3 equivalents of potassium carbonate were diluted in 10 mL of water, the diluted potassium carbonate was added thereto, the resulting mixture was heated and stirred for 30 minutes, and then the reaction was performed for 12 hours by adding 0.05 equivalent of $Pd(PPh_3)_4$ thereto. After the reaction was completed, extraction was performed by using water and chloroform, the moisture was removed over anhydrous magnesium sulfate, and then after the solvent was independently separated through a filter and the distillation was performed under reduced pressure, recrystallization was performed with ethanol. 0.79 g (47%) of Compound 3-2 was obtained through this process.

HR LC/MS/MS m/z calcd for $C_{40}H_{28}BF_2N_3Si$ (M+): 627.2114; found: 627.2114.

<Preparation Example 8> Synthesis of Compound 3-3

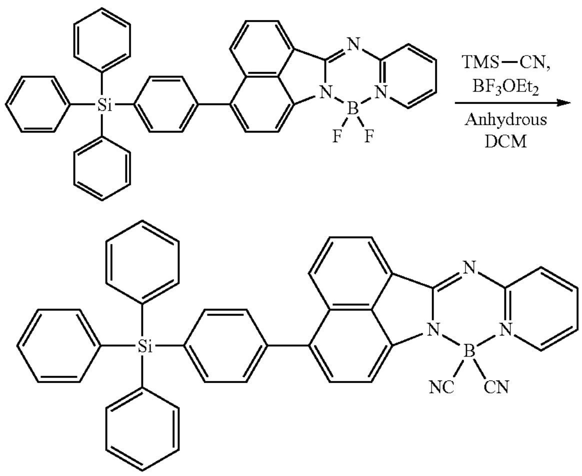

An experiment was performed in the same manner as in Preparation Example 3 by using 0.5 g of Compound 3-2 instead of Compound 1-3, thereby obtaining 0.32 g (Y=62%) of Compound 3-3.

HR LC/MS/MS m/z calcd for $C_{42}H_{28}BN_5Si$ (M+): 641.2207; found: 641.2206.

<Preparation Example 9> Synthesis of Compound 3-4

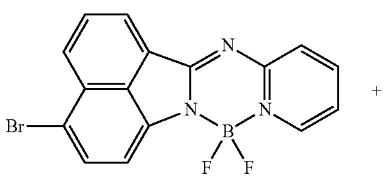

3-2a

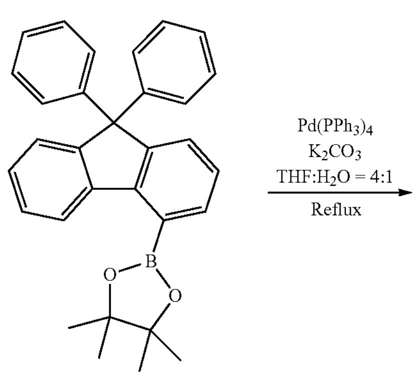

3-3b

-continued

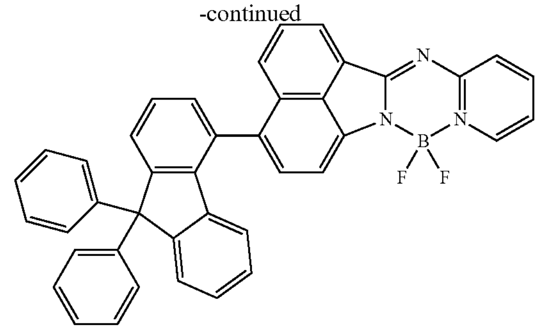

A synthesis was performed in the same manner as in Compound 3-2 by using 1 g (2.7 mmol, 1 equivalent) of Compound 3-2a and 1.5 equivalents of Compound 3-3b, thereby obtaining 0.93 g (57%) of Compound 3-4.

HR LC/MS/MS m/z calcd for $C_{41}H_{26}BF_2N_3$(M+): 609.2188; found: 609.2187.

<Preparation Example 10> Synthesis of Compound 4-1

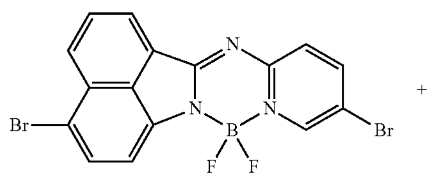

4-1a

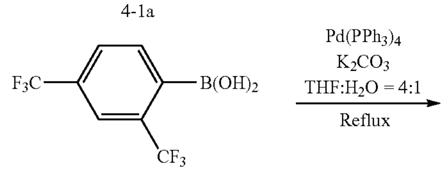

4-1b

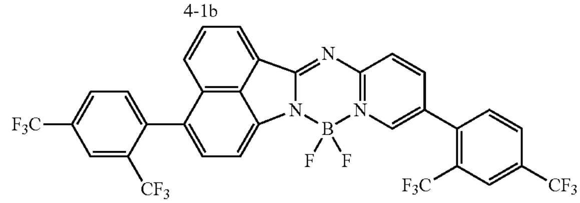

2 g (4.4 mmol, 1 equivalent) of Compound 4-1a and 4 equivalents of Compound 4-1b were put into 60 mL of a tetrahydrofuran solvent, and the temperature was increased to 90° C. under nitrogen while the mixture was stirred. 6 equivalents of potassium carbonate were diluted in 15 mL of water, the diluted potassium carbonate was added thereto, the resulting mixture was heated and stirred for 30 minutes, and then the reaction was performed for 12 hours by adding 0.05 equivalent of $Pd(PPh_3)_4$ thereto. After the reaction was completed, extraction was performed by using water and chloroform, the moisture was removed over anhydrous magnesium sulfate, and then after the solvent was independently separated through a filter and the distillation was performed under reduced pressure, recrystallization was performed with ethanol. 2.3 g (72%) of Compound 4-1 was obtained through this process.

HR LC/MS/MS m/z calcd for $C_{32}H_{14}BF_{14}N_3$ (M+): 717.1057; found: 717.1055.

<Preparation Example 11> Synthesis of Compound 4-2

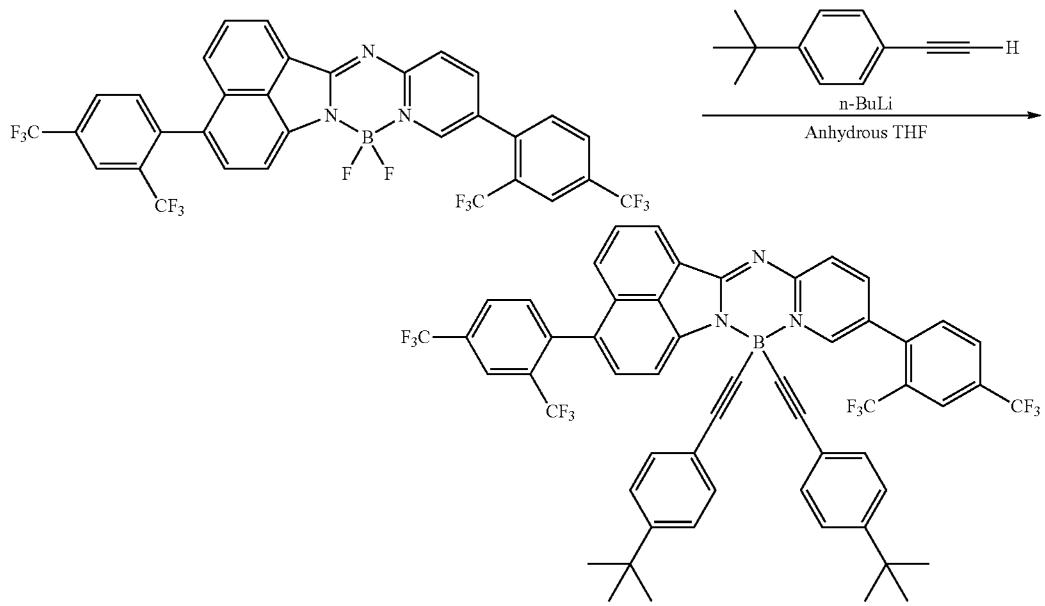

After 1 g (1.39 mmol, 1 equivalent) of Compound 4-1 and 2.1 equivalents of t-butyl ethynylbenzene were dissolved in an anhydrous THF solvent, the resulting solution was stirred and stabilized at −78° C. under nitrogen for 1 hour. 2.05 equivalents of N-butyllithium were slowly added thereto, and after the dropwise addition was completed, the temperature was increased to room temperature, and then the reaction was completed. After the reaction was completed, extraction was performed by using water and chloroform, the moisture was removed over anhydrous magnesium sulfate, and then after the solvent was independently separated through a filter and the distillation was performed under reduced pressure, recrystallization was performed with ethanol. 0.73 g (Y=53%) of Compound 4-2 was obtained through this process.

HR LC/MS/MS m/z calcd for $C_{56}H_{40}BF_{12}N_3$(M+): 993.3124; found: 993.3122.

<Preparation Example 12> Synthesis of Compound 4-3

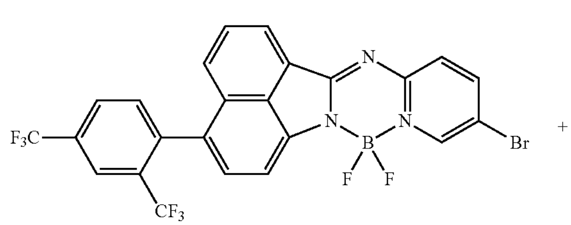

4-2a

-continued

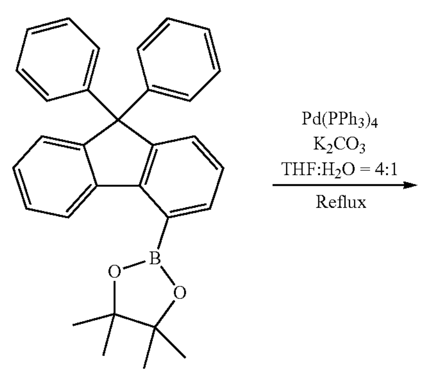

3-3b

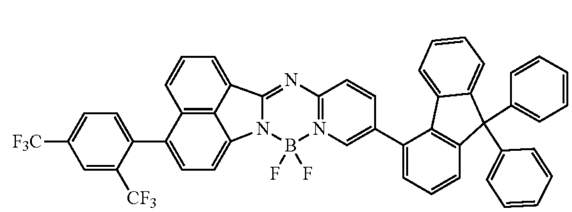

2 g (3.4 mmol, 1 equivalent) of Compound 4-2a and 1.5 equivalents of Compound 3-3b were put into 60 mL of a tetrahydrofuran solvent, and the temperature was increased to 90° C. under nitrogen while the mixture was stirred. 3 equivalents of potassium carbonate were diluted in 15 mL of water, the diluted potassium carbonate was added thereto, the resulting mixture was heated and stirred for 30 minutes, and then the reaction was performed for 12 hours by adding 0.05 equivalent of $Pd(PPh_3)_4$ thereto. After the reaction was completed, extraction was performed by using water and chloroform, the moisture was removed over anhydrous magnesium sulfate, and then after the solvent was independently separated through a filter and the distillation was performed under reduced pressure, recrystallization was performed with ethanol. 2.63 g (94%) of Compound 4-3 was obtained through this process.

HR LC/MS/MS m/z calcd for $C_{49}H_{28}BF_8N_3$(M+): 821.2249; found: 821.2247.

<Preparation Example 13> Synthesis of Compound 4-4

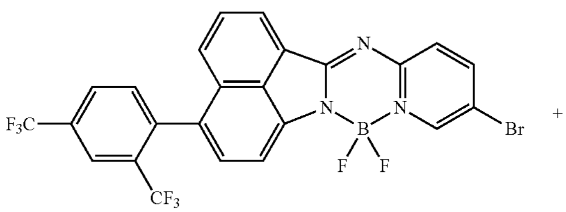

4-2a

-continued

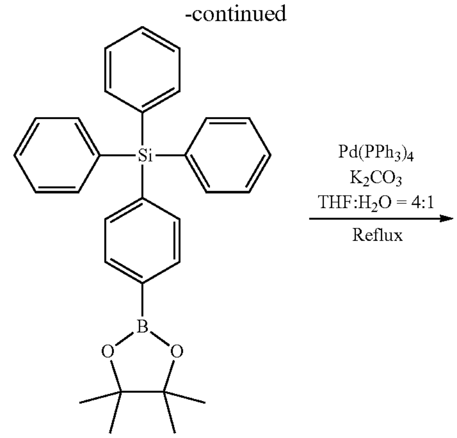

2-2b

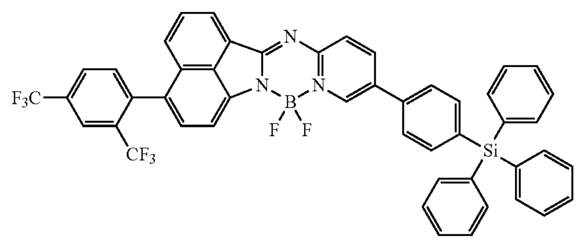

An experiment was performed in the same manner as in Compound 4-2 by using 1 g (1.7 mmol, 1 equivalent) of Compound 4-2a and 1.5 equivalents of Compound 2-2b, thereby obtaining 0.85 g (59%) of Compound 4-4.

HR LC/MS/MS m/z calcd for $C_{48}H_{30}BF_8N_3Si$ (M+): 839.2174; found: 839.2177.

<Preparation Example 14> Synthesis of Compound 4-6

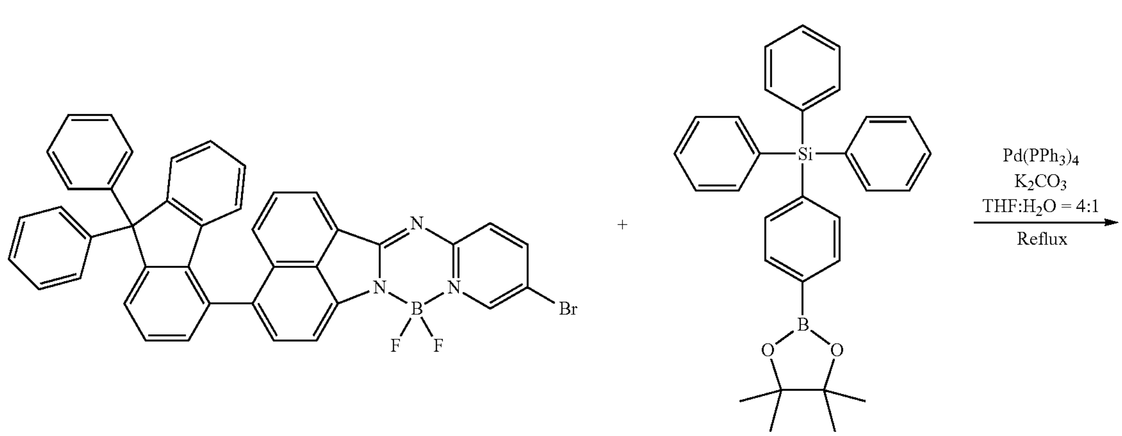

4-5b 2-2b

-continued

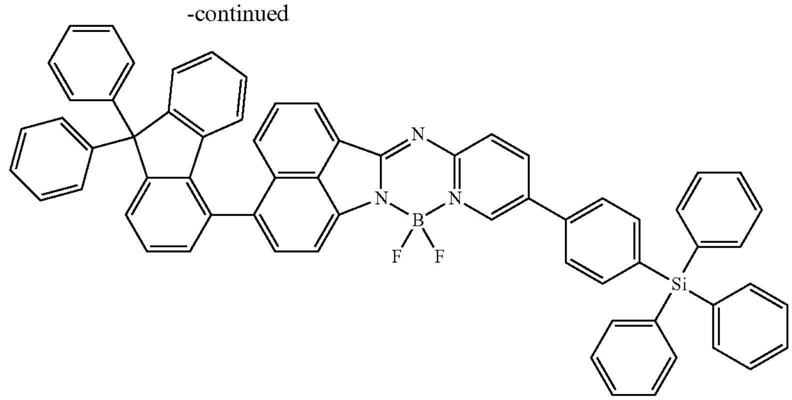

An experiment was performed in the same manner as in Compound 4-2 by using 1 g (1.45 mmol, 1 equivalent) of Compound 4-5a and 1.5 equivalents of Compound 2-2b, thereby obtaining 0.92 g (66%) of Compound 4-6.

HR LC/MS/MS m/z calcd for $C_{65}H_{44}BF_2N_3Si$ (M+): 943.3366; found: 943.3364.

<Preparation Example 15> Synthesis of Compound 4-7

1 g (1.05 mmol, 1 equivalent) of Compound 4-6 was put into a dichloromethane solvent in which aluminum chloride was dissolved, and the resulting mixture was heated and stirred at 55° C. under a nitrogen atmosphere for 10 minutes. Nitrophenol dissolved in the dichloromethane solvent was slowly put thereinto, and the resulting mixture was heated and stirred. After the reaction was terminated, extraction was performed by using chloroform and water, and 0.49 g (Y=39%) of Compound 4-7 was obtained by removing alumina through a silica gel column.

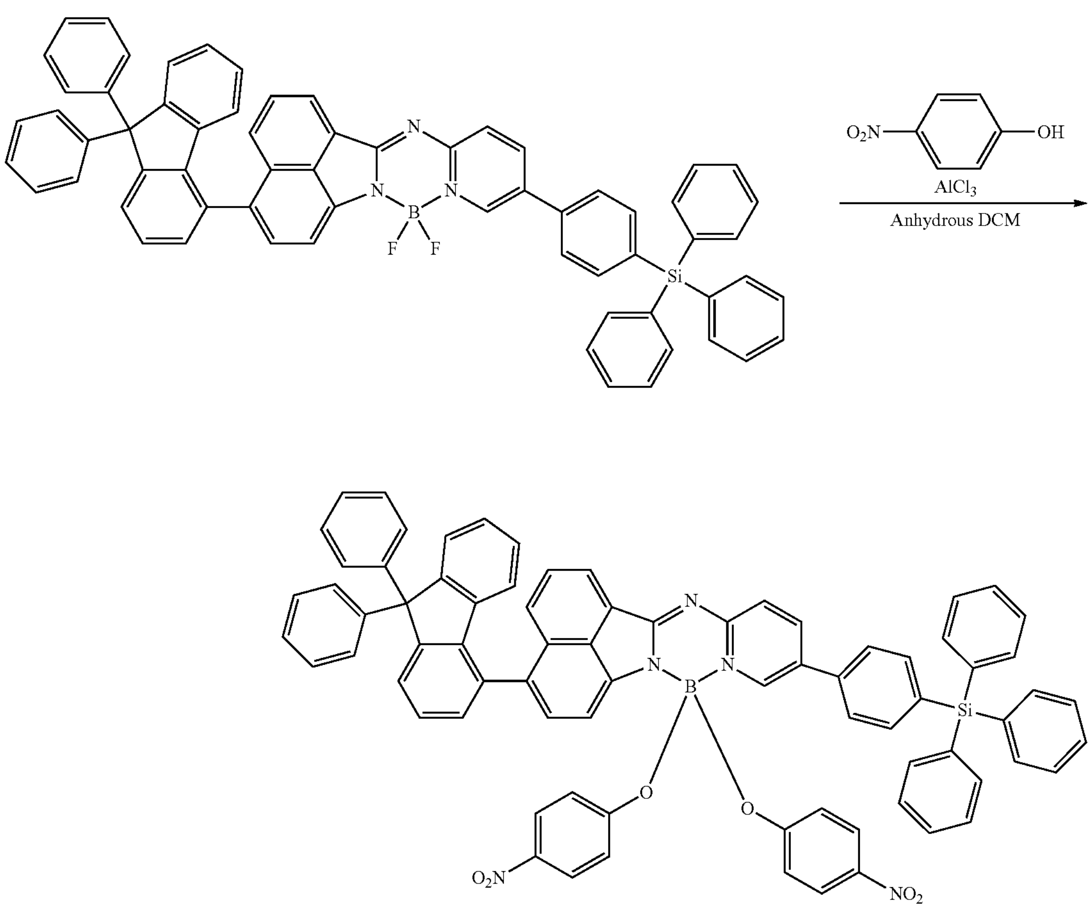

HR LC/MS/MS m/z calcd for $C_{77}H_{52}BN_5O_6Si$ (M+): 1182.3780; found: 1182.3781.

<Preparation Example 16> Synthesis of Compound 5-1

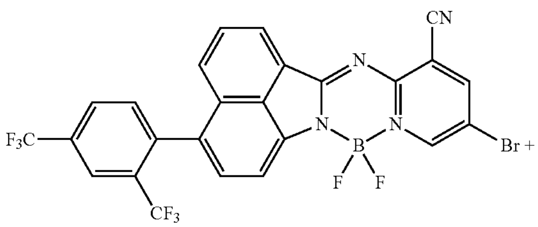

5-1a

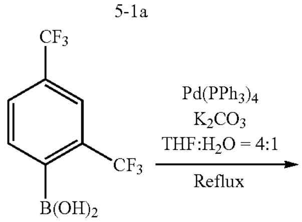

5-1b

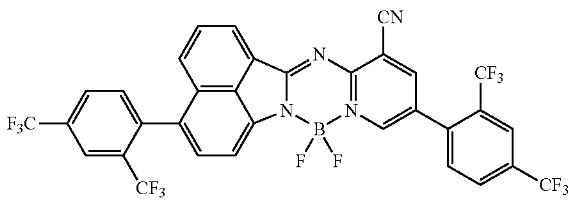

A synthesis was performed in the same manner as in Compound 4-2 by using 3.5 g (5.75 mmol, 1 equivalent) of Compound 5-1a and 3 equivalents of Compound 5-1b, thereby obtaining 3.2 g (75%) of Compound 5-1.

HR LC/MS/MS m/z calcd for $C_{33}H_{13}BF_{14}N_4$(M+): 742.1010; found: 742.1011.

<Preparation Example 17> Synthesis of Compound 5-2

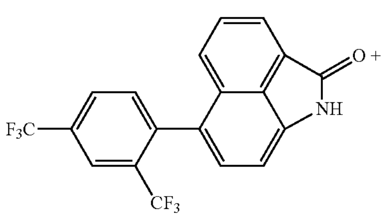

5-2a

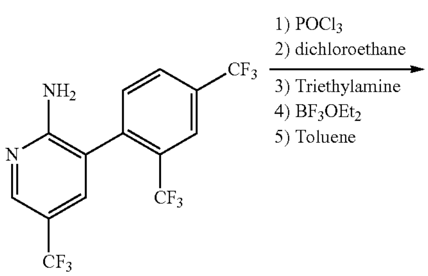

5-2b

-continued

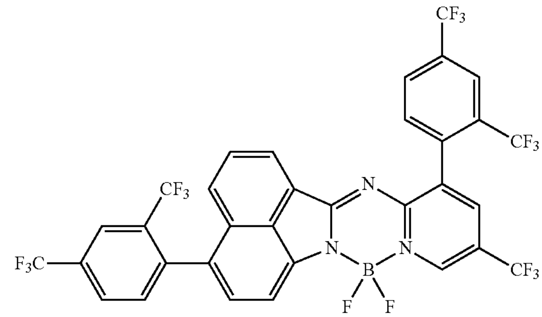

A synthesis was performed in the same manner as in Compound 1-2 by using 2.88 g (4.42 mmol, 1 equivalent) of Compound 5-2a and 2 equivalents of Compound 5-2b, thereby obtaining 2.4 g (41%) of Compound 5-2.

HR LC/MS/MS m/z calcd for $C_{33}H_{13}BF_{17}N_3$(M+): 785.0931; found: 785.0933.

<Preparation Example 18> Synthesis of Compound 5-4

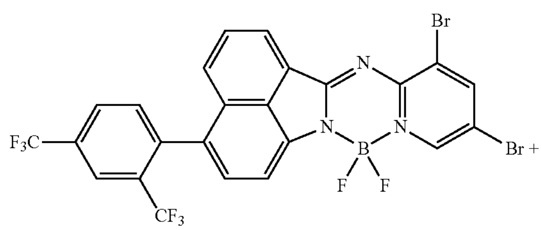

5-4a

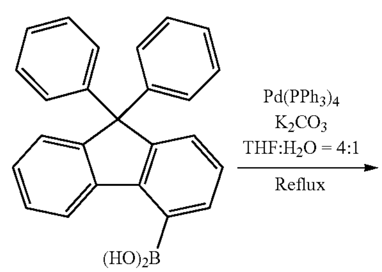

2-3b

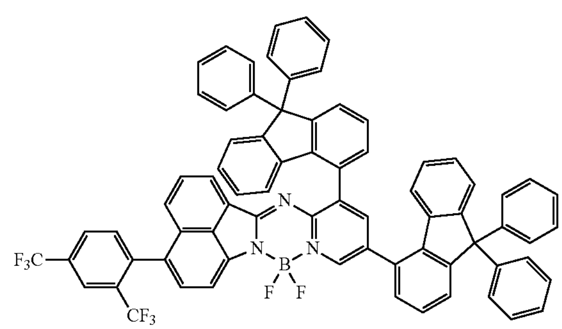

1.5 g (2.3 mmol, 1 equivalent) of Compound 5-4a and 4 equivalents of Compound 2-3b were put into 60 mL of a tetrahydrofuran solvent, and the temperature was increased to 90° C. under nitrogen while the mixture was stirred. 6 equivalents of potassium carbonate were diluted in 15 mL of water, the diluted potassium carbonate was added thereto, the resulting mixture was heated and stirred for 30 minutes, and then the reaction was performed for 12 hours by adding 0.05 equivalent of $Pd(PPh_3)_4$ thereto. After the reaction was completed, extraction was performed by using water and chloroform, the moisture was removed over anhydrous magnesium sulfate, and then after the solvent was independently separated through a filter and the distillation was performed under reduced pressure, recrystallization was performed with ethanol. 2.4 g (93%) of Compound 5-4 was obtained through this process.

HR LC/MS/MS m/z calcd for $C_{74}H_{44}BF_8N_3$ (M+): 1137.3501; found: 1137.3500.

<Preparation Example 19> Synthesis of Compound 5-5

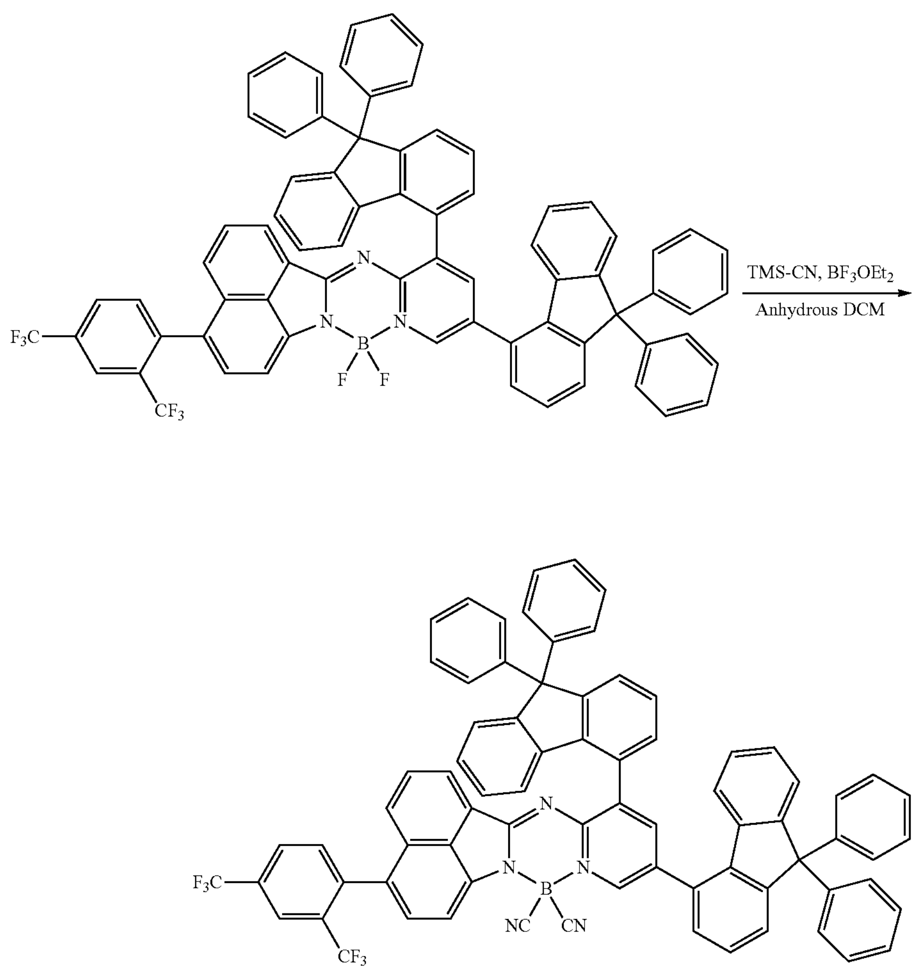

An experiment was performed in the same manner as in Preparation Example 3 by using 1.0 g of Compound 5-4 instead of Compound 1-3, thereby obtaining 0.49 g (Y=48%) of Compound 5-5.

HR LC/MS/MS m/z calcd for $C_{76}H_{44}BF_6N_5$(M+): 1151.3594; found: 1151.3597.

<Preparation Example 20> Synthesis of Compound 5-6

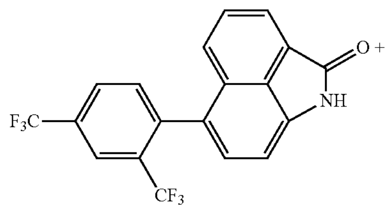

5-2a

-continued

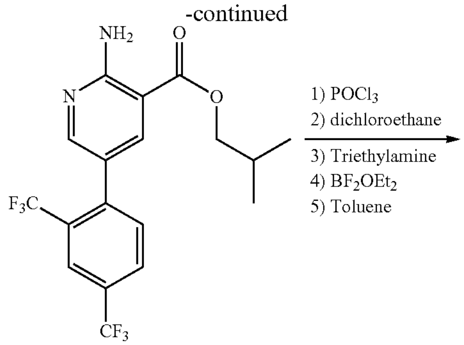

5-6b

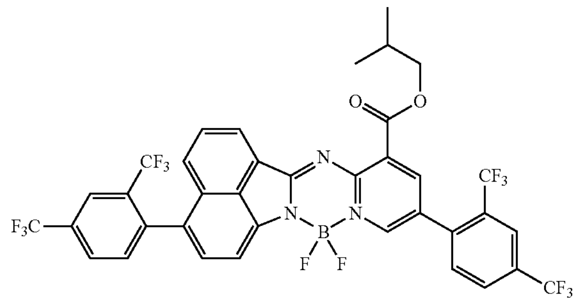

A synthesis was performed in the same manner as in Compound 1-2 by using 2.0 g (5.25 mmol, 1 equivalent) of Compound 5-2a and 2 equivalents of Compound 5-2b, thereby obtaining 3.1 g (73%) of Compound 5-6.

HR LC/MS/MS m/z calcd for $C_{37}H_{22}BF_{14}N_{302}$ (M+): 817.1582; found: 817.1582.

<Preparation Example 21> Synthesis of Compound 5-12

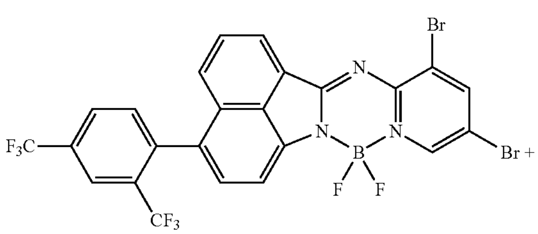

5-4a

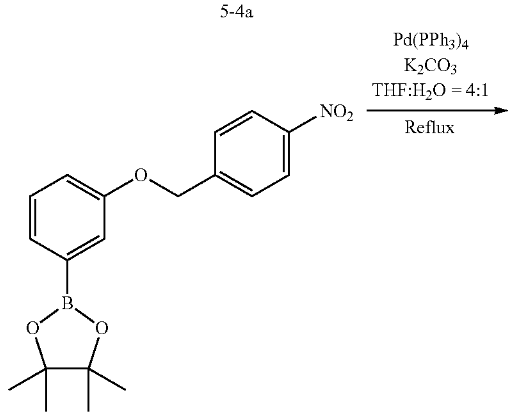

5-11b

-continued

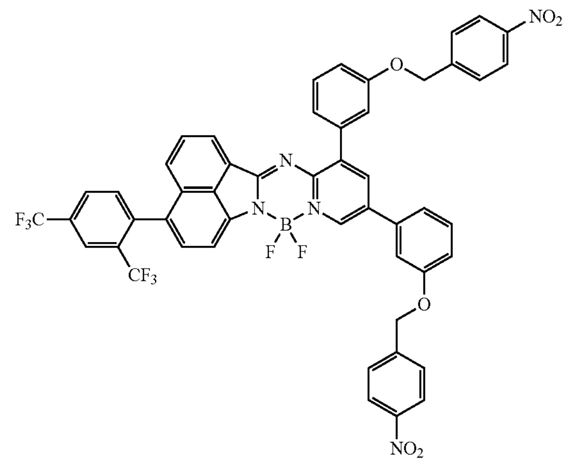

A synthesis was performed in the same manner as in Compound 5-4 by using 1.5 g (2.30 mmol, 1 equivalent) of Compound 5-4a and 4 equivalents of Compound 5-11b, thereby obtaining 2.7 g (93%) of Compound 5-12.

HR LC/MS/MS m/z calcd for $C_{50}H_{30}BF_8N_5O_6$ (M+): 959.2161; found: 959.2162.

<Preparation Example 22> Synthesis of Compound 6-1

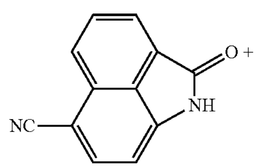

6-1a

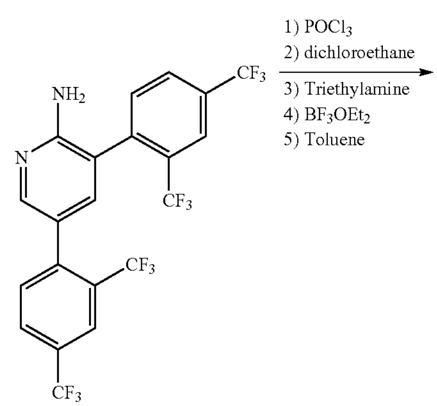

6-1b

-continued

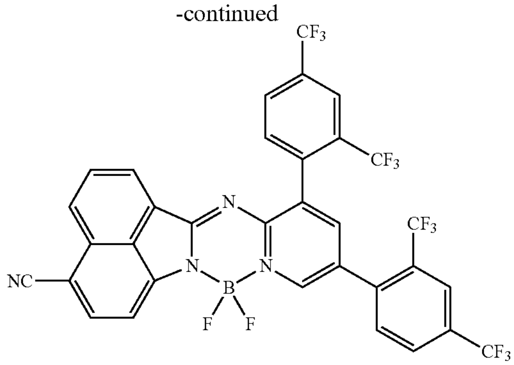

A synthesis was performed in the same manner as in Compound 1-2 by using 3 g (15.4 mmol, 1 equivalent) of Compound 6-1a and 2 equivalents of Compound 6-1b, thereby obtaining 5.2 g (45%) of Compound 6-1.

HR LC/MS/MS m/z calcd for $C_{33}H_{13}BF_{14}N_4$ (M+): 742.1010; found: 742.1011.

<Preparation Example 23> Synthesis of Compound 6-2

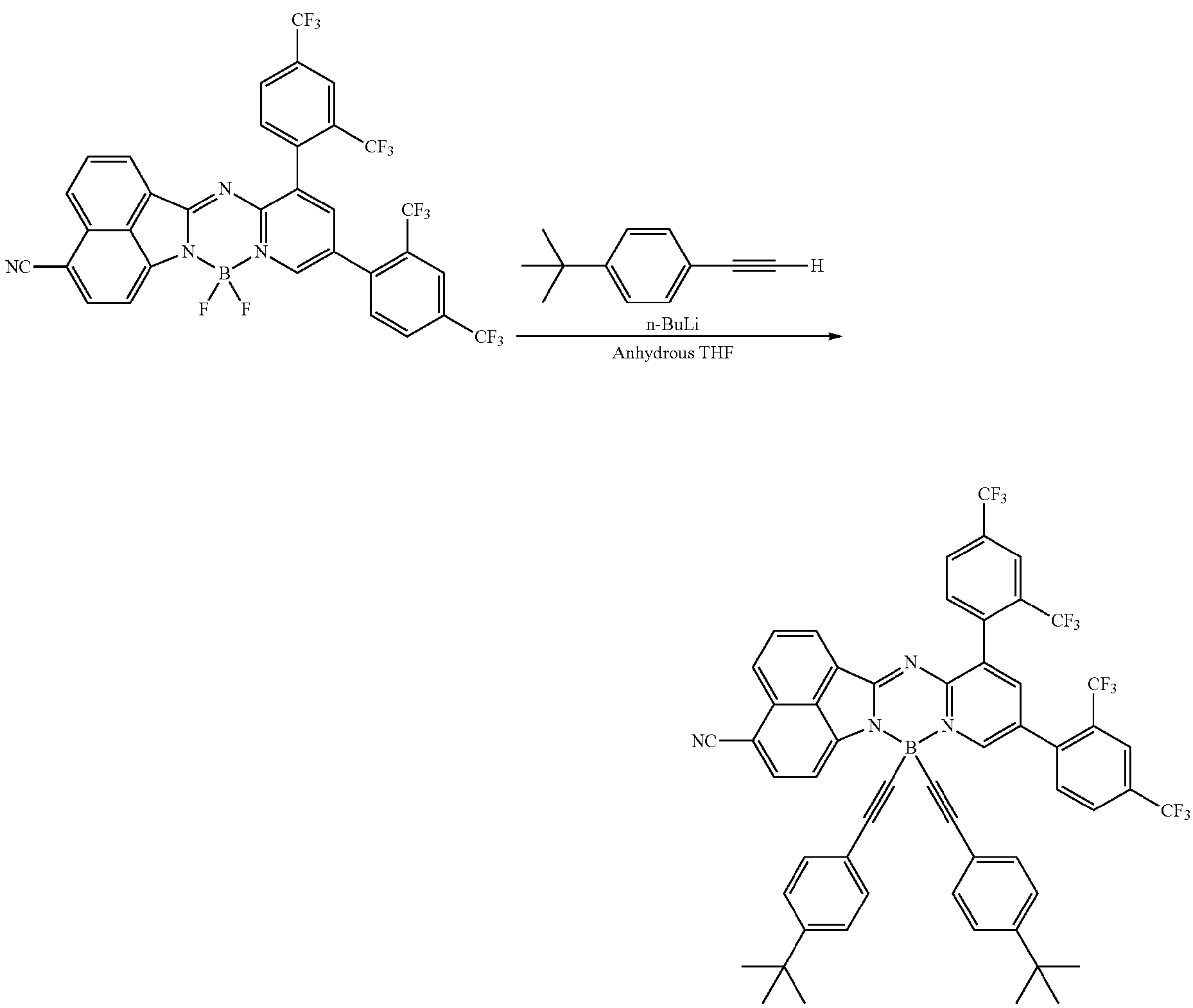

An experiment was performed in the same manner as in Preparation Example 10 by using 1.0 g (1.34 mmol, 1 equivalent) of Compound 6-1 instead of Compound 4-2, thereby obtaining 0.80 g (Y=58%) of Compound 6-2.

HR LC/MS/MS m/z calcd for $C_{57}H_{39}BF_{12}N_4$ (M+): 1018.3076; found: 1018.3077.

<Preparation Example 24> Synthesis of Compound 6-4

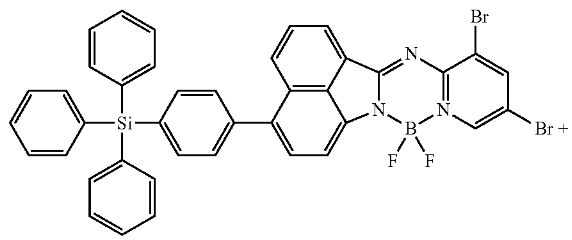

6-3a

-continued

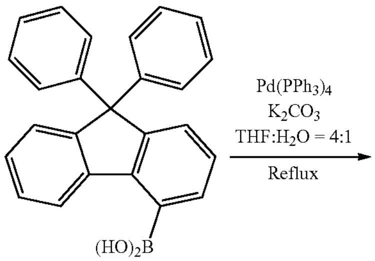

2-3b

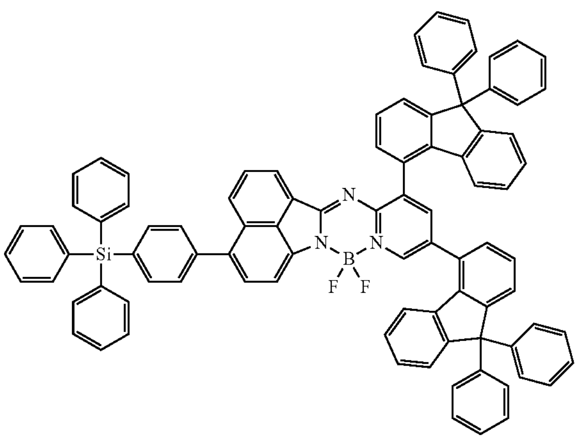

A synthesis was performed in the same manner as in Compound 5-4 by using 1.5 g (1.91 mmol, 1 equivalent) of Compound 6-3a and 4 equivalents of Compound 2-3b, thereby obtaining 2.0 g (83%) of Compound 6-4.

HR LC/MS/MS m/z calcd for $C_{90}H_{60}BF_2N_3Si$ (M+): 1259.4618; found: 1259.4617.

<Preparation Example 25> Synthesis of Compound 6-5

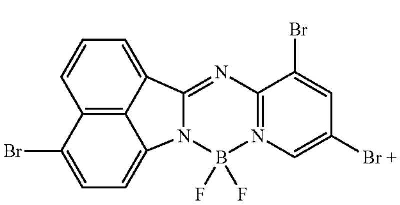

6-4a

-continued

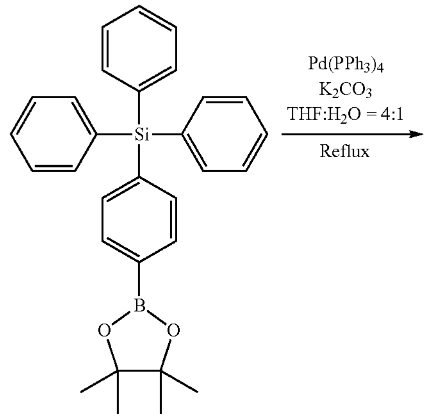

2-2b

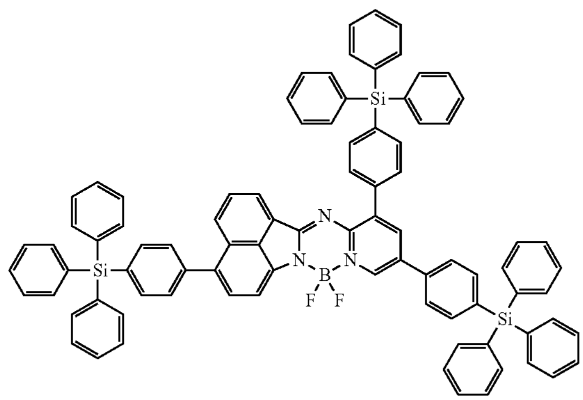

A synthesis was performed in the same manner as in Compound 5-4 by using 0.8 g (1.50 mmol, 1 equivalent) of Compound 6-4a and 4 equivalents of Compound 2-2b, thereby obtaining 1.8 g (94%) of Compound 6-5.

HR LC/MS/MS m/z calcd for $C_{88}H_{64}BF_2N_3Si_3$ (M+): 1295.4469; found: 1295.4469.

<Preparation Example 26> Synthesis of Compound A2

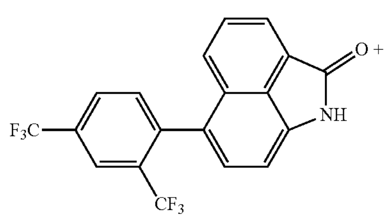

5-2a

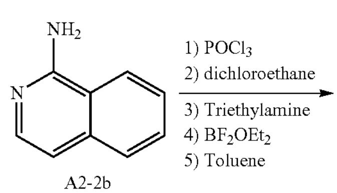

A2-2b

-continued

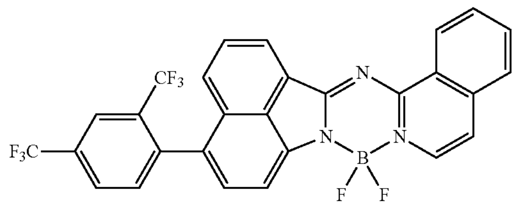

A synthesis was performed in the same manner as in Compound 1-2 by using 2 g (5.25 mmol, 1 equivalent) of Compound 5-2a and 2 equivalents of Compound A2-2b, thereby obtaining 2.0 g (70%) of Compound A2.

HR LC/MS/MS m/z calcd for $C_{28}H_{14}BF_8N_3$ (M+): 555.1153; found: 555.1154.

<Preparation Example 27> Synthesis of Compound A3

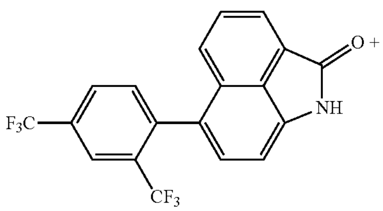

5-2a

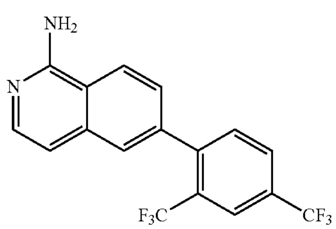

A3-2b

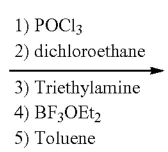

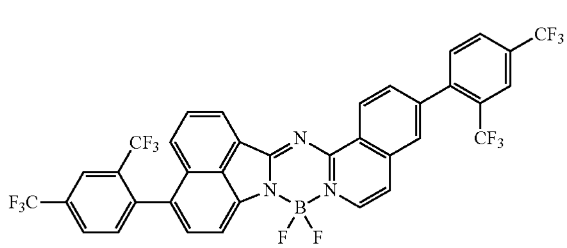

A synthesis was performed in the same manner as in Compound 1-2 by using 2 g (5.25 mmol, 1 equivalent) of Compound 5-2a and 2 equivalents of Compound A3-2b, thereby obtaining 2.5 g (62%) of Compound A3.

HR LC/MS/MS m/z calcd for $C_{36}H_{16}BF_{14}N_3$(M+): 767.1214; found: 767.1222.

<Preparation Example 28> Synthesis of Compound A6

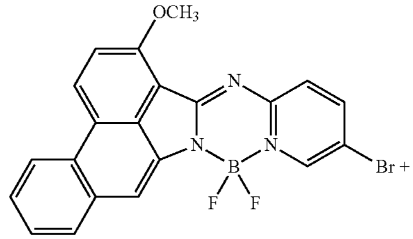

A6-1a

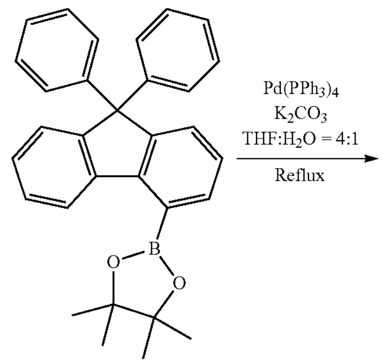

3-3b

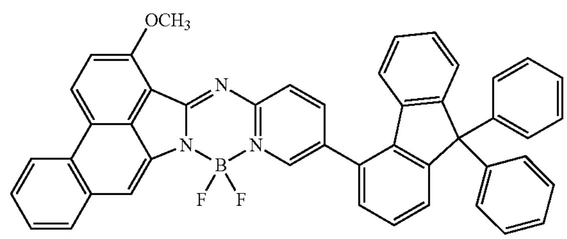

A6

An experiment was performed in the same manner as in Compound 4-2 by using 1 g (2.2 mmol, 1 equivalent) of Compound A6-1a and 1.5 equivalents of Compound 3-3b, thereby obtaining 0.58 g (38%) of Compound A6.

HR LC/MS/MS m/z calcd for $C_{46}H_{30}BF_2N_{30}$ (M+): 689.2450; found: 689.2451.

<Preparation Example 29> Synthesis of Compound A8

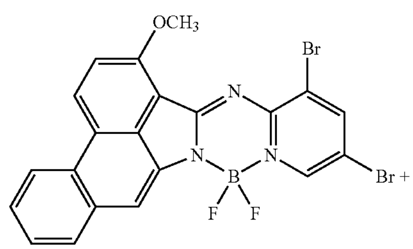

A8-1a

-continued

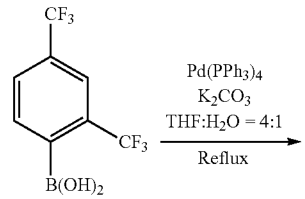

5-1b

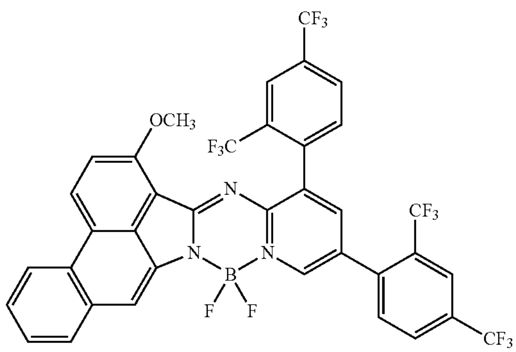

A8

An experiment was performed in the same manner as in Preparation Example 16 by using 1.0 g (1.88 mmol, 1 equivalent) of Compound A8-1a instead of Compound 5-1a, thereby obtaining 1.2 g (Y=80%) of Compound A8.

HR LC/MS/MS m/z calcd for $C_{37}H_{18}BF_{14}N_{30}$ (M+): 797.1319; found: 797.1398.

<Preparation Example 30> Synthesis of Compound 5-3

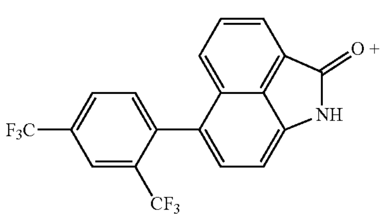

5-2a

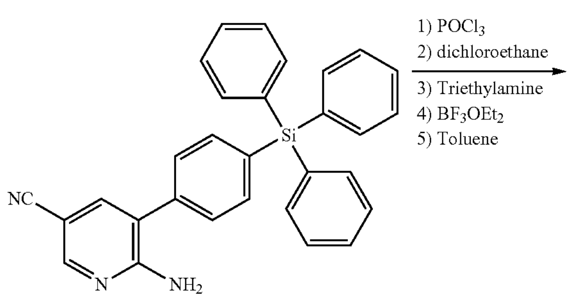

5-3b

-continued

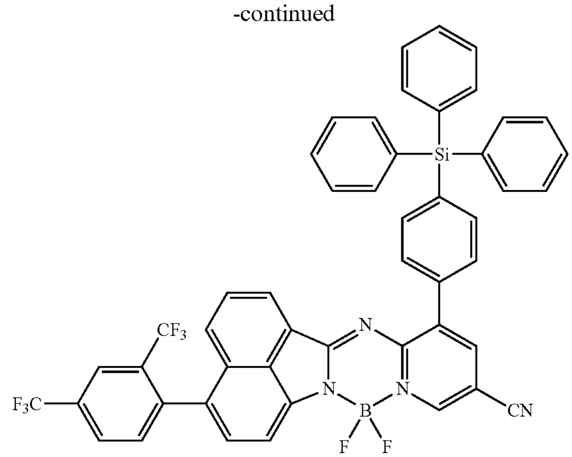

A synthesis was performed in the same manner as in Compound 1-2 by using 2 g (4.42 mmol, 1 equivalent) of Compound 5-2a and 2 equivalents of Compound 5-3b, thereby obtaining 3.3 g (72%) of Compound 5-3.

HR LC/MS/MS m/z calcd for $C_{49}H_{29}BF_8N_4Si$ (M+): 864.2127; found: 864.2127.

Example 1

1.5 parts by weight of Compound 1-2 (maximum absorption wavelength 450 nm, maximum light emission wavelength 493 nm, and full width at half maximum 63 nm in a toluene solution) prepared in Preparation Example 2 were dissolved in a solvent propylene glycol monomethyl ether acetate (PGEMA), 33.9 parts by weight of an acrylic binder, 59.3 parts by weight of a polyfunctional monomer (pentaerythritol triacrylate, Nippon Kayaku Co., Ltd.), 2.3 part by weight of a bonding aid and a surfactant (KBM 503, Shinetsu), and 3.0 parts by weight of a photoinitiator (Tinuvin® 477, BASF) were dissolved in a solvent propylene glycol monomethyl ether acetate (PGEMA) such that a solid content was 21 wt %, thereby preparing a solution. After the mixed solution was sufficiently stirred, a thin film was coated onto a glass substrate, and then dried to prepare a color conversion film. The brightness spectrum of the prepared color conversion film was measured by a spectroradiometer (SR series manufactured by Topcon, Inc.). Specifically, the prepared color conversion film was stacked on one surface of a light guide plate of a backlight unit including an LED blue backlight (maximum light emission wavelength 450 nm) and the light guide plate, a prism sheet and a DBEF film were stacked on the color conversion film, and then an initial value was set, such that the luminance of the blue LED light was 600 nit based on the film.

Example 2

An experiment was performed in the same manner as in Example 1, except that in Example 1, Compound 2-3 (maximum absorption wavelength 463 nm, maximum light emission wavelength 506 nm, and full width at half maximum 56 nm in a toluene solution) was used instead of Compound 1-2.

Example 3

An experiment was performed in the same manner as in Example 1, except that in Example 1, Compound 2-4

(maximum absorption wavelength 460 nm, maximum light emission wavelength 503 nm, and full width at half maximum 57 nm in a toluene solution) was used instead of Compound 1-2.

Example 4

An experiment was performed in the same manner as in Example 1, except that in Example 1, Compound 3-4 (maximum absorption wavelength 453 nm, maximum light emission wavelength 519 nm, and full width at half maximum 80 nm in a toluene solution) was used instead of Compound 1-2.

Example 5

An experiment was performed in the same manner as in Example 1, except that in Example 1, Compound 4-1 (maximum absorption wavelength 453 nm, maximum light emission wavelength 499 nm, and full width at half maximum 63 nm in a toluene solution) was used instead of Compound 1-2.

Example 6

An experiment was performed in the same manner as in Example 1, except that in Example 1, Compound 4-2 (maximum absorption wavelength 455 nm, maximum light emission wavelength 501 nm, and full width at half maximum 60 nm in a toluene solution) was used instead of Compound 1-2.

Example 7

An experiment was performed in the same manner as in Example 1, except that in Example 1, Compound 4-6 (maximum absorption wavelength 476 nm, maximum light emission wavelength 508 nm, and full width at half maximum 70 nm in a toluene solution) was used instead of Compound 1-2.

Example 8

An experiment was performed in the same manner as in Example 1, except that in Example 1, Compound 4-7 (maximum absorption wavelength 475 nm, maximum light emission wavelength 509 nm, and full width at half maximum 72 nm in a toluene solution) was used instead of Compound 1-2.

Example 9

An experiment was performed in the same manner as in Example 1, except that in Example 1, Compound 5-2 (maximum absorption wavelength 466 nm, maximum light emission wavelength 486 nm, and full width at half maximum 72 nm in a toluene solution) was used instead of Compound 1-2.

Example 10

An experiment was performed in the same manner as in Example 1, except that in Example 1, Compound 5-3 (maximum absorption wavelength 461 nm, maximum light emission wavelength 505 nm, and full width at half maximum 61 nm in a toluene solution) was used instead of Compound 1-2.

Example 11

An experiment was performed in the same manner as in Example 1, except that in Example 1, Compound 5-4 (maximum absorption wavelength 461 nm, maximum light emission wavelength 507 nm, and full width at half maximum 59 nm in a toluene solution) was used instead of Compound 1-2.

Example 12

An experiment was performed in the same manner as in Example 1, except that in Example 1, Compound 5-5 (maximum absorption wavelength 456 nm, maximum light emission wavelength 496 nm, and full width at half maximum 74 nm in a toluene solution) was used instead of Compound 1-2.

Example 13

An experiment was performed in the same manner as in Example 1, except that in Example 1, Compound 5-6 (maximum absorption wavelength 452 nm, maximum light emission wavelength 495 nm, and full width at half maximum 71 nm in a toluene solution) was used instead of Compound 1-2.

Example 14

An experiment was performed in the same manner as in Example 1, except that in Example 1, Compound 6-1 (maximum absorption wavelength 476 nm, maximum light emission wavelength 532 nm, and full width at half maximum 70 nm in a toluene solution) was used instead of Compound 1-2.

Example 15

An experiment was performed in the same manner as in Example 1, except that in Example 1, Compound 6-2 (maximum absorption wavelength 481 nm, maximum light emission wavelength 535 nm, and full width at half maximum 67 nm in a toluene solution) was used instead of Compound 1-2.

Example 16

An experiment was performed in the same manner as in Example 1, except that in Example 1, Compound 6-4 (maximum absorption wavelength 476 nm, maximum light emission wavelength 532 nm, and full width at half maximum 70 nm in a toluene solution) was used instead of Compound 1-2.

Example 17

An experiment was performed in the same manner as in Example 1, except that in Example 1, Compound 6-5 (maximum absorption wavelength 476 nm, maximum light emission wavelength 508 nm, and full width at half maximum 70 nm in a toluene solution) was used instead of Compound 1-2.

Example 18

An experiment was performed in the same manner as in Example 1, except that in Example 1, Compound A2 (maximum absorption wavelength 473 nm, maximum light emission wavelength 514 nm, and full width at half maximum 83 nm in a toluene solution) was used instead of Compound 1-2.

Example 19

An experiment was performed in the same manner as in Example 1, except that in Example 1, Compound A8 (maximum absorption wavelength 478 nm, maximum light emission wavelength 521 nm, and full width at half maximum 85 nm in a toluene solution) was used instead of Compound 1-2.

Comparative Example 1

An experiment was performed in the same manner as in Example 1, except that in Example 1, a commercially available Pigment Y-083 (manufactured by BASF Corporation) was used instead of Compound 1-2.

Comparative Example 2

An experiment was performed in the same manner as in Example 1, except that in Example 1, Comparative Compound 1 was used instead of Compound 1-2.

Comparative Example 3

An experiment was performed in the same manner as in Example 1, except that in Example 1, Comparative Compound 2 was used instead of Compound 1-2.

Comparative Example 4

An experiment was performed in the same manner as in Example 1, except that in Example 1, Comparative Compound 3 was used instead of Compound 1-2.

[Comparative Compound 1]

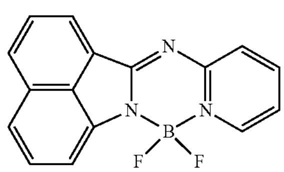

[Comparative Compound 2]

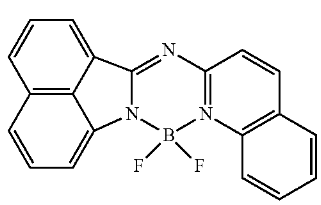

[Comparative Compound 3]

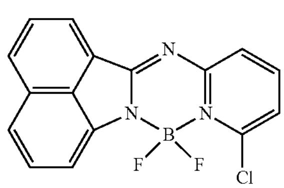

For the prepared thin films, the light emission wavelengths and the full widths at half maximum were measured by using an FS-2 apparatus manufactured by Scinco Co., Ltd., and the quantum efficiencies of the thin films were measured by using a Quantarurs-QY (C11347-11) apparatus manufactured by Hammatsu Corporation. The Abs. intensity was measured by using a Mega-200 apparatus manufactured by Scinco Co., Ltd., and an absorbance at 445 nm was quantified based on an absorption wavelength of 450 nm.

TABLE 1

| | Compound | Thin film light emission wavelength λmax (nm) | Thin film light emission wavelength FWHM (nm) | Quantum efficiency (QY, %) | Abs intensity (445 nm, %) |
|---|---|---|---|---|---|
| Example 1 | 1-2 | 500 | 71 | 80.5 | 93.5 |
| Example 2 | 2-3 | 515 | 60 | 80.7 | 93.5 |
| Example 3 | 2-4 | 513 | 60 | 79.3 | 94.1 |
| Example 4 | 3-4 | 530 | 85 | 80.9 | 93.7 |
| Example 5 | 4-1 | 503 | 77 | 81.7 | 94.0 |
| Example 6 | 4-2 | 505 | 75 | 81.0 | 93.5 |
| Example 7 | 4-6 | 528 | 73 | 80.0 | 93.1 |
| Example 8 | 4-7 | 529 | 75 | 80.0 | 92.5 |
| Example 9 | 5-2 | 509 | 82 | 83.1 | 94.2 |
| Example 10 | 5-3 | 510 | 76 | 82.7 | 94.8 |
| Example 11 | 5-4 | 509 | 76 | 82.1 | 94.1 |
| Example 12 | 5-5 | 512 | 77 | 81.7 | 95.2 |
| Example 13 | 5-6 | 509 | 74 | 82.1 | 94.5 |
| Example 14 | 6-1 | 503 | 72 | 82.1 | 91.5 |
| Example 15 | 6-2 | 506 | 74 | 81.9 | 92.1 |
| Example 16 | 6-4 | 568 | 75 | 81.4 | 94.7 |
| Example 17 | 6-5 | 566 | 70 | 81.1 | 93.8 |
| Example 18 | A2 | 513 | 82 | 79.8 | 89.5 |
| Example 19 | A8 | 530 | 85 | 77.3 | 88.7 |
| Comparative Example 1 | Y-083 | 526 | 50 | 48.5 | 92.7 |
| Comparative Example 2 | Comparative Compound 1 | 516 | 74 | 74.5 | 91.2 |
| Comparative Example 3 | Comparative Compound 2 | 534 | 77 | 75.7 | 92.8 |
| Comparative Example 4 | Comparative Compound 3 | 526 | 77 | 77.0 | 90.7 |

The invention claimed is:

1. A compound represented by the following Chemical Formula 1:

[Chemical Formula 1]

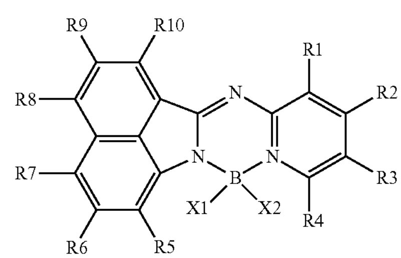

in Chemical Formula 1, at least one of R1 to R4 is a cyano group; —$CO_2$R; —$SO_3$R'; —CONR"R'"; a substituted or unsubstituted fluoroalkyl group; a substituted or unsubstituted alkenyl group; a substituted or unsubstituted alkynyl group; a substituted or unsubstituted silyl group; a substituted or unsubstituted aryl group; a substituted or unsubstituted aryloxy group; a substituted or unsubstituted arylamine group; a substituted or unsubstituted heterocyclic group; or a substituted or unsubstituted hydrocarbon ring group, or at least one of R5 to R10 is a cyano group; —$CO_2$R; —$SO_3$R'; —CONR"R'"; a substituted or unsubstituted alkyl group; a substituted or unsubstituted alkoxy group; a substituted or unsubstituted fluoroalkyl group; a substituted or unsubstituted alkenyl group; a substituted or unsubstituted alkynyl group; a substituted or unsubstituted silyl group; a substituted or unsubstituted aryl group; a substituted or unsubstituted aryloxy group; a substituted or unsubstituted arylamine group; a substituted or unsubstituted heterocyclic group; or a substituted or unsubstituted hydrocarbon ring group, the others are hydrogen; or deuterium, or adjacent groups are bonded to an adjacent group to form a substituted or unsubstituted ring, X1 and X2 are the same as or different from each other, and are each independently a halogen group; a cyano group; —$CO_2$R""; a substituted or unsubstituted alkyl group; a substituted or unsubstituted alkynyl group; a substituted or unsubstituted alkoxy group; a substituted or unsubstituted alkenyl group; a substituted or unsubstituted silyl group; a substituted or unsubstituted aryloxy group; a substituted or unsubstituted aryl group; a substituted or unsubstituted heterocyclic group; or a substituted or unsubstituted hydrocarbon ring group, or X1 and X2 are bonded to each other to form a substituted or unsubstituted ring, and R, R', R", R'", and R"" are the same as or different from each other, and are each independently a substituted or unsubstituted alkyl group; a substituted or unsubstituted fluoroalkyl group; a substituted or unsubstituted alkoxy group; a substituted or unsubstituted alkenyl group; a substituted or unsubstituted alkynyl group; a substituted or unsubstituted silyl group; a substituted or unsubstituted aryl group; a substituted or unsubstituted heterocyclic group; or a substituted or unsubstituted hydrocarbon ring group.

2. The compound of claim 1, wherein Chemical Formula 1 is represented by any one of the following Chemical Formulae 2 to 8:

[Chemical Formula 2]

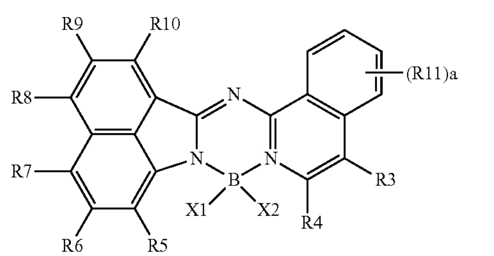

[Chemical Formula 3]

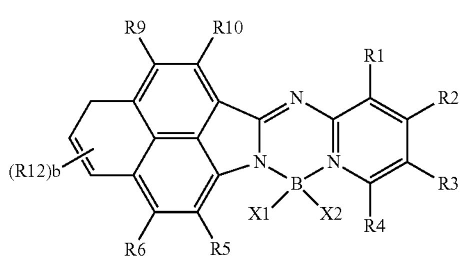

-continued

[Chemical Formula 4]

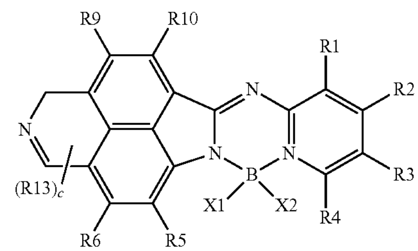

[Chemical Formula 5]

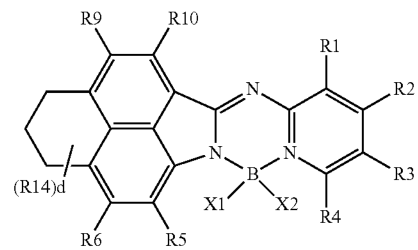

[Chemical Formula 6]

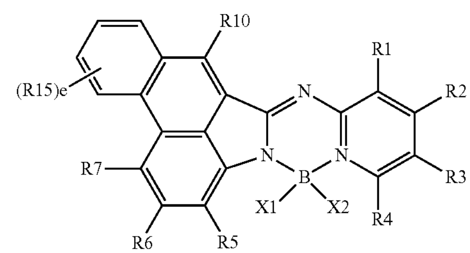

[Chemical Formula 7]

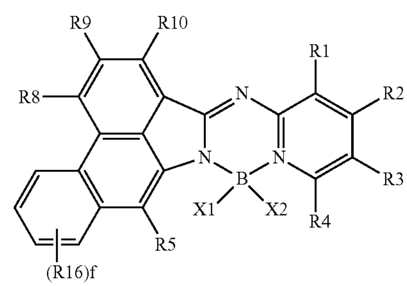

[Chemical Formula 8]

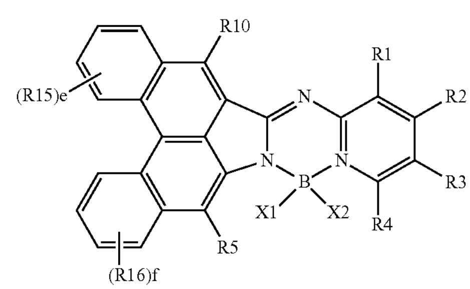

in Chemical Formulae 2 to 8, at least one of R1 to R16 is a cyano group; —$CO_2$R; —$SO_3$R'; —CONR"R'"; a substituted or unsubstituted fluoroalkyl group; a substituted or unsubstituted alkenyl group; a substituted or unsubstituted alkynyl group; a substituted or unsubstituted silyl group; a substituted or unsubstituted aryl group; a substituted or unsubstituted aryloxy group; a substituted or unsubstituted arylamine group; a substituted or unsubstituted heterocyclic group; or a substituted or unsubstituted hydrocarbon ring group, the others are hydrogen; or deuterium, or adjacent groups are bonded to each other to form a substituted or unsubstituted ring, a, b, e, and f are an integer of 0 to 4, c is an integer of 0 to 3, and d is an integer of 0 to 6, and when a to f are 2 or more, substituents in the parenthesis are the same as or different from each other, and the definitions of R, R', R'', R''', X1, and X2 are the same as those in Chemical Formula 1.

3. The compound of claim 1, wherein at least one of R1 to R4 is a cyano group; —$CO_2$R; —$SO_3$R'; —CONR''R'''; a substituted or unsubstituted trifluoromethyl group; a substituted or unsubstituted phenyl group; a substituted or unsubstituted naphthyl group; a substituted or unsubstituted anthracene group; a substituted or unsubstituted biphenyl group; a substituted or unsubstituted fluorenyl group; a substituted or unsubstituted phenoxy group; a substituted or unsubstituted silyl group; a substituted or unsubstituted quinoline group; a substituted or unsubstituted quinoxaline group; a substituted or unsubstituted benzofuran group; a substituted or unsubstituted benzothiophene group; a substituted or unsubstituted indole group; a substituted or unsubstituted benzimidazole group; a substituted or unsubstituted tetrahydro naphthalene group; a substituted or unsubstituted dihydro indene group; a substituted or unsubstituted pyridine group; a substituted or unsubstituted dibenzofuran group; a substituted or unsubstituted dibenzothiophene group; a substituted or unsubstituted carbazole group; a substituted or unsubstituted oxazole group; a substituted or unsubstituted thiazole group; a substituted or unsubstituted thiophene group; a substituted or unsubstituted pyrrole group; a substituted or unsubstituted benzoxazole group; a substituted or unsubstituted 1,2,3,4-tetrahydronaphthalene group; a substituted or unsubstituted 2,3-dihydro-1H-indene group; a substituted or unsubstituted vinyl group; or a substituted or unsubstituted ethynyl group, or at least one of R5 to R10 is a cyano group; —$CO_2$R; —$SO_3$R'; —CONR''R'''; a substituted or unsubstituted methyl group; a substituted or unsubstituted trifluoromethyl group; a substituted or unsubstituted phenyl group; a substituted or unsubstituted anthracene group; a substituted or unsubstituted naphthyl group; a substituted or unsubstituted biphenyl group; a substituted or unsubstituted fluorenyl group; a substituted or unsubstituted phenoxy group; a substituted or unsubstituted silyl group; a substituted or unsubstituted quinoline group; a substituted or unsubstituted quinoxaline group; a substituted or unsubstituted benzofuran group; a substituted or unsubstituted benzothiophene group; a substituted or unsubstituted indole group; a substituted or unsubstituted benzimidazole group; a substituted or unsubstituted tetrahydro naphthalene group; a substituted or unsubstituted dihydro indene group; a substituted or unsubstituted pyridine group; a substituted or unsubstituted dibenzofuran group; a substituted or unsubstituted dibenzothiophene group; a substituted or unsubstituted carbazole group; a substituted or unsubstituted oxazole group; a substituted or unsubstituted thiazole group; a substituted or unsubstituted thiophene group; a substituted or unsubstituted pyrrole group; a substituted or unsubstituted benzoxazole group; a substituted or unsubstituted 1,2,3,4-tetrahydronaphthalene group; a substituted or unsubstituted 2,3-dihydro-1H-indene group; a substituted or unsubstituted vinyl group; or a substituted or unsubstituted ethynyl group.

4. The compound of claim 1, wherein X1 and X2 are the same as or different from each other, and are each independently a fluorine group; a cyano group; —$CO_2$R''''; a methyl group; a hexyl group; a phenoxy group substituted with a nitro group or a propyl group; a methoxy group; an ethoxy group; a phenyl group unsubstituted or substituted with fluorine group, an ethoxy group or a propyl group; a dimethylfluorenyl group; a thiophene group;

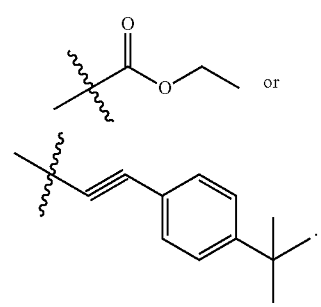

5. The compound of claim 1, wherein Chemical Formula 1 is any one selected from the following structural formulae:

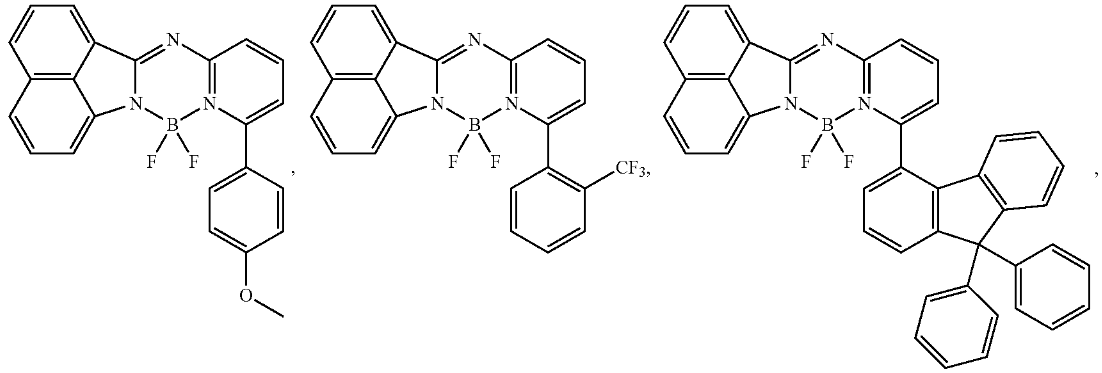

-continued
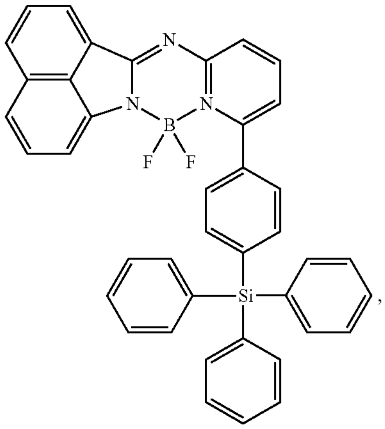
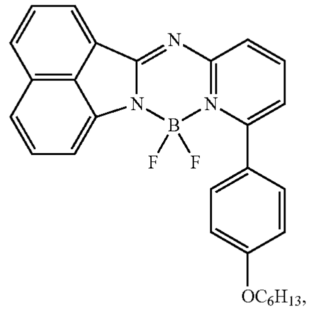
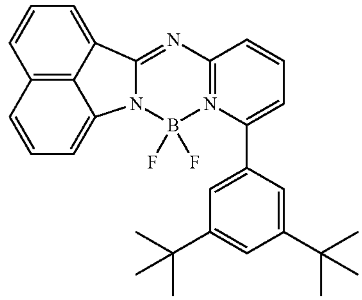
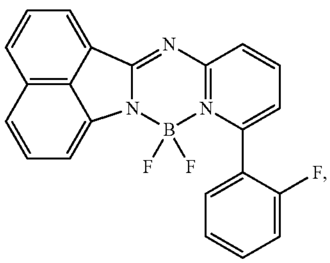
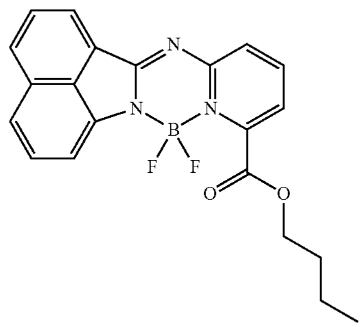
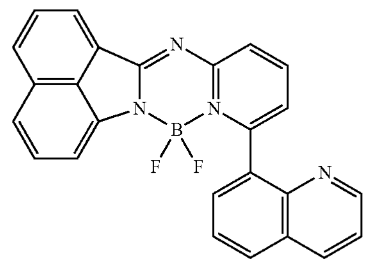
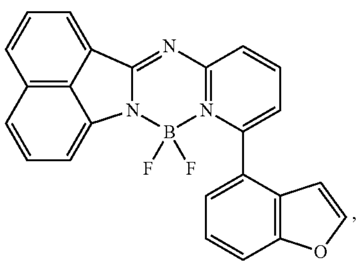
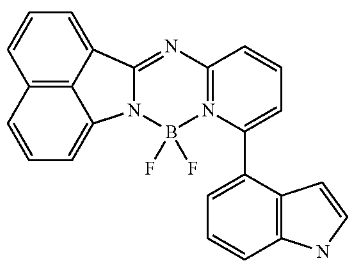
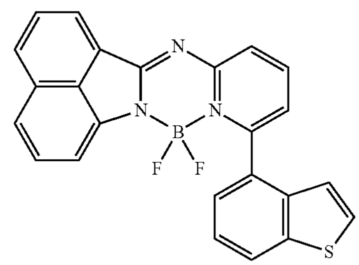
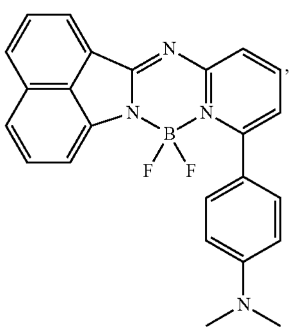
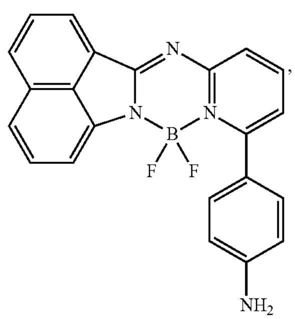
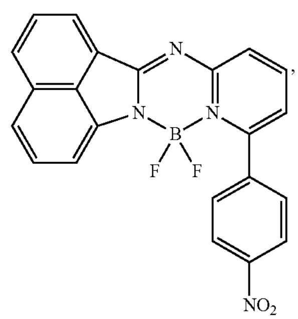
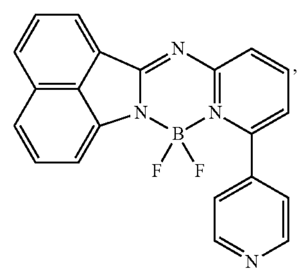
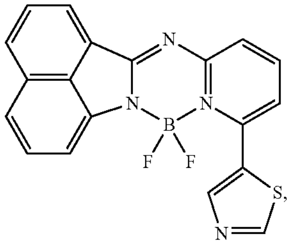
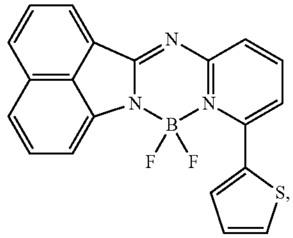
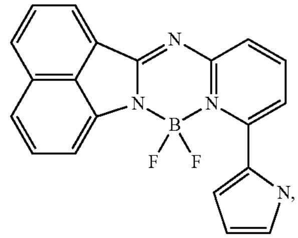
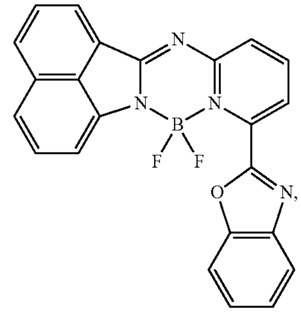

-continued
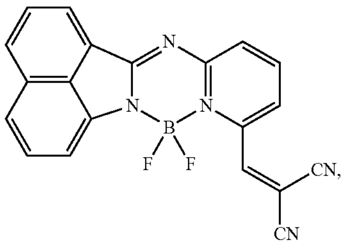
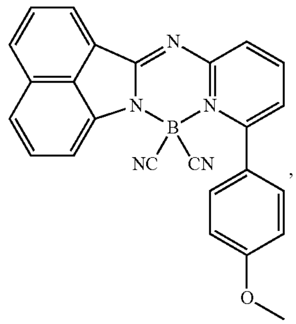
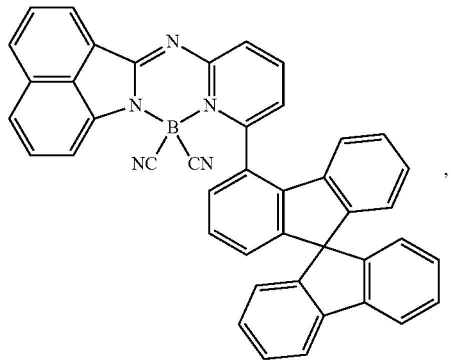
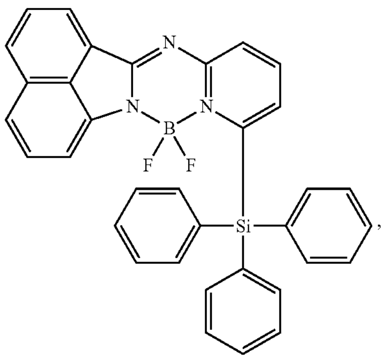
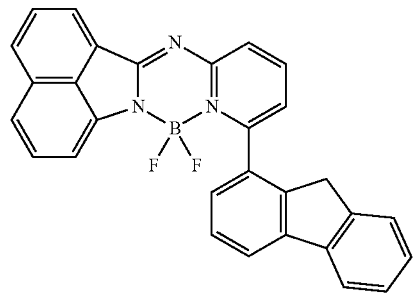
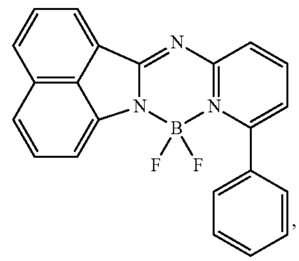
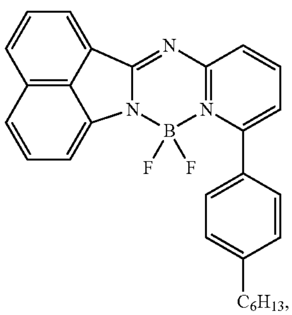
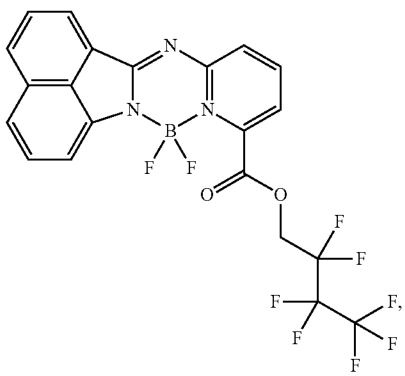
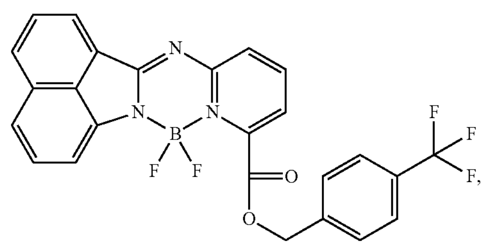
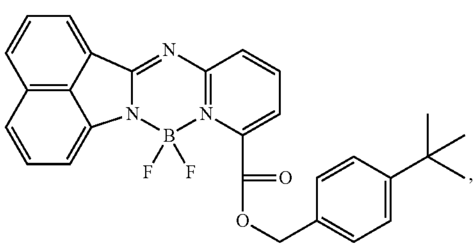
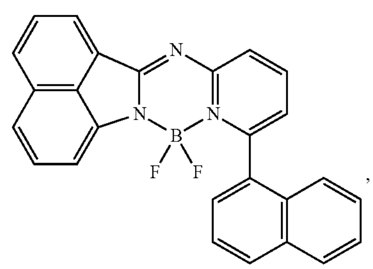
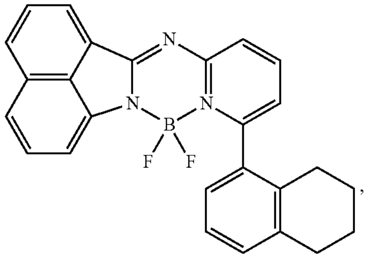
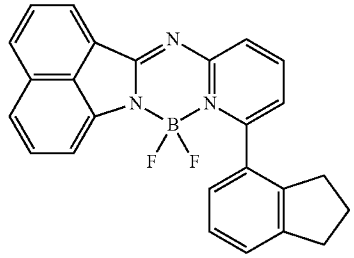

-continued
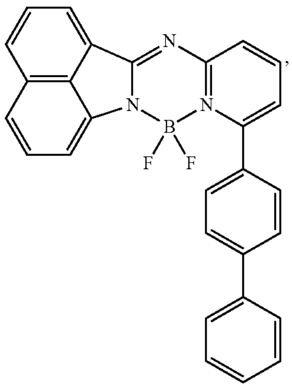,
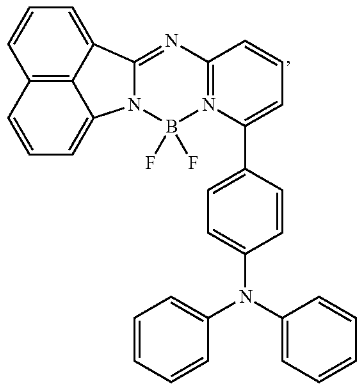,
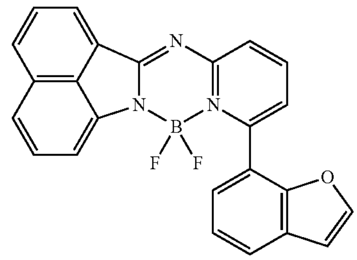,
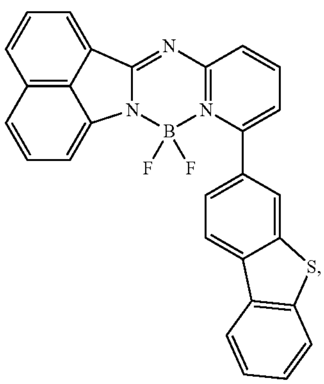
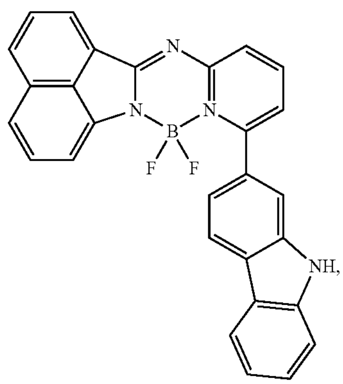
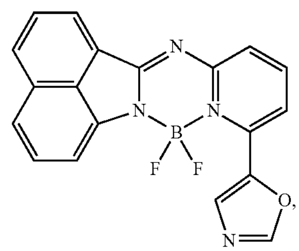
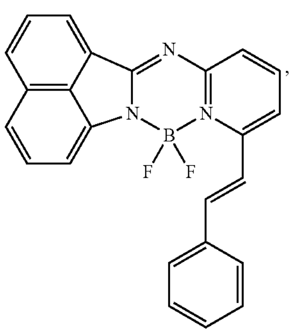,
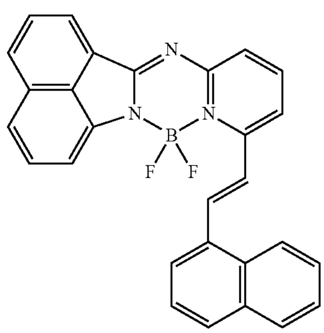,
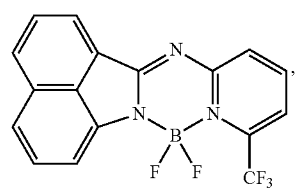,
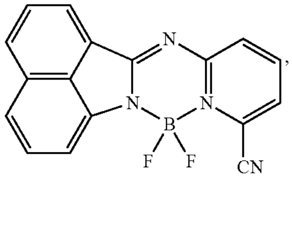,
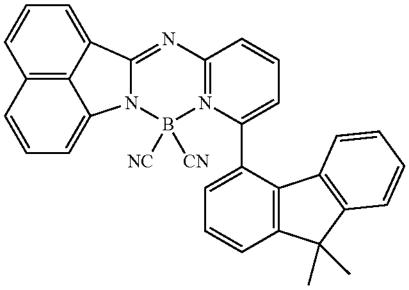,
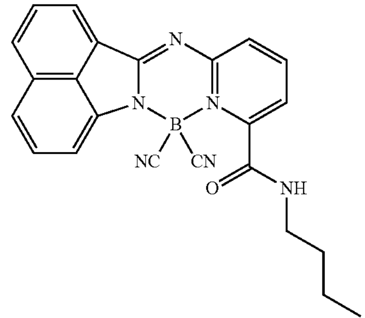, -continued
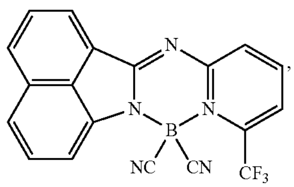,
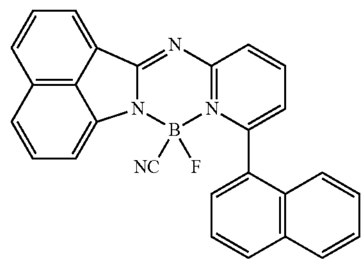,
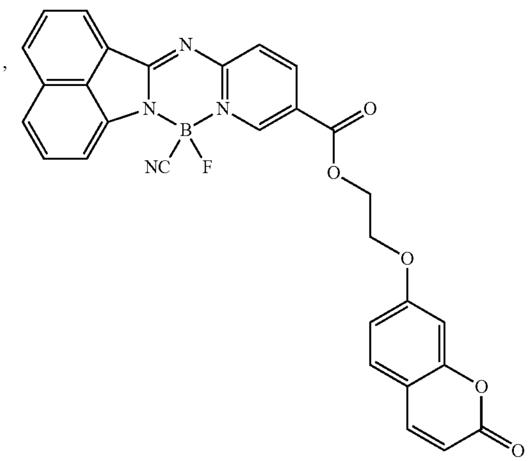,
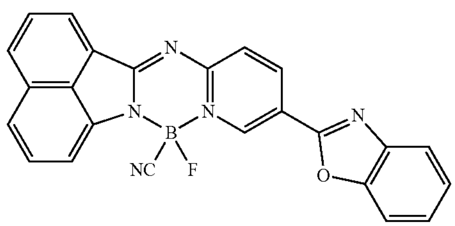,
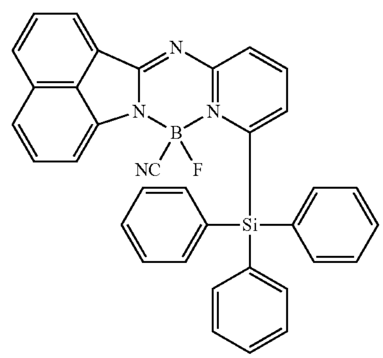,
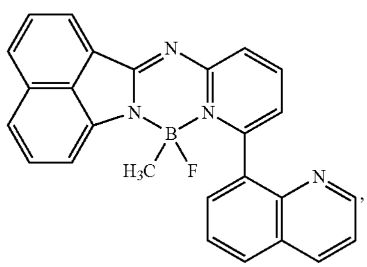,
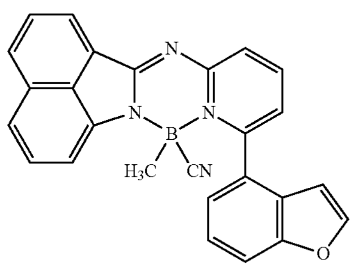,
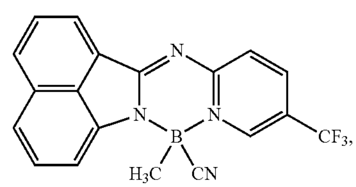,
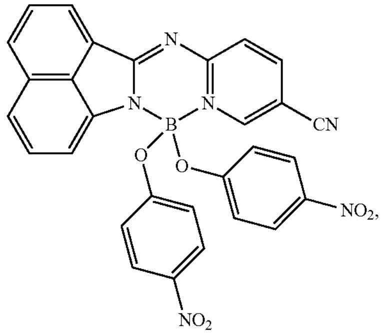,
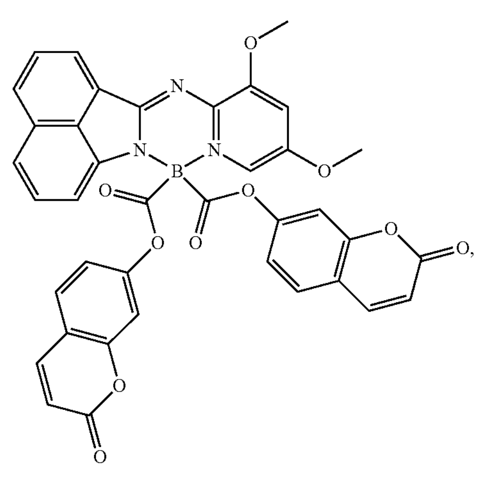, -continued
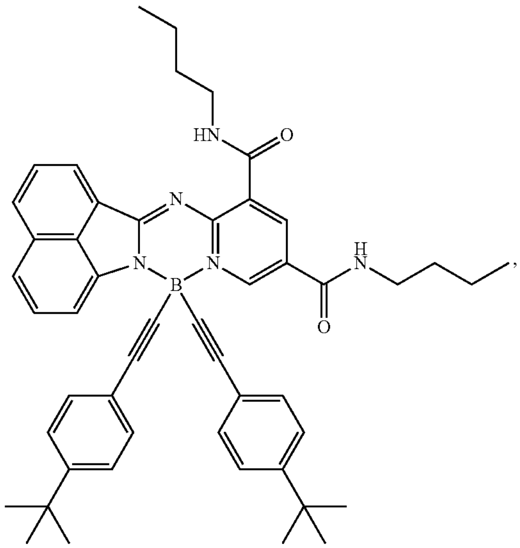
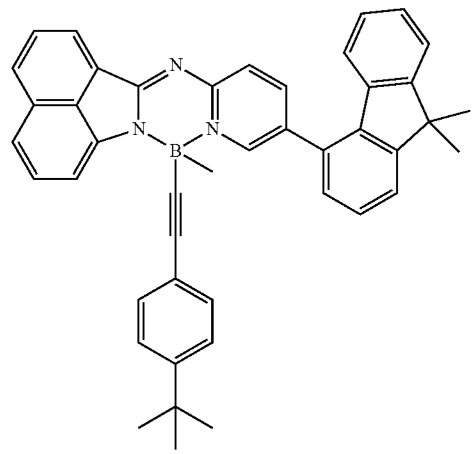
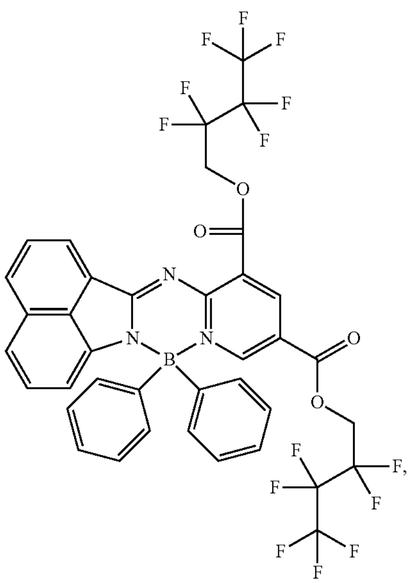
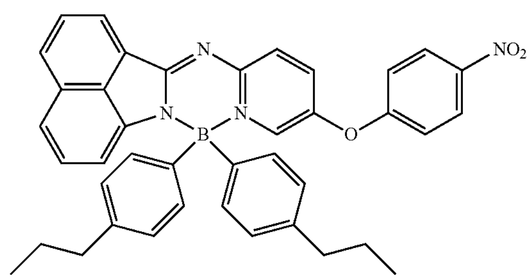
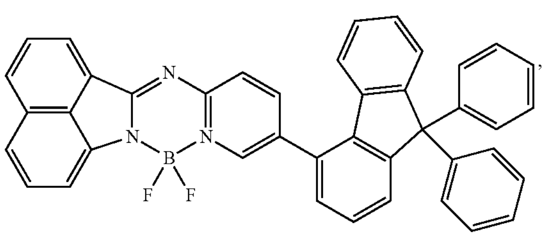
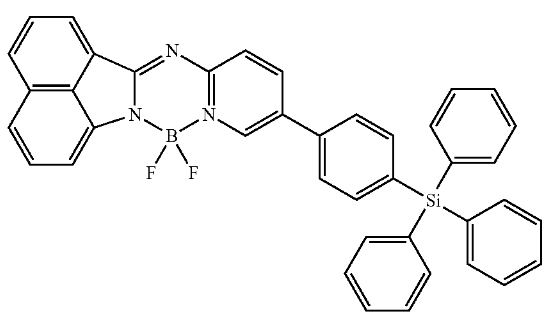
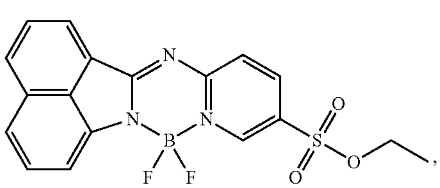
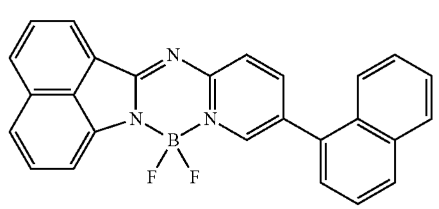

-continued
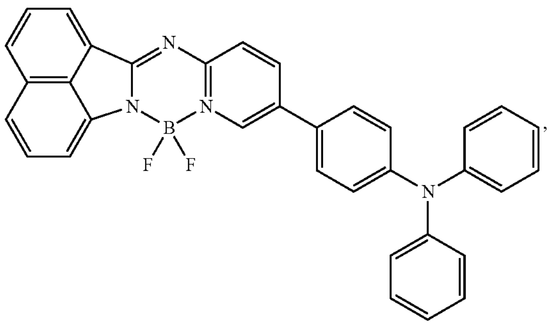
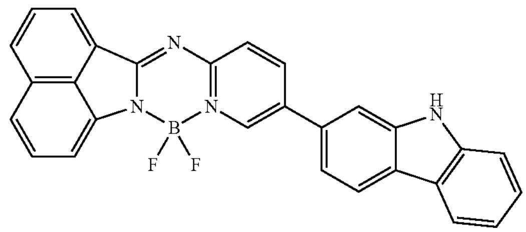
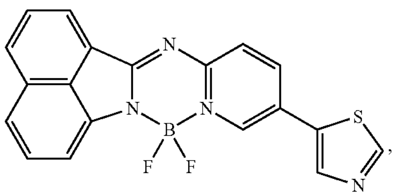
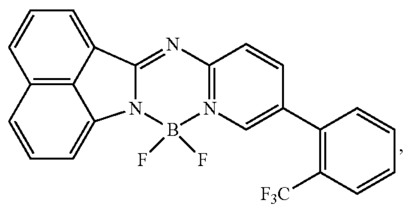
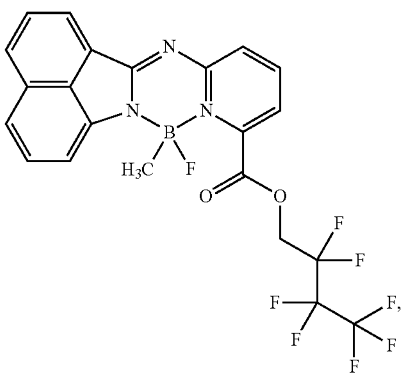
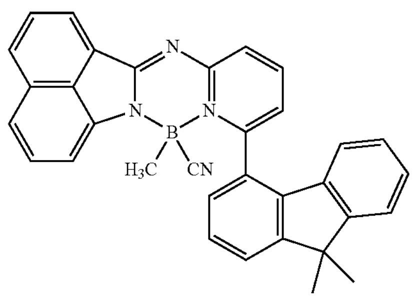
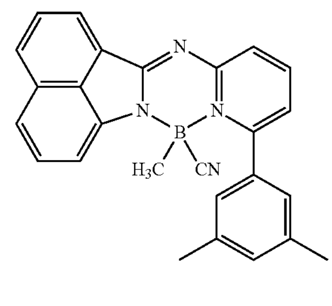
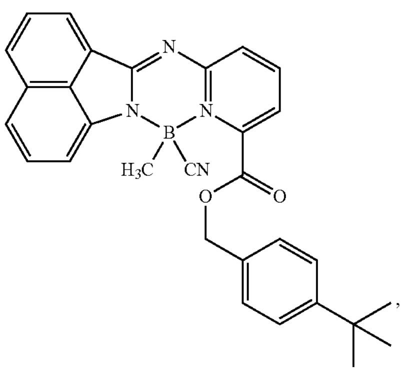
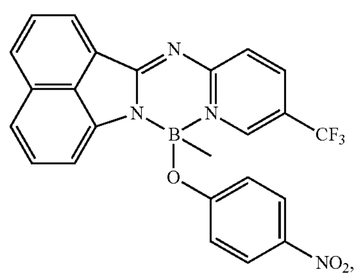
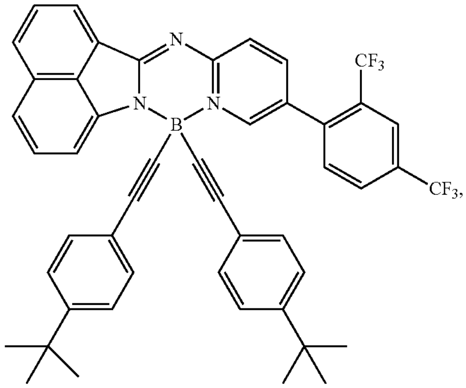
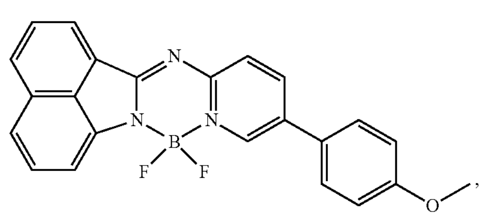

-continued
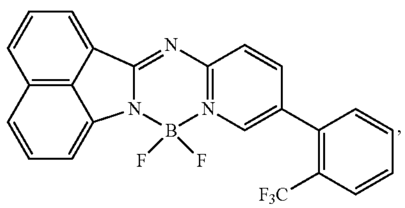
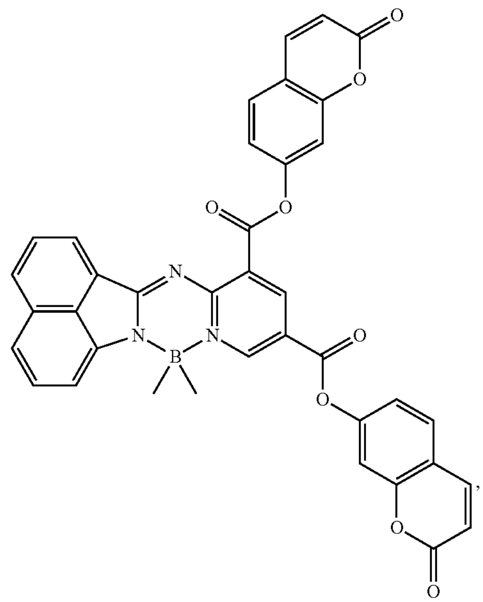
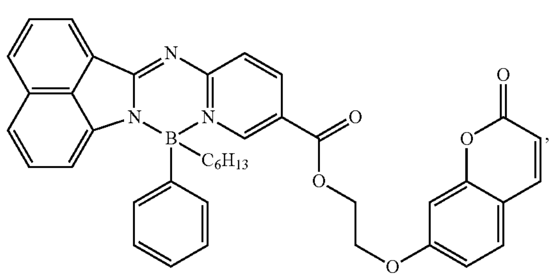
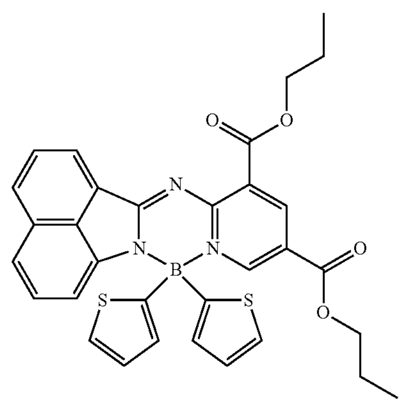
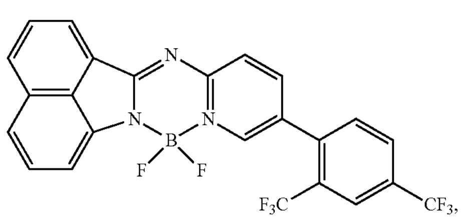
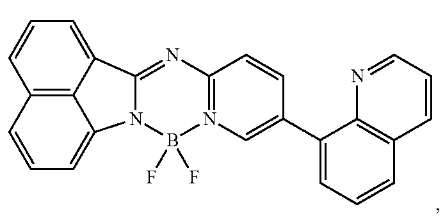
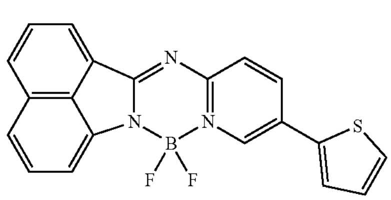
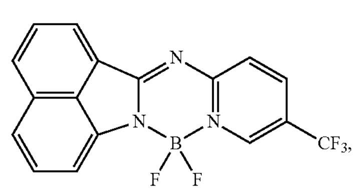
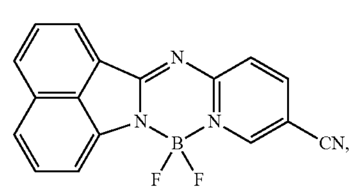

-continued
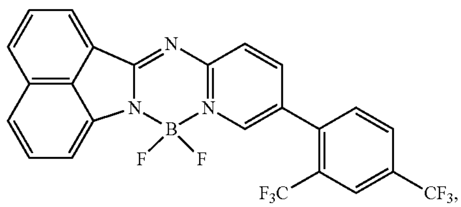
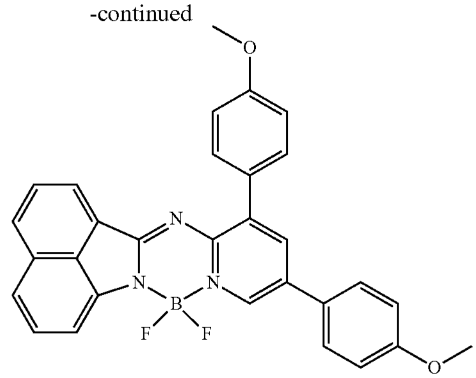
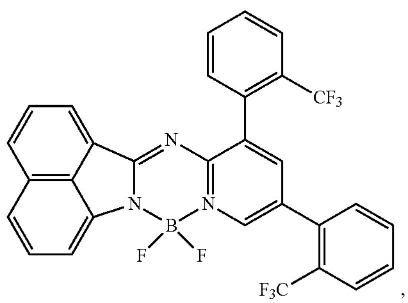
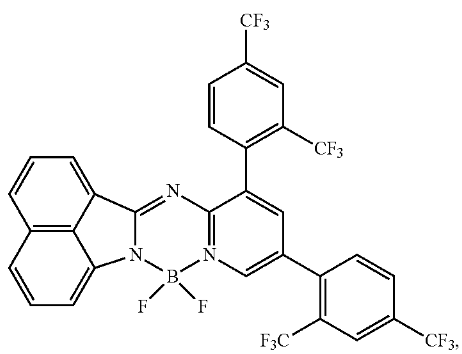
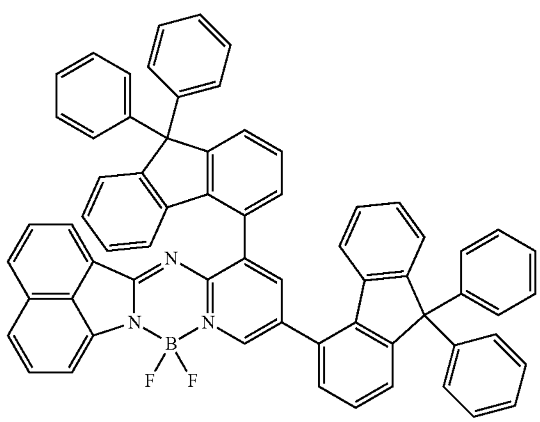
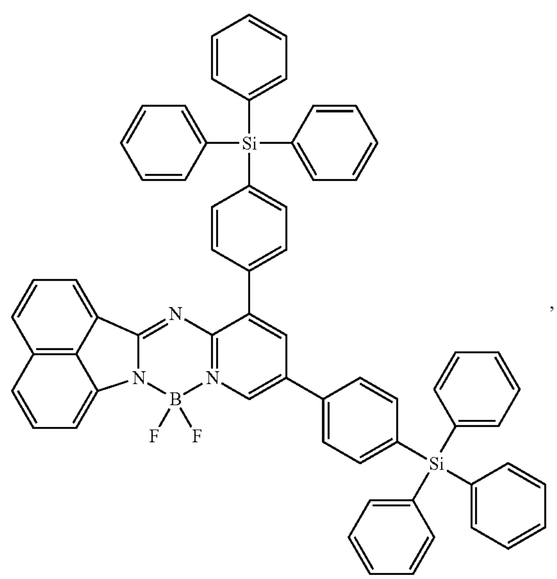
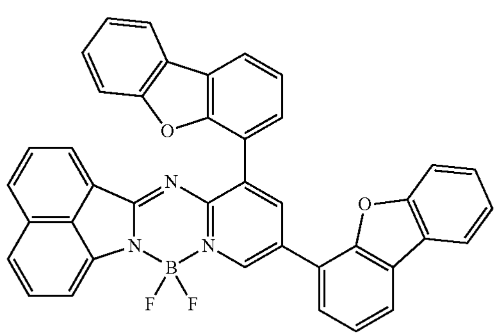

-continued
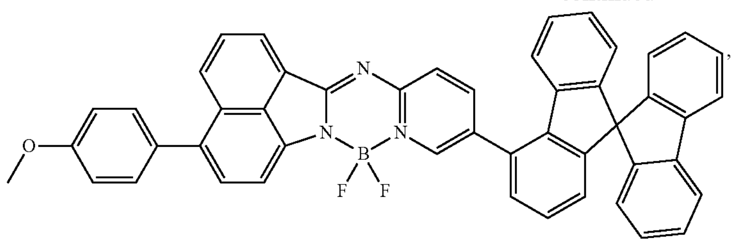
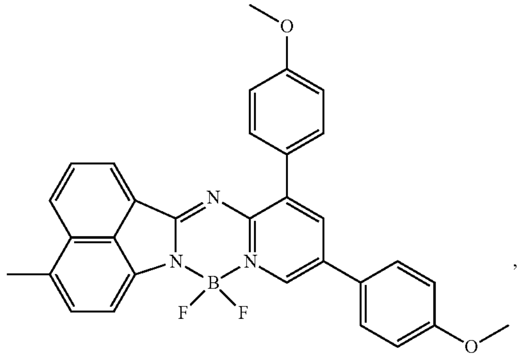
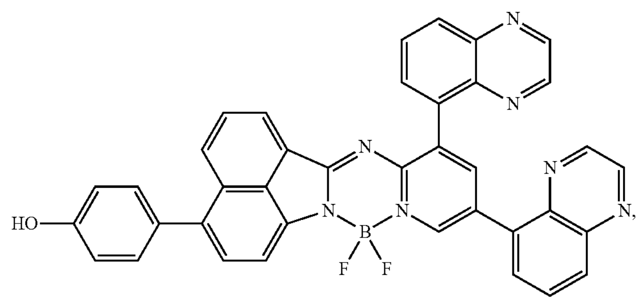
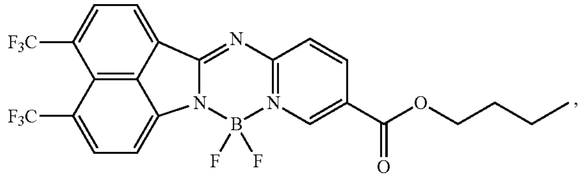
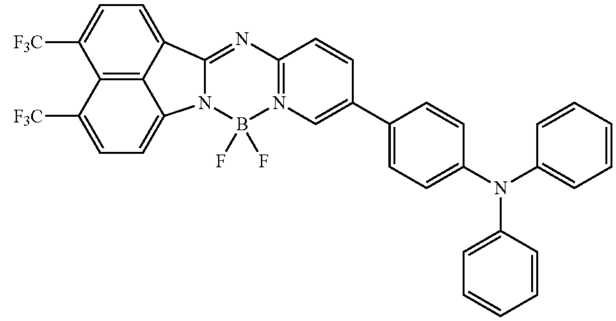
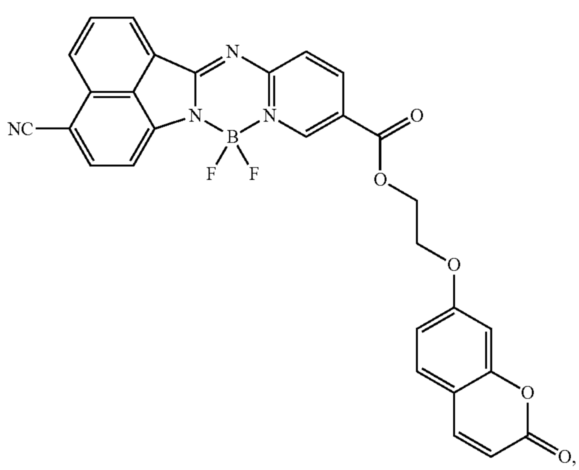
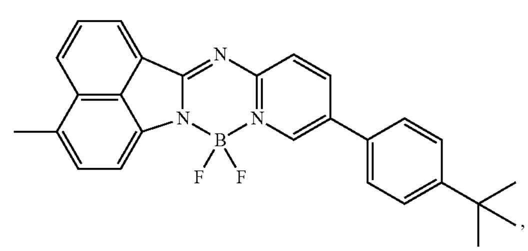
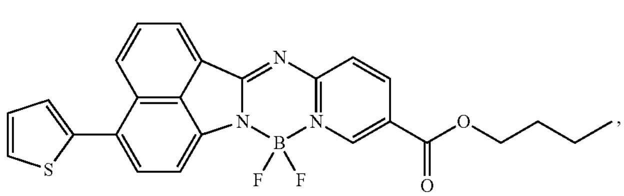

-continued
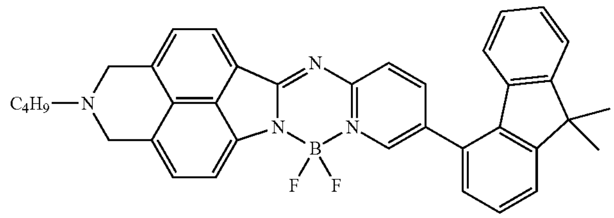,
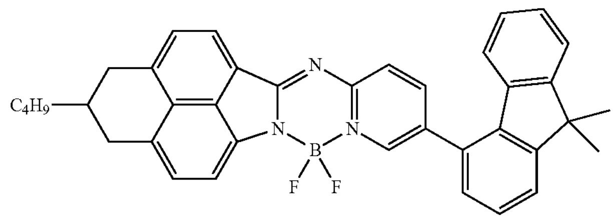, 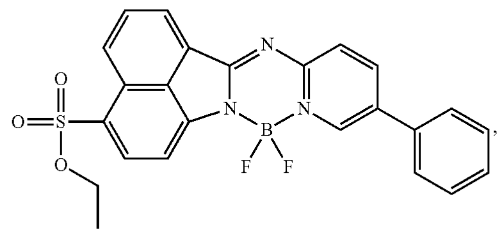,
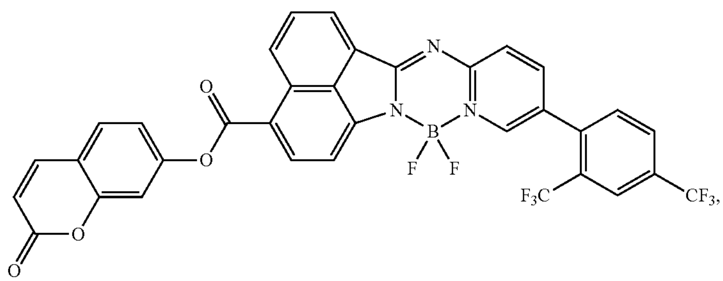
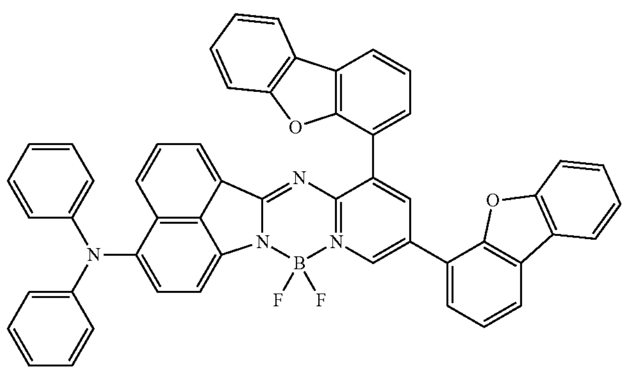, 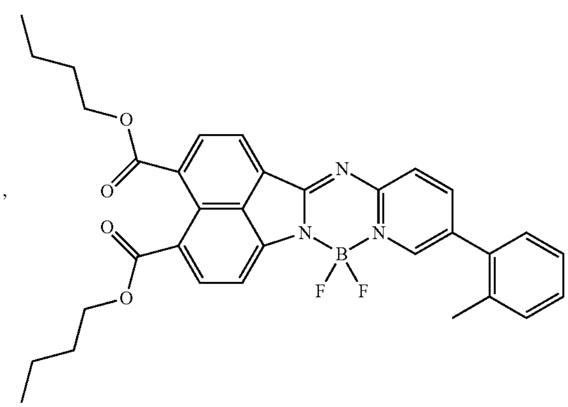,
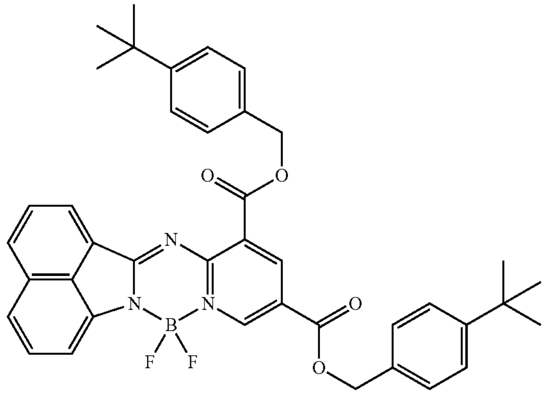, 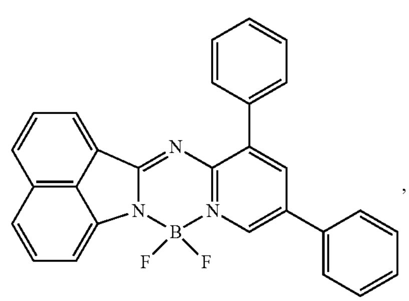, -continued
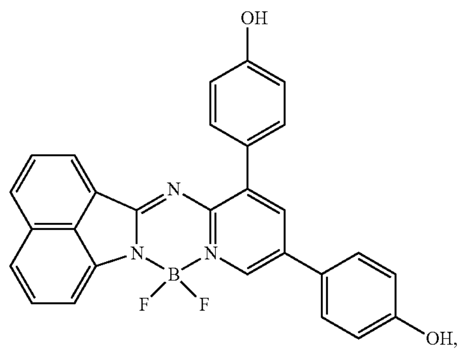
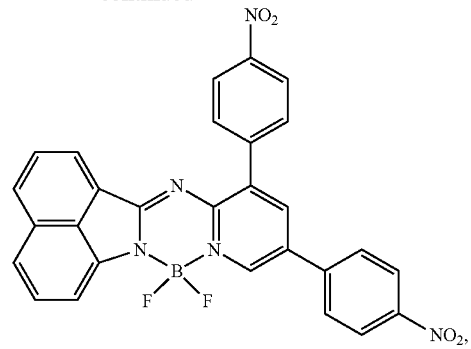
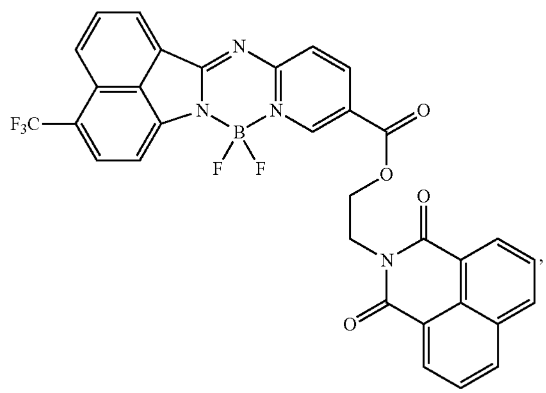
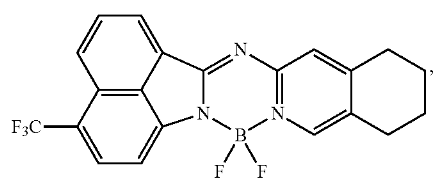
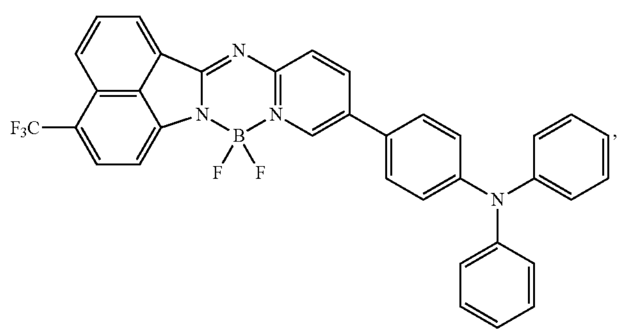
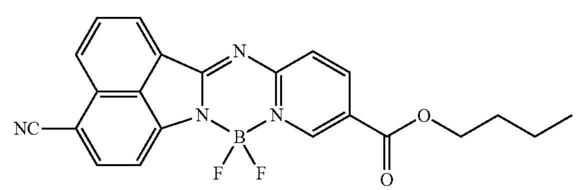
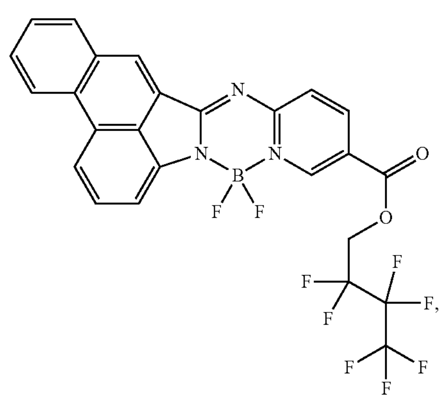
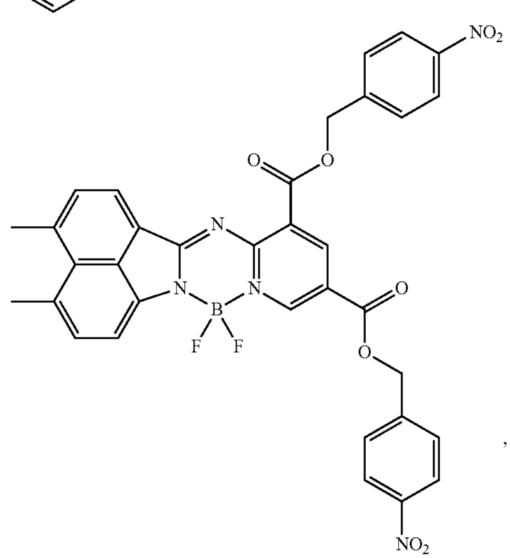

-continued
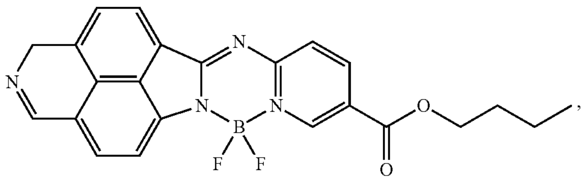
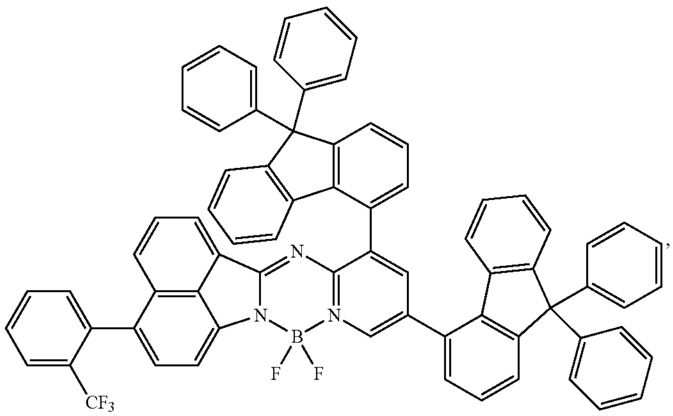
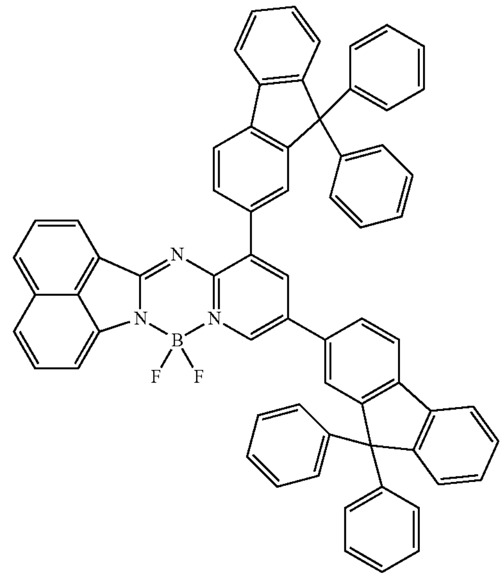
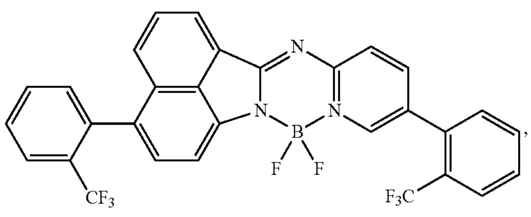
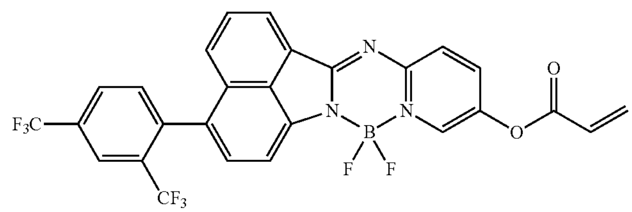
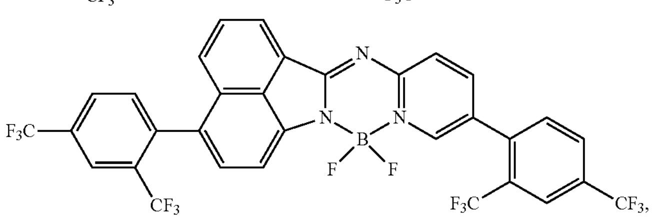
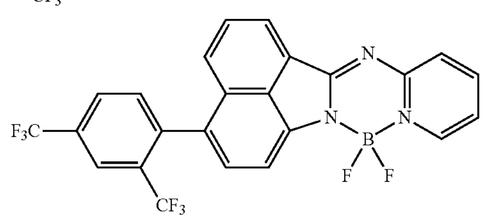
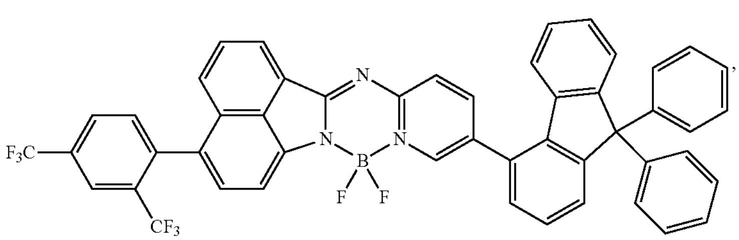
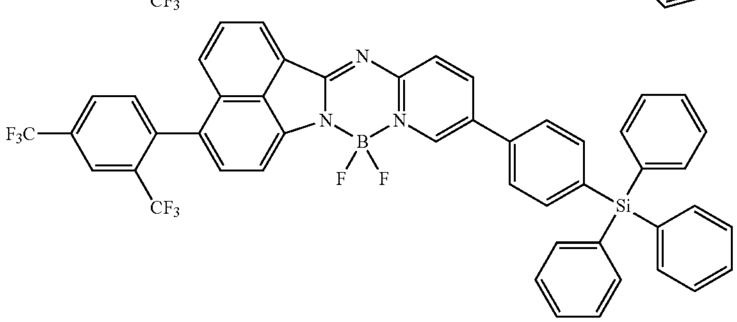

-continued
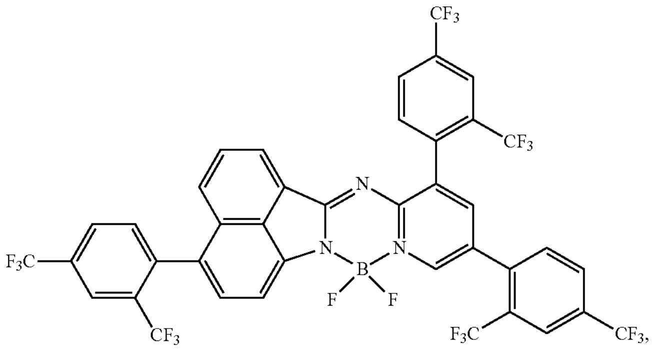
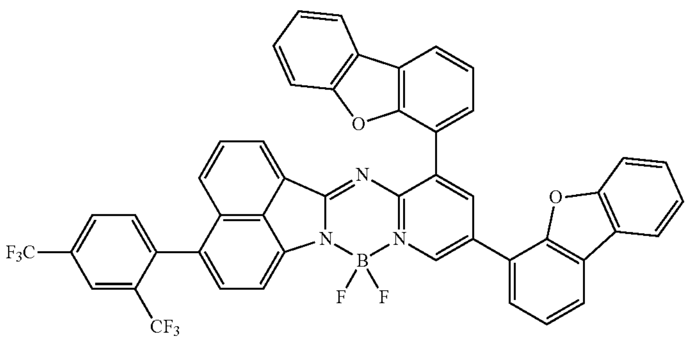
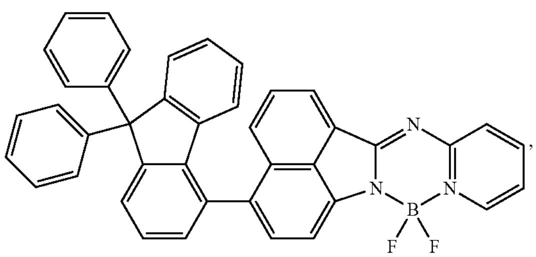
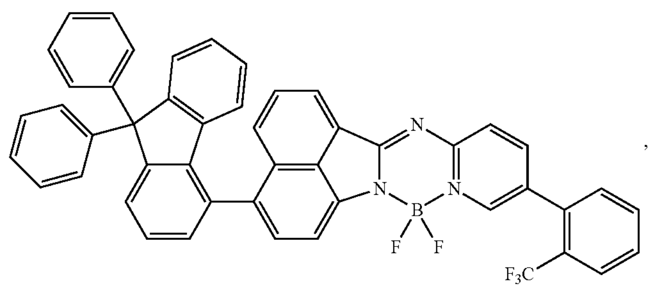
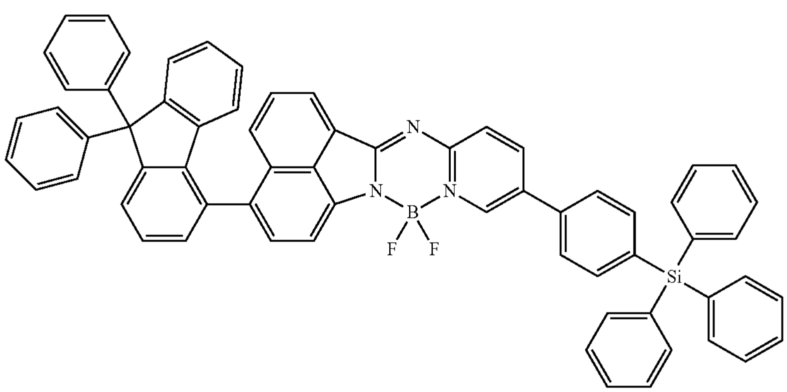
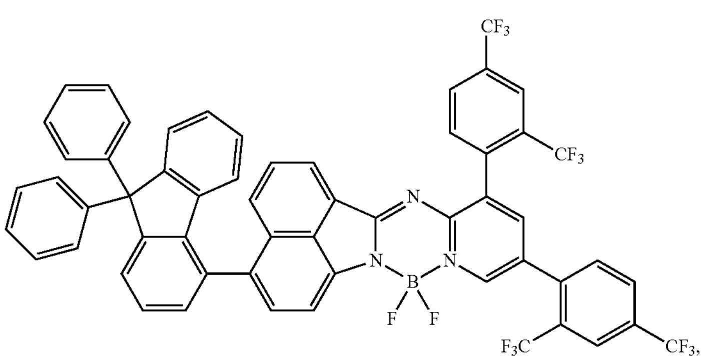

-continued
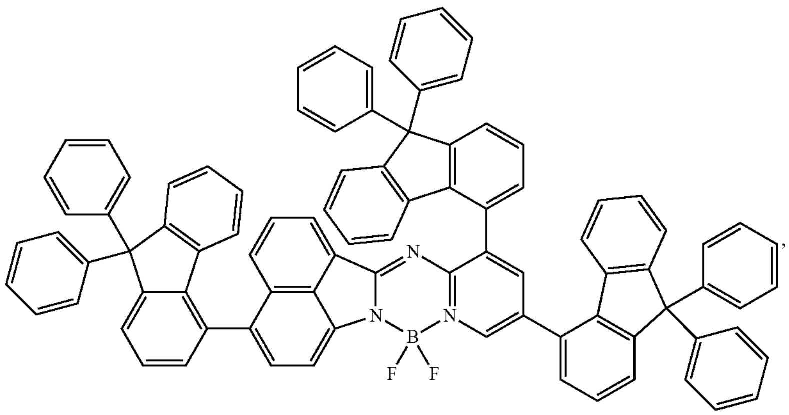
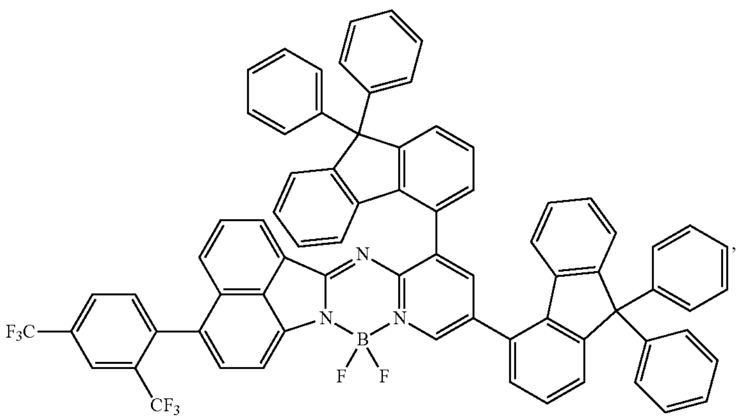
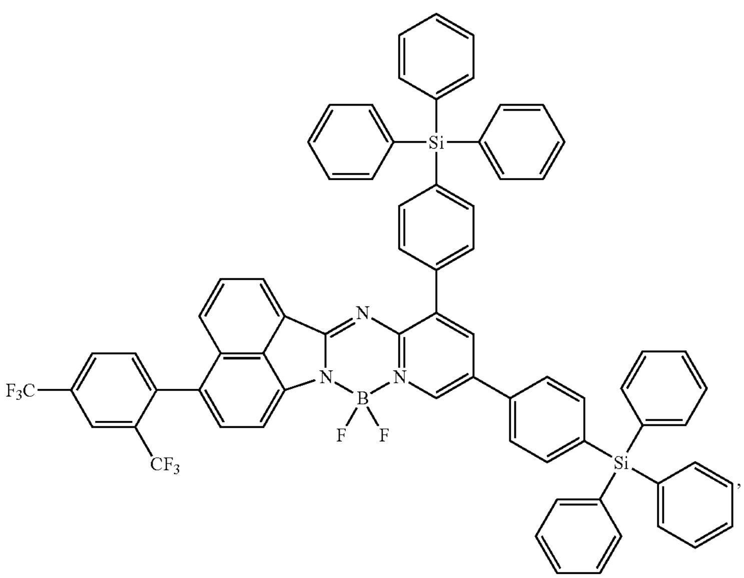
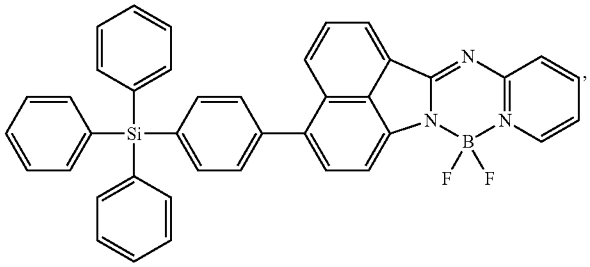

-continued
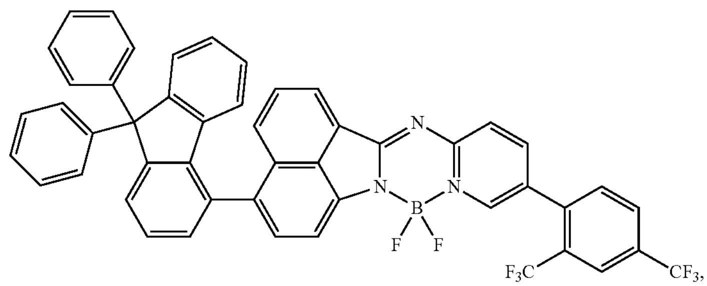
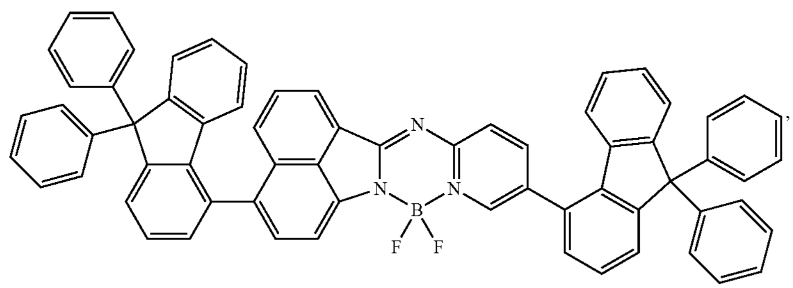
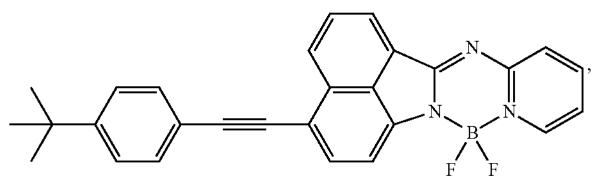
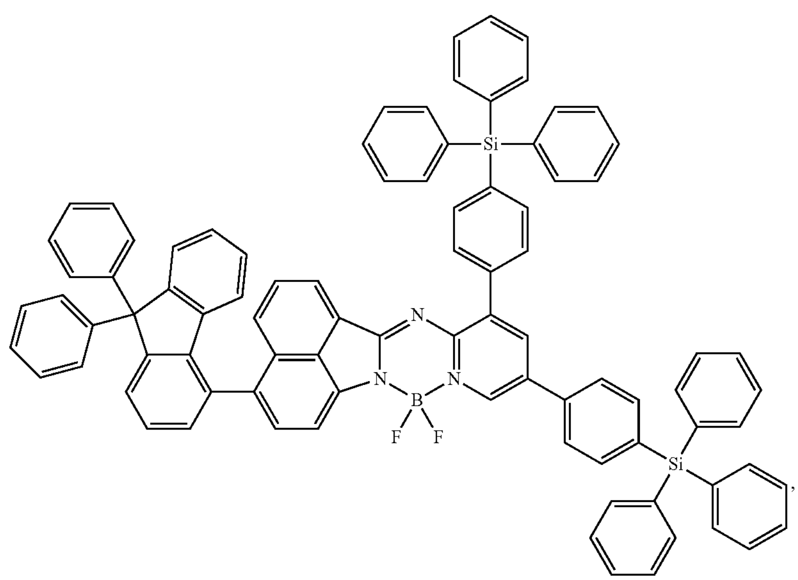

-continued
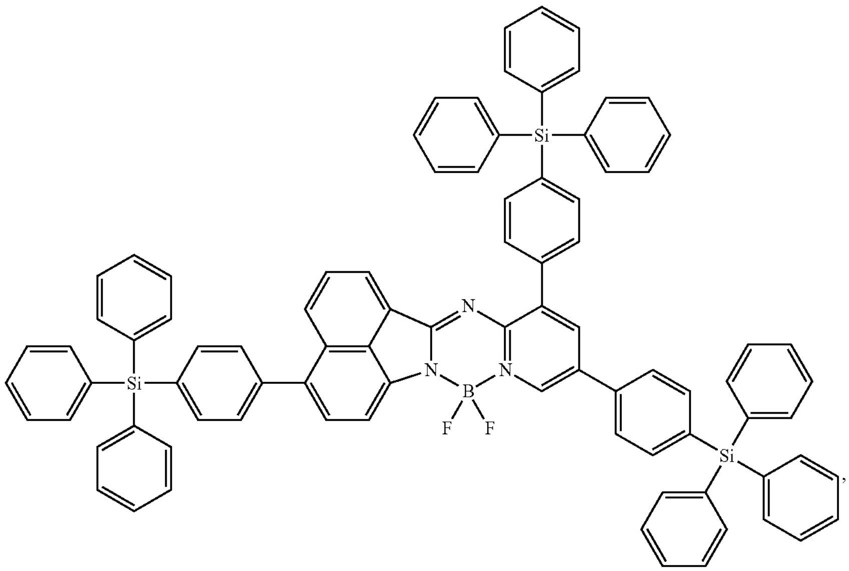
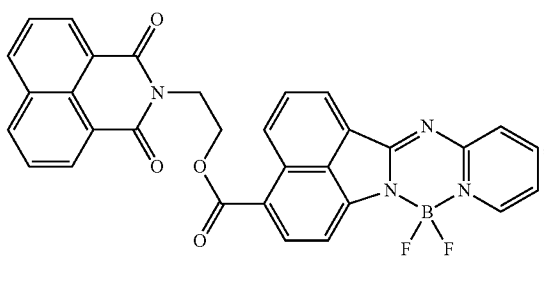
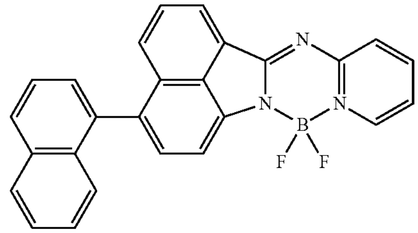
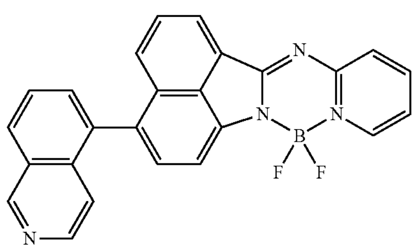
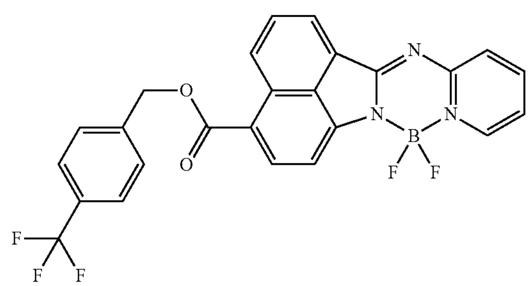
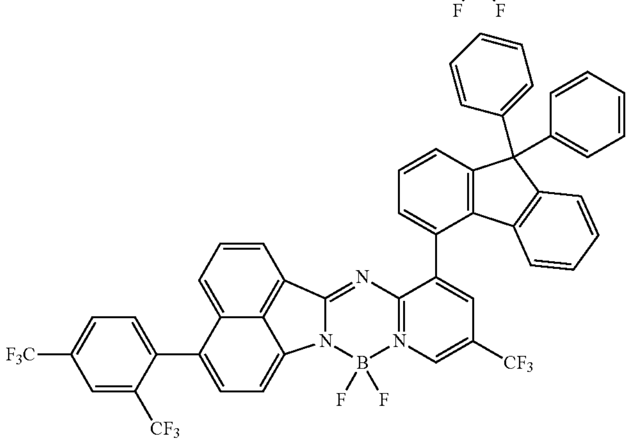

-continued
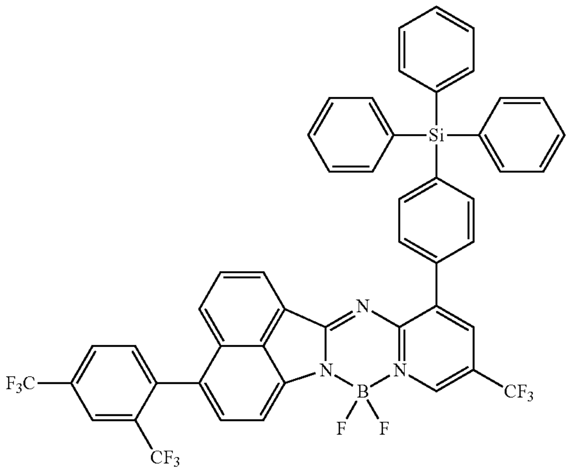
,
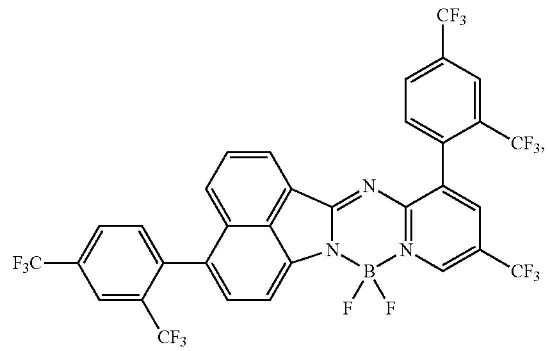
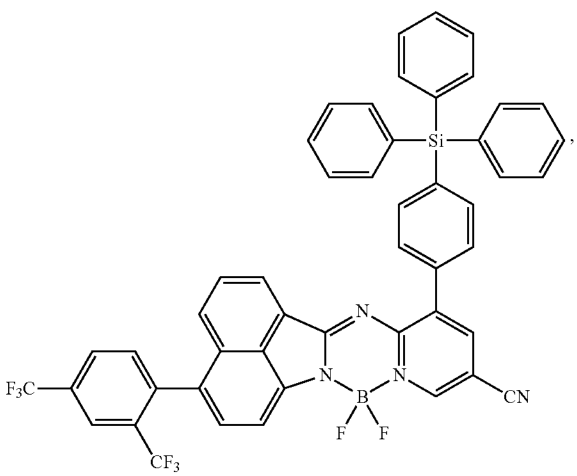
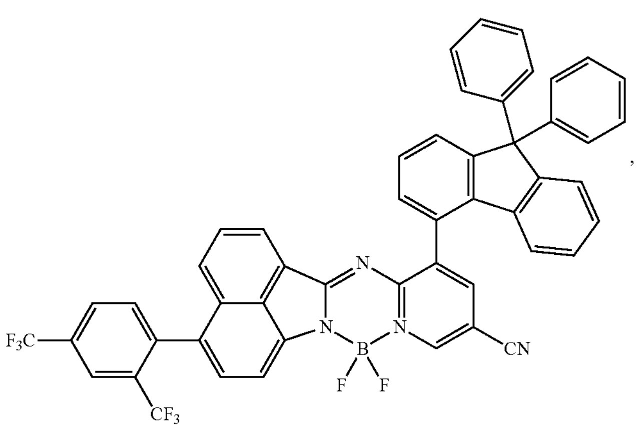
,
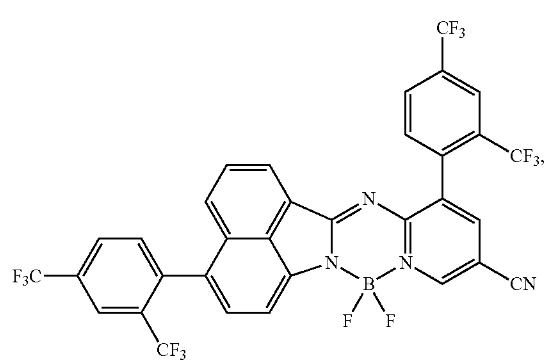

-continued
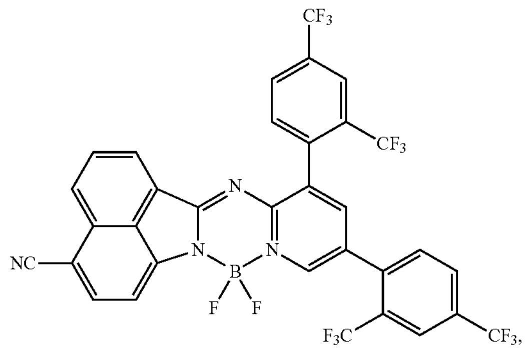
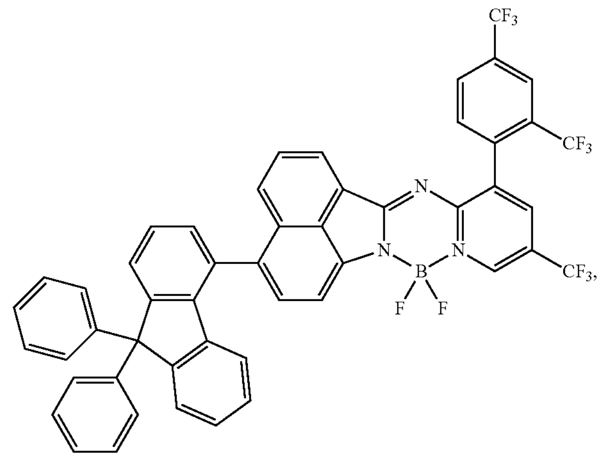
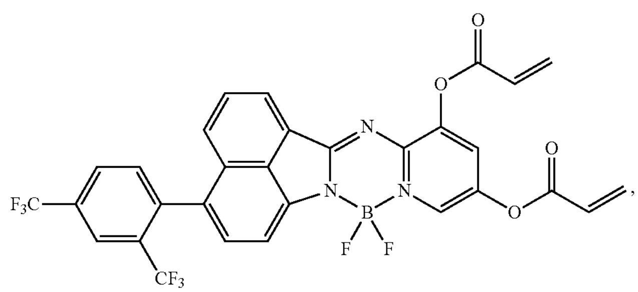
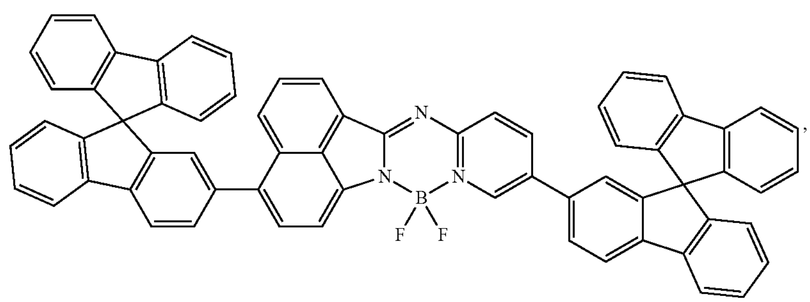
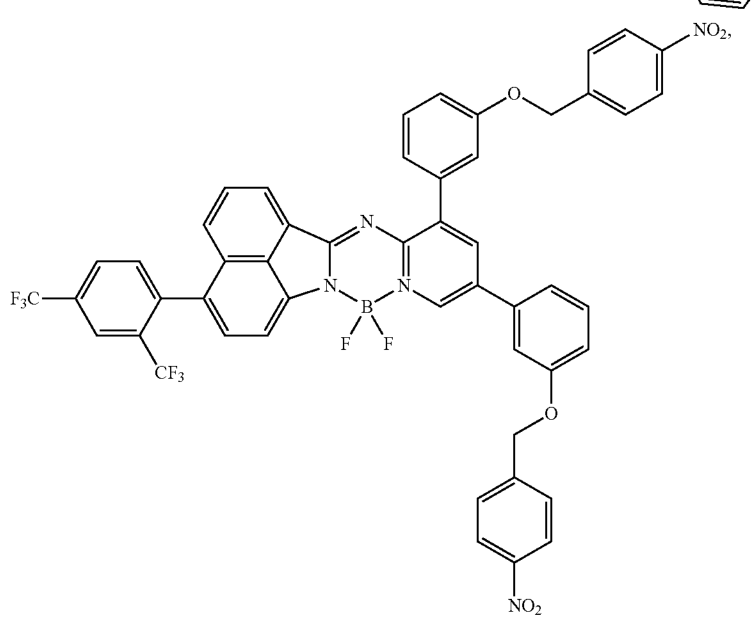

-continued
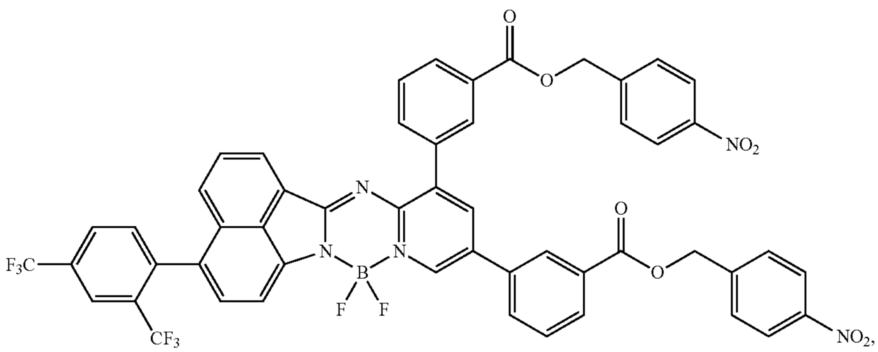
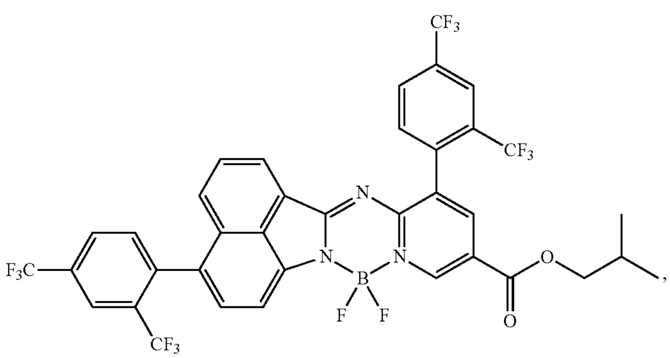
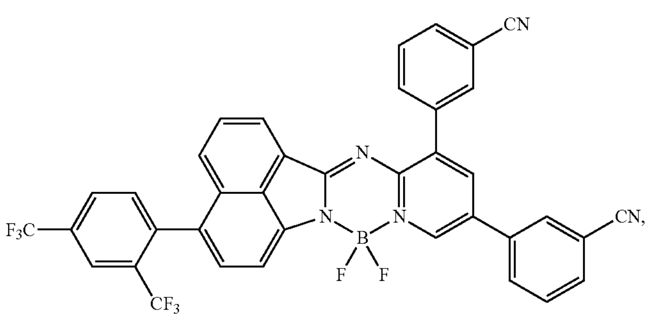
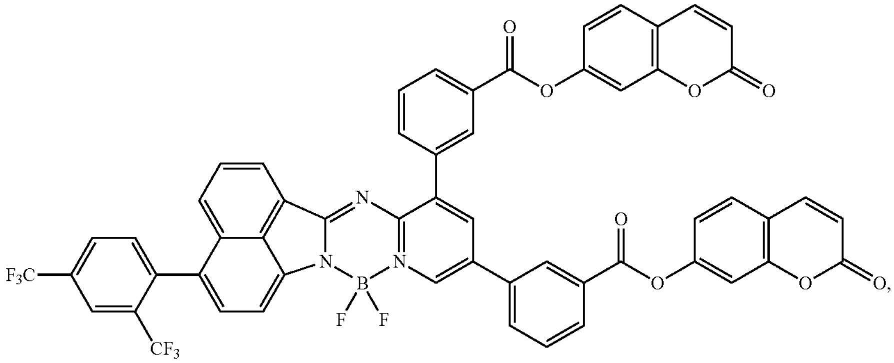

-continued
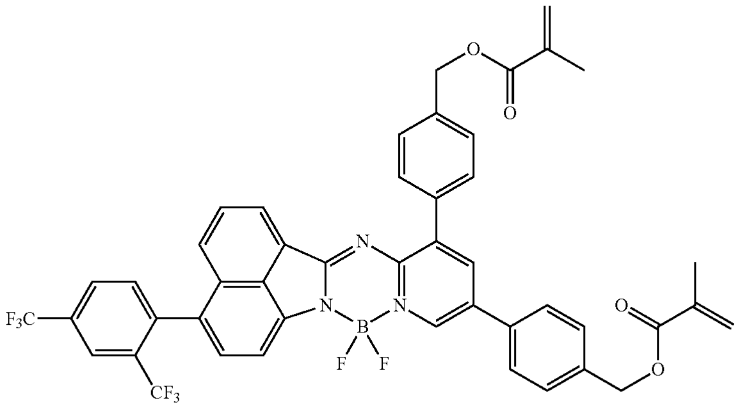
A2
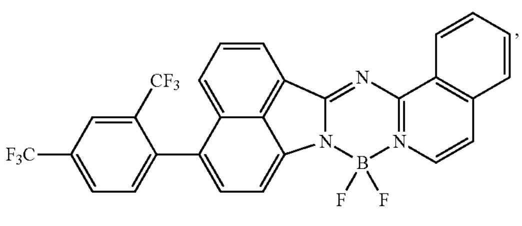
A3
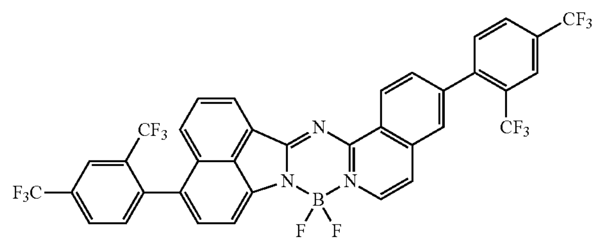
A4
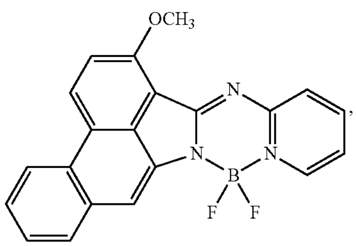
A5
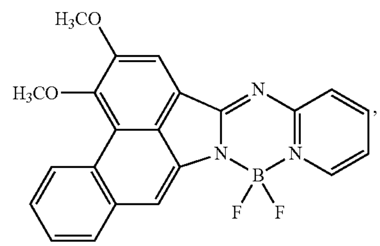
A6
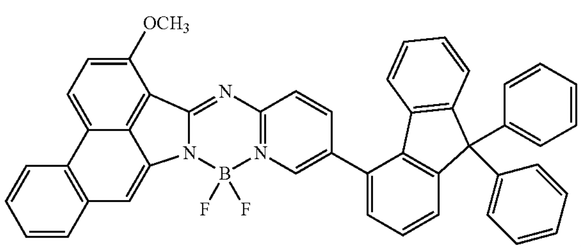
A7
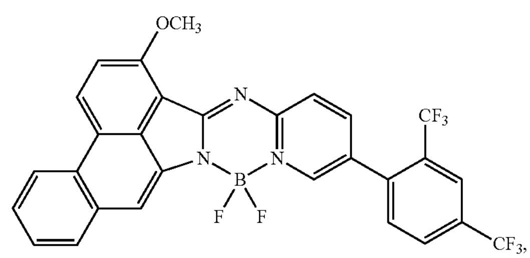
and
A8
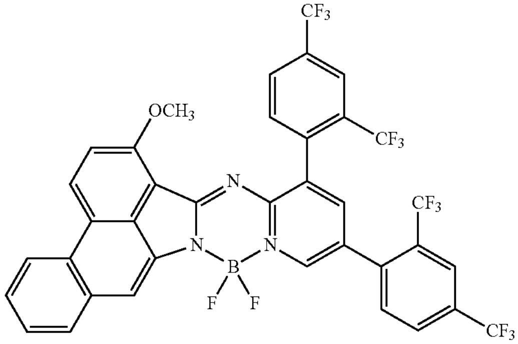

6. The compound of claim 1, wherein R2, R4, R5, R6, and R8 to R10 are hydrogen, and X1, X2, R1, R3, and R7 are any one combination of substituents as represented in the following Table:
| Compound | R7 | R3 | R1 | X1 | X2 |
|---|---|---|---|---|---|
| 1-1 | H | 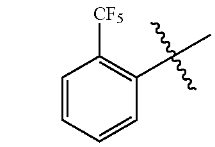 | H | F | F |
| 1-2 | H | 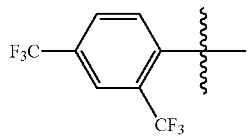 | H | F | F |
| 1-3 | H | 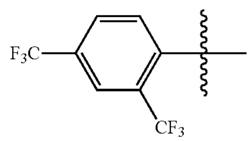 [SMILES: *c1ccc(C(F)(F)F)cc1C(F)(F)F] | H | CN | CN |
| 1-4 | H | 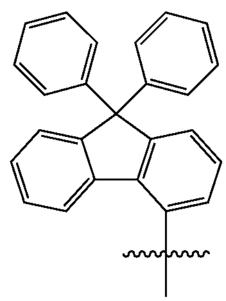 [SMILES: *c1cccc2c1-c1ccccc1C2(c1ccccc1)c1ccccc1] | H | F | F |
| 2-1 | H | 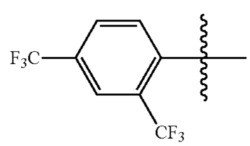 | 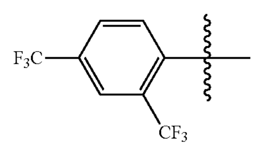 | F | F |
| 2-2 | H | 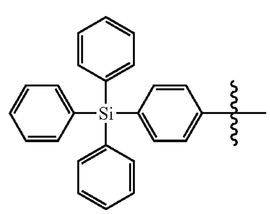 [SMILES: *c1ccc([Si](c2ccccc2)(c2ccccc2)c2ccccc2)cc1] | 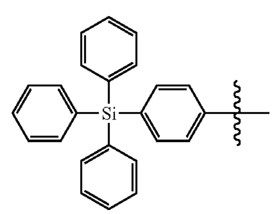 [SMILES: *c1ccc([Si](c2ccccc2)(c2ccccc2)c2ccccc2)cc1] | F | F |
| 2-3 | H | 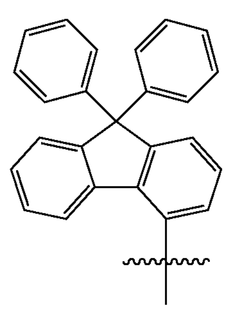 [SMILES: *c1cccc2c1-c1ccccc1C2(c1ccccc1)c1ccccc1] | 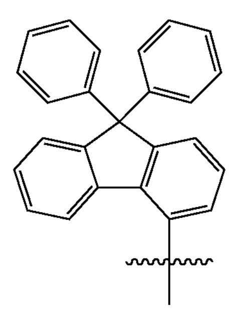 [SMILES: *c1cccc2c1-c1ccccc1C2(c1ccccc1)c1ccccc1] | F | F |

-continued
| Compound | R7 | R3 | R1 | X1 | X2 |
|---|---|---|---|---|---|
| 2-4 | H | 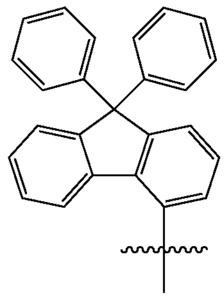 [SMILES: *c1cccc2c1-c1ccccc1C2(c1ccccc1)c1ccccc1] | 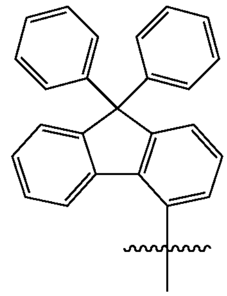 [SMILES: *c1cccc2c1-c1ccccc1C2(c1ccccc1)c1ccccc1] | $C_3F_7CH_2O$— | $C_3F_7CH_2O$— |
| 3-1 | 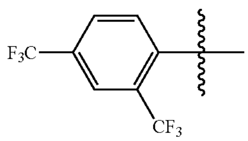 [SMILES: *c1ccc(C(F)(F)F)cc1C(F)(F)F] | H | H | F | F |
| 3-2 | 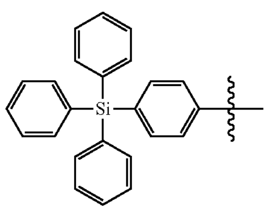 [SMILES: *c1ccc([Si](c2ccccc2)(c2ccccc2)c2ccccc2)cc1] | H | H | F | F |
| 3-3 | 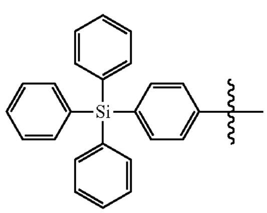 [SMILES: *c1ccc([Si](c2ccccc2)(c2ccccc2)c2ccccc2)cc1] | H | H | CN | CN |
| 3-4 | 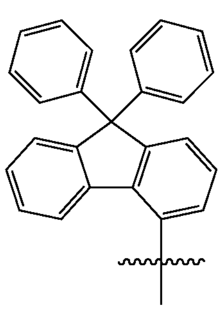 [SMILES: *c1cccc2c1-c1ccccc1C2(c1ccccc1)c1ccccc1] | H | H | F | F |
| 4-1 | 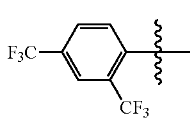 | 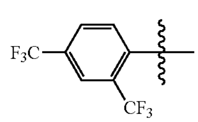 | H | F | F |

-continued
| Compound | R7 | R3 | R1 | X1 | X2 |
|---|---|---|---|---|---|
| 4-2 | 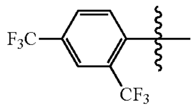 | 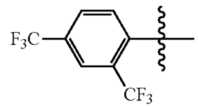 | H | 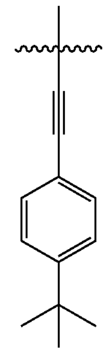 [SMILES: *C#Cc1ccc(C(C)(C)C)cc1] | 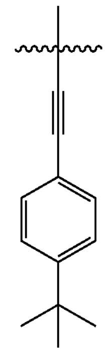 |
| 4-3 | 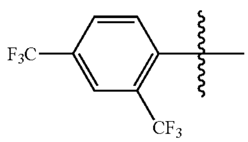 [SMILES: *c1ccc(C(F)(F)F)cc1C(F)(F)F] | 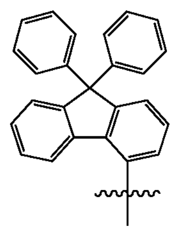 [SMILES: *c1cccc2c1-c1ccccc1C2(c1ccccc1)c1ccccc1] | H | F | F |
| 4-4 | 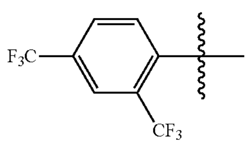 [SMILES: *c1ccc(C(F)(F)F)cc1C(F)(F)F] | 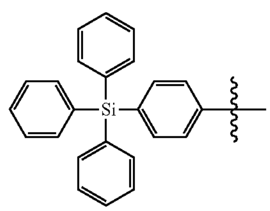 [SMILES: *c1ccc([Si](c2ccccc2)(c2ccccc2)c2ccccc2)cc1] | H | F | F |
| 4-5 | 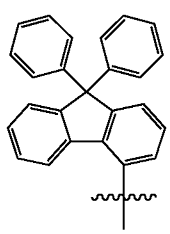 [SMILES: *c1cccc2c1-c1ccccc1C2(c1ccccc1)c1ccccc1] | 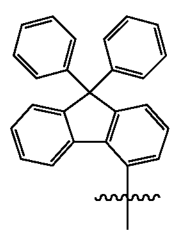 [SMILES: *c1cccc2c1-c1ccccc1C2(c1ccccc1)c1ccccc1] | H | F | F |
| 4-6 | 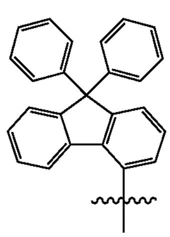 [SMILES: *c1cccc2c1-c1ccccc1C2(c1ccccc1)c1ccccc1] | 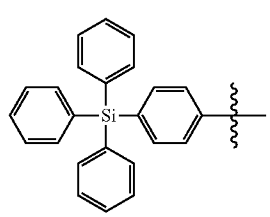 [SMILES: *c1ccc([Si](c2ccccc2)(c2ccccc2)c2ccccc2)cc1] | H | F | F |
| 4-7 | 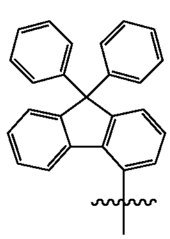 [SMILES: *c1cccc2c1-c1ccccc1C2(c1ccccc1)c1ccccc1] | 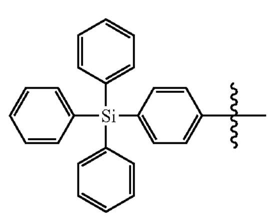 [SMILES: *c1ccc([Si](c2ccccc2)(c2ccccc2)c2ccccc2)cc1] | H | 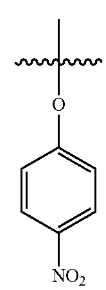 [SMILES: *Oc1ccc([N+](=O)[O-])cc1] | 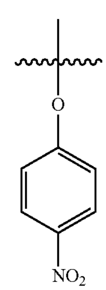 [SMILES: *Oc1ccc([N+](=O)[O-])cc1] |

-continued
| Compound | R7 | R3 | R1 | X1 | X2 |
|---|---|---|---|---|---|
| 4-7 | 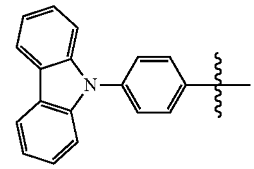 [SMILES: *c1ccc(-n2c3ccccc3c3ccccc32)cc1] | 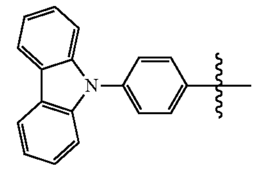 [SMILES: *c1ccc(-n2c3ccccc3c3ccccc32)cc1] | H | F | F |
| 4-8 | 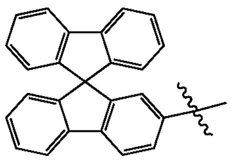 [SMILES: *c1ccc2c(c1)C1(c3ccccc3-c3ccccc31)c1ccccc1-2] | 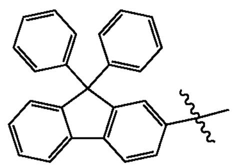 [SMILES: *c1ccc2c(c1)C(c1ccccc1)(c1ccccc1)c1ccccc1-2] | H | F | F |
| 4-9 | 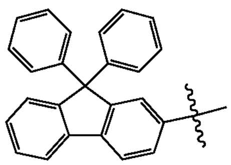 [SMILES: *c1ccc2c(c1)C(c1ccccc1)(c1ccccc1)c1ccccc1-2] | 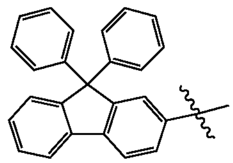 [SMILES: *c1ccc2c(c1)C(c1ccccc1)(c1ccccc1)c1ccccc1-2] | H | F | F |
| 4-10 | 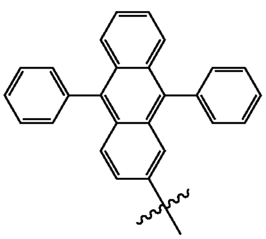 [SMILES: *c1ccc2c(-c3ccccc3)c3ccccc3c(-c3ccccc3)c2c1] | 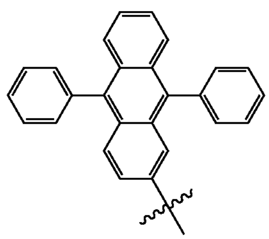 [SMILES: *c1ccc2c(-c3ccccc3)c3ccccc3c(-c3ccccc3)c2c1] | H | F | F |
| 4-11 | 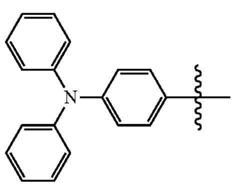 [SMILES: *c1ccc(N(c2ccccc2)c2ccccc2)cc1] | 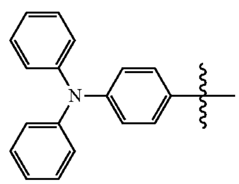 [SMILES: *c1ccc(N(c2ccccc2)c2ccccc2)cc1] | H | F | F |
| 5-1 | 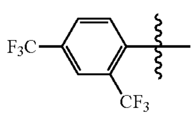 | 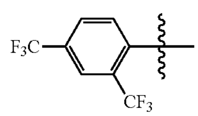 | CN | F | F |
| 5-2 | 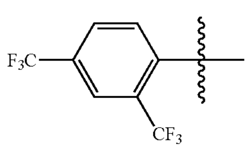 | $CF_3$ | 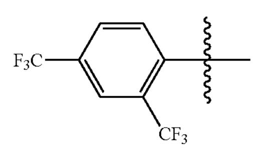 | F | F |
| 5-3 | 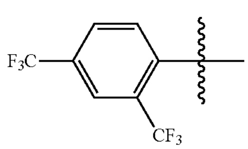 | CN | 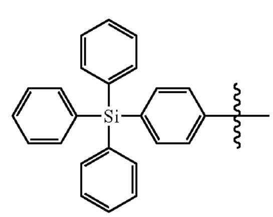 [SMILES: *c1ccc([Si](c2ccccc2)(c2ccccc2)c2ccccc2)cc1] | F | F |

-continued
| Compound | R7 | R3 | R1 | X1 | X2 |
|---|---|---|---|---|---|
| 5-4 | 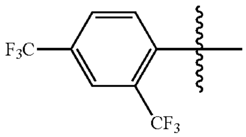 | 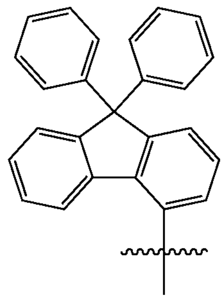 [SMILES: *c1cccc2c1-c1ccccc1C2(c1ccccc1)c1ccccc1] | 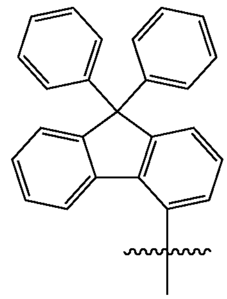 [SMILES: *c1cccc2c1-c1ccccc1C2(c1ccccc1)c1ccccc1] | F | F |
| 5-5 | 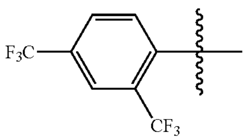 [SMILES: *c1ccc(C(F)(F)F)cc1C(F)(F)F] | 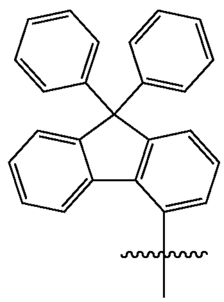 [SMILES: *c1cccc2c1-c1ccccc1C2(c1ccccc1)c1ccccc1] | 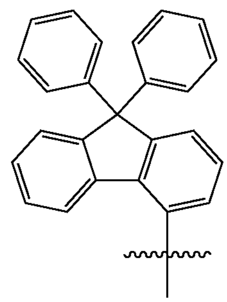 [SMILES: *c1cccc2c1-c1ccccc1C2(c1ccccc1)c1ccccc1] | CN | CN |
| 5-6 | 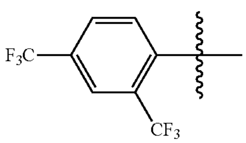 | 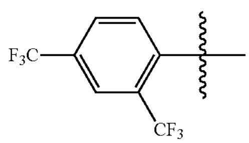 | 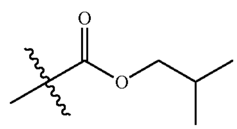 [SMILES: *C(=O)OCC(C)C] | F | F |
| 5-7 | 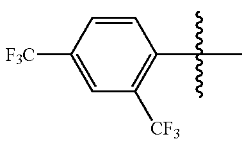 | CN | 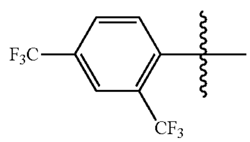 | F | F |
| 5-8 | 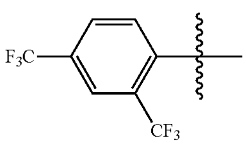 | 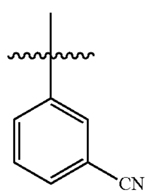 [SMILES: *c1cccc(C#N)c1] | 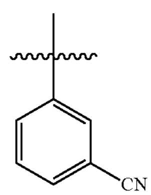 [SMILES: *c1cccc(C#N)c1] | F | F |
| 5-9 | 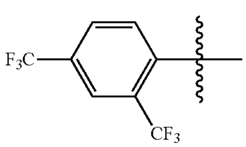 | 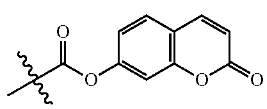 [SMILES: *C(=O)Oc1ccc2ccc(=O)oc2c1] | 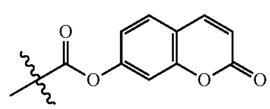 | F | F |
| 5-10 | 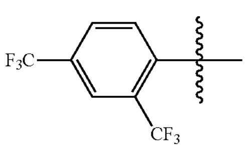 | 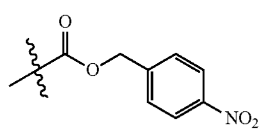 [SMILES: *C(=O)OCc1ccc([N+](=O)[O-])cc1] | 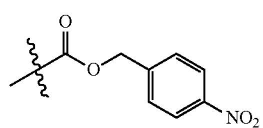 [SMILES: *C(=O)OCc1ccc([N+](=O)[O-])cc1] | F | F |
| 5-11 | 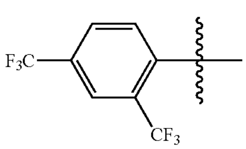 [SMILES: *c1ccc(C(F)(F)F)cc1C(F)(F)F] | 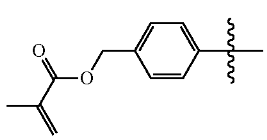 [SMILES: *c1ccc(COC(=O)C(=C)C)cc1] | 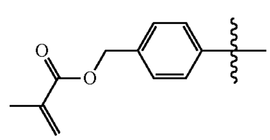 [SMILES: *c1ccc(COC(=O)C(=C)C)cc1] | F | F |

-continued
| Compound | R7 | R3 | R1 | X1 | X2 |
|---|---|---|---|---|---|
| 5-12 | 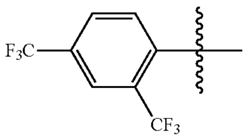 | 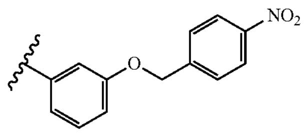 | 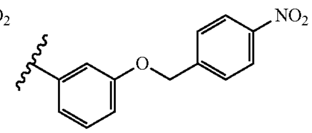 | F | F |
| 5-13 | 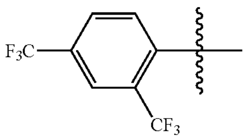 [SMILES: *c1ccc(C(F)(F)F)cc1C(F)(F)F] | 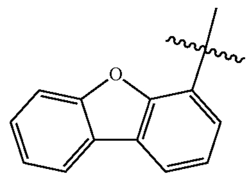 [SMILES: *c1cccc2c1oc1ccccc12] | 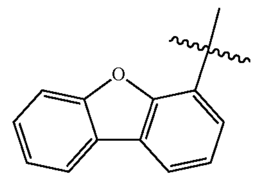 [SMILES: *c1cccc2c1oc1ccccc12] | F | F |
| 5-14 | 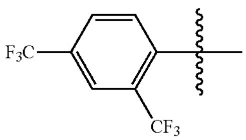 | 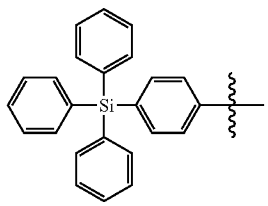 [SMILES: *c1ccc([Si](c2ccccc2)(c2ccccc2)c2ccccc2)cc1] | 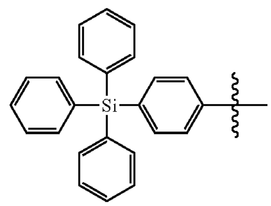 [SMILES: *c1ccc([Si](c2ccccc2)(c2ccccc2)c2ccccc2)cc1] | F | F |
| 5-15 | 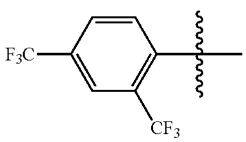 | $CF_3$ | 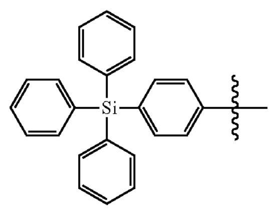 [SMILES: *c1ccc([Si](c2ccccc2)(c2ccccc2)c2ccccc2)cc1] | F | F |
| 6-1 | CN | 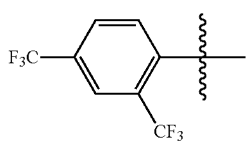 | 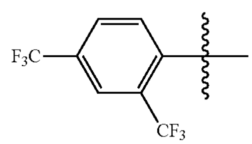 | F | F |
| 6-2 | CN | 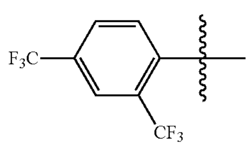 | 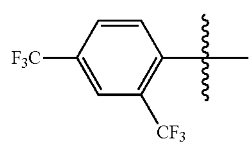 | 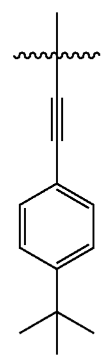 [SMILES: *C#Cc1ccc(C(C)(C)C)cc1] | 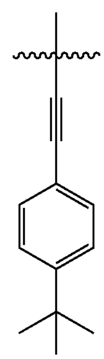 |
| 6-3 | 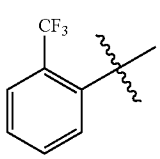 | 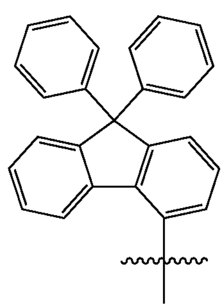 [SMILES: *c1cccc2c1-c1ccccc1C2(c1ccccc1)c1ccccc1] | 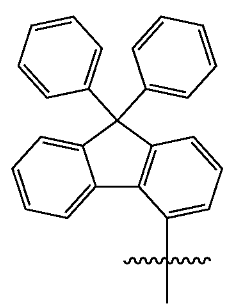 [SMILES: *c1cccc2c1-c1ccccc1C2(c1ccccc1)c1ccccc1] | F | F |

-continued

| Compound | R7 | R3 | R1 | X1 | X2 |
|---|---|---|---|---|---|
| 6-4 | 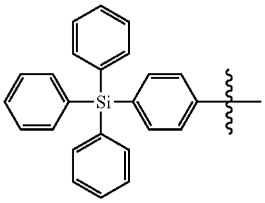 [SMILES: *c1ccc([Si](c2ccccc2)(c2ccccc2)c2ccccc2)cc1] | 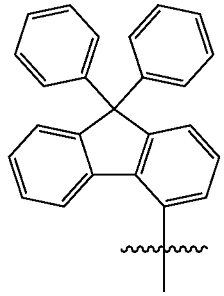 [SMILES: *c1cccc2c1-c1ccccc1C2(c1ccccc1)c1ccccc1] | 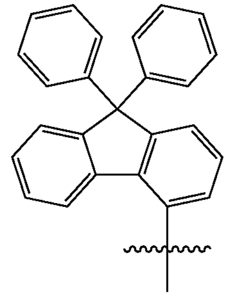 [SMILES: *c1cccc2c1-c1ccccc1C2(c1ccccc1)c1ccccc1] | F | F |
| 6-5 | 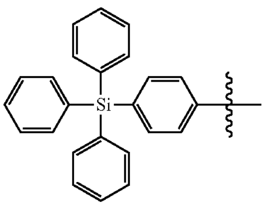 [SMILES: *c1ccc([Si](c2ccccc2)(c2ccccc2)c2ccccc2)cc1] | 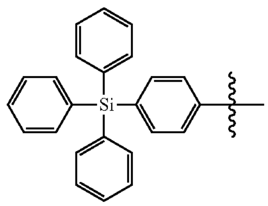 [SMILES: *c1ccc([Si](c2ccccc2)(c2ccccc2)c2ccccc2)cc1] | 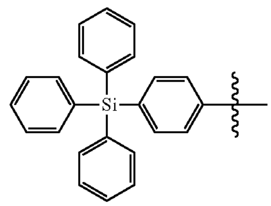 [SMILES: *c1ccc([Si](c2ccccc2)(c2ccccc2)c2ccccc2)cc1] | F | F |
| 6-6 | 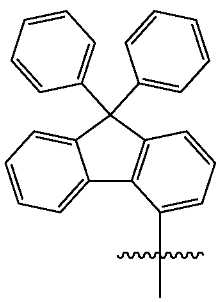 [SMILES: *c1cccc2c1-c1ccccc1C2(c1ccccc1)c1ccccc1] | $CF_3$ | 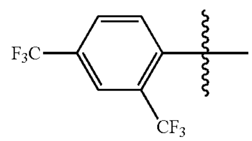 | F | F |
| 6-7 | 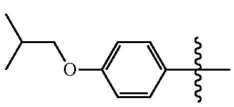 | 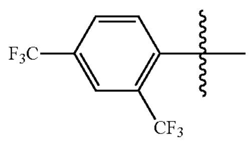 | 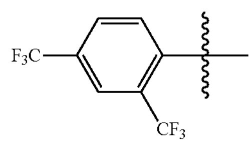 | F | F. |

7. The compound of claim 1, wherein at least one of R1, R3, and R7 is an aryl group unsubstituted or substituted with one or more substituents selected from the group consisting of a fluoroalkyl group, a silyl group, an alkoxy group, an aryl group, and a nitro group.

8. A color conversion film comprising:

a resin matrix; and the compound represented by Chemical Formula 1 according to claim 1, which is dispersed in the resin matrix.

9. A backlight unit comprising the color conversion film according to claim 8.

10. A display device comprising the backlight unit according to claim 9.

* * * * *